US012066707B2

United States Patent
Sasata et al.

(10) Patent No.: US 12,066,707 B2
(45) Date of Patent: Aug. 20, 2024

(54) OPTICAL ELEMENT AND IMAGE DISPLAY APPARATUS

(71) Applicant: FUJIFILM Corporation, Tokyo (JP)

(72) Inventors: Katsumi Sasata, Minamiashigara (JP); Fumitake Mitobe, Minamiashigara (JP); Hiroshi Sato, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/937,370

(22) Filed: Sep. 30, 2022

(65) Prior Publication Data

US 2023/0043783 A1 Feb. 9, 2023

Related U.S. Application Data

(63) Continuation of application No. PCT/JP2021/014150, filed on Apr. 1, 2021.

(30) Foreign Application Priority Data

Apr. 3, 2020 (JP) .................................. 2020-067690
Apr. 28, 2020 (JP) .................................. 2020-079512

(51) Int. Cl.
  *G02F 1/1335* (2006.01)
  *G02B 27/01* (2006.01)
(52) U.S. Cl.
  CPC .. *G02F 1/133504* (2013.01); *G02F 1/133524* (2013.01); *G02F 1/133541* (2021.01); *G02F 1/133543* (2021.01); *G02B 27/0172* (2013.01)
(58) Field of Classification Search
  CPC ......... G02F 1/133504; G02F 1/133543; G02F 1/133541; G02F 1/133524; G02B 27/0172
  See application file for complete search history.

(56) References Cited

U.S. PATENT DOCUMENTS

2020/0326579 A1* 10/2020 Sato .................... G02F 1/13473
2021/0026049 A1 1/2021 Saitoh et al.

FOREIGN PATENT DOCUMENTS

WO WO 2017/180403 A1 10/2017
WO WO 2019/131966 A1 7/2019
(Continued)

OTHER PUBLICATIONS

International Preliminary Report on Patentability and English translation of the Written Opinion of the International Searching Authority for International Application No. PCT/JP2021/014150, dated Oct. 13, 2022.
(Continued)

*Primary Examiner* — Nathanael R Briggs
(74) *Attorney, Agent, or Firm* — Birch, Stewart, Kolasch & Birch, LLP

(57) ABSTRACT

An optical element includes a light guide plate, an incidence portion, and an emission portion, in which each of the incidence portion and the emission portion includes diffraction portions, the diffraction portion includes diffraction elements, the diffraction element includes a liquid crystal diffraction layer in which a direction of an optical axis of a liquid crystal compound changes while continuously rotating in one in-plane direction, and in a case where the direction in which the direction of the optical axis changes is set as an in-plane rotation direction and a length over which the optical axis rotates by 180° is set as an in-plane period, in-plane rotation directions of liquid crystal diffraction layers of incidence diffraction elements in at least two of a plurality of the incidence diffraction portions are different from each other.

20 Claims, 18 Drawing Sheets

⬌ DIRECTIONS OF IN-PLANE ROTATION PERIODS OF INCIDENCE AND EMISSION ELEMENTS A1-1 AND A1-2
⬌ DIRECTIONS OF IN-PLANE ROTATION PERIODS OF INCIDENCE AND EMISSION ELEMENTS A2-1 AND A2-2
⬌ DIRECTIONS OF IN-PLANE ROTATION PERIODS OF INCIDENCE AND EMISSION ELEMENTS A3-1 AND A3-2

(56) References Cited

FOREIGN PATENT DOCUMENTS

WO  WO-2019131966 A1 * 7/2019 ............. G02B 27/02
WO  WO 2019/189586 A1  10/2019

OTHER PUBLICATIONS

International Search Report for International Application No. PCT/JP2021/014150, dated Jun. 8, 2021, with English translation.
Kress et al., "Towards the Ultimate Mixed Reality Experience: HoloLens Display Architecture Choices," SID 2017 Digest, 2017, pp. 127-131.
Japanese Office Action for corresponding Japanese Application No. 2022-512698, dated Sep. 26, 2023, with English translation.

* cited by examiner

FIG. 14
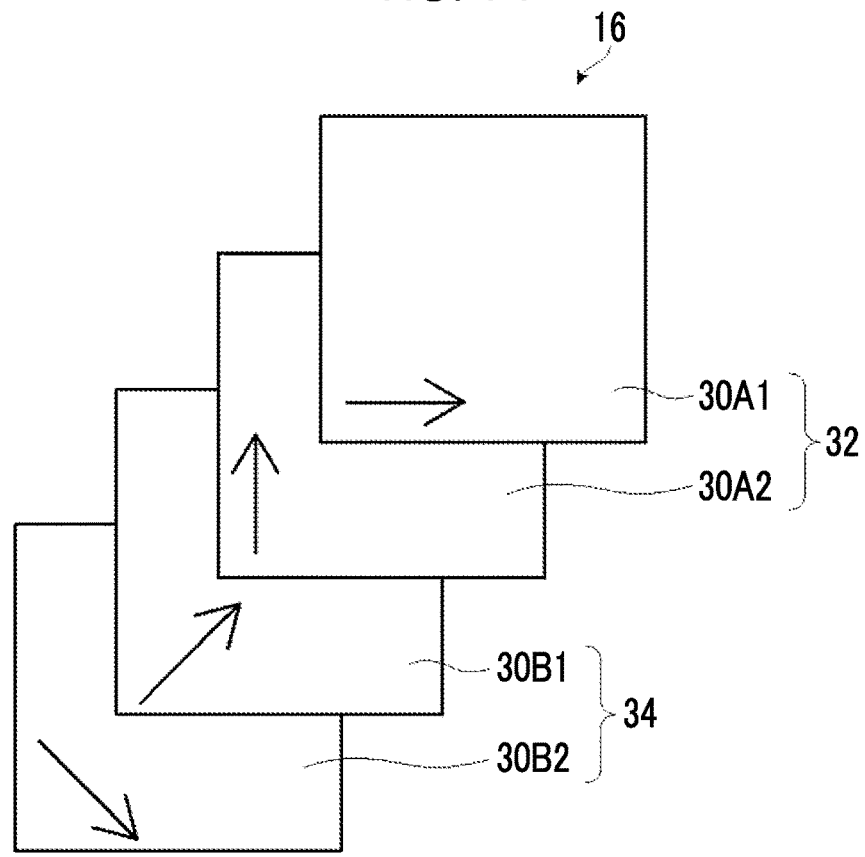
FIG. 15
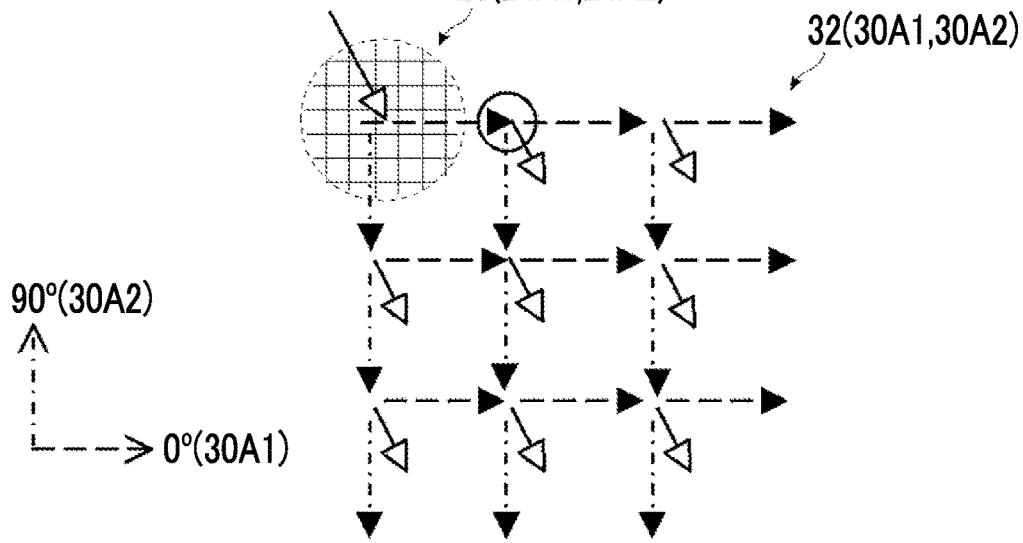
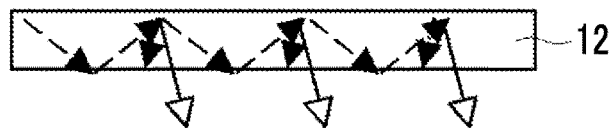

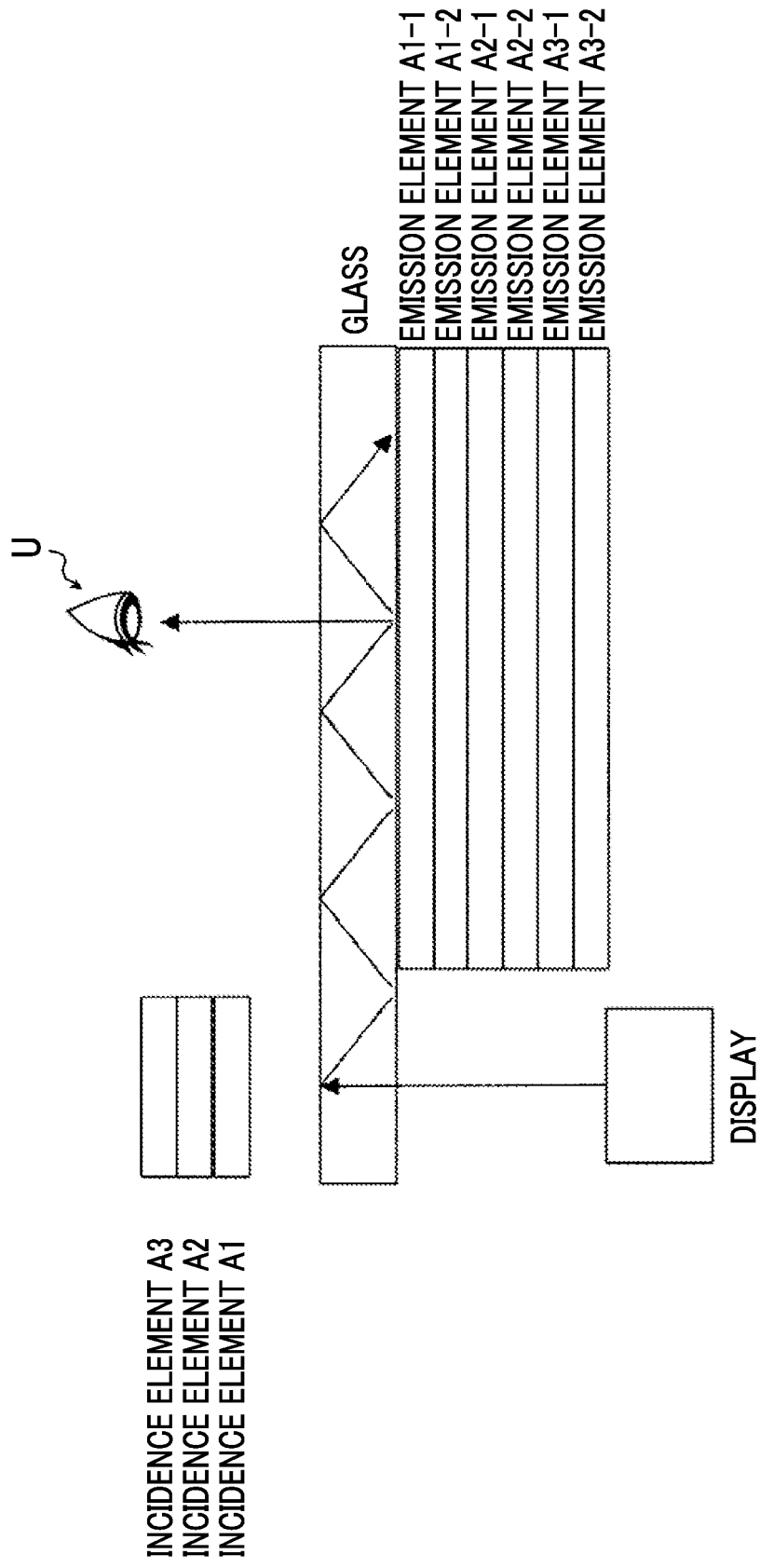

OPTICAL ELEMENT AND IMAGE DISPLAY APPARATUS

CROSS-REFERENCE TO RELATED APPLICATIONS

This application is a Continuation of PCT International Application No. PCT/JP2021/014150 filed on Apr. 1, 2021, which claims priority under 35 U.S.C § 119(a) to Japanese Patent Application No. 2020-067690 filed on Apr. 3, 2020, and Japanese Patent Application No. 2020-079512 filed on Apr. 28, 2020. Each of the above application(s) is hereby expressly incorporated by reference, in its entirety, into the present application.

BACKGROUND OF THE INVENTION

1. Field of the Invention

The present invention relates to an optical element in which light is incident, propagates, and is emitted and an image display apparatus including the optical element.

2. Description of the Related Art

Recently, as described in Bernard C. Kress et al., Towards the Ultimate Mixed Reality Experience: HoloLens Display Architecture Choices, SID 2017 DIGEST, pp. 127-131, augmented reality (AR) glasses that display a virtual image and various information or the like to be superimposed on a scene that is actually being seen have been put into practice. The AR glasses are also called, for example, smart glasses or a head-mounted display (HMD).

As described in Bernard C. Kress et al., Towards the Ultimate Mixed Reality Experience: HoloLens Display Architecture Choices, SID 2017 DIGEST, pp. 127-131, in AR glasses, for example, an image displayed by a display (optical engine) is incident into one end of a light guide plate, propagates in the light guide plate, and is emitted from another end of the light guide plate such that a virtual image is displayed to be superimposed on a scene that a user is actually seeing.

In AR glasses, light (projection light) projected from a display is diffracted (refracted) using a diffraction element to be incident into one end part of a light guide plate. As a result, the light is introduced into the light guide plate at an angle such that the light propagates in the light guide plate. The light propagated in the light guide plate is also diffracted by the diffraction element in the other end part of the light guide plate and is emitted from the light guide plate to an observation position by the user.

In addition, WO2017/180403A describes AR glasses where an image consisting of light components of three colors including red, green, and blue is emitted from a display, and each of the light components is diffracted by an incidence diffraction element to be incident into a light guide plate, propagates in the light guide plate, and is emitted from the light guide plate to an observation position of a user by an emission diffraction element such that the images of the three light components are superimposed on each other and are displayed. As a result, a color image can be displayed.

SUMMARY OF THE INVENTION

For the AR glasses, it is required that a wide region of an image displayed by a display can be observed without a user changing a visual line, that is, a field of view (FOV) is wide.

In addition, for the AR glasses, it is also required that the display region of the image is wide and the image can be observed irrespective of the visual line of the user, that is, an eye box is wide.

Accordingly, in the AR glasses described in WO2017/180403A, light that is incident from an incidence diffraction element and propagates in a light guide plate is further diffracted by an intermediate diffraction element, propagates in the light guide plate, and is emitted by an emission diffraction element.

In the AR glasses described in WO2017/180403A, an emission region of light from the emission diffraction element is expanded to expand the FOV and the eye box.

However, currently, it cannot be said that the FOV and the eye box of the AR glasses are sufficient, and appearance of AR glasses capable of realizing a wider FOV and a wider eye box is desired.

An object of the present invention is to solve the problem in the related art and to provide an optical element that is used for AR glasses or the like and can realize a wider FOV and a wider eye box and an image display apparatus including this optical element.

In order to achieve the object, the present invention has the following configurations.

[1] An optical element comprising:
a light guide plate;
an incidence portion that causes light to be incident into the light guide plate; and
an emission portion that emits light from the light guide plate,
wherein the incidence portion includes a plurality of incidence diffraction portions, the incidence diffraction portion includes one or more incidence diffraction elements, the emission portion includes a plurality of emission diffraction portions, and the emission diffraction portion includes one or more emission diffraction elements,
each of the incidence diffraction element and the emission diffraction element includes a liquid crystal diffraction layer that is formed of a composition including a liquid crystal compound,
the liquid crystal diffraction layer has a liquid crystal alignment pattern in which a direction of an optical axis derived from the liquid crystal compound changes while continuously rotating in at least one in-plane direction, and
in the liquid crystal alignment pattern, in a case where the at least one in-plane direction in which the optical axis derived from the liquid crystal compound changes while continuously rotating in is set as an in-plane rotation direction and a length over which the direction of the optical axis derived from the liquid crystal compound rotates by 180° in the in-plane rotation direction is set as an in-plane period,
the in-plane rotation directions of the liquid crystal diffraction layers in at least two of a plurality of the incidence diffraction elements are different from each other.

[2] The optical element according to [1],
in which the in-plane periods and the in-plane rotation directions of the liquid crystal diffraction layers in at least two of the plurality of incidence diffraction elements are different from each other, and
the in-plane periods of the liquid crystal diffraction layers in at least one of a plurality of the emission diffraction elements forming the emission diffraction portion and at least one of the plurality of incidence diffraction elements are the same.

[3] The optical element according to [1] or [2], in which the in-plane periods of the liquid crystal diffraction layers in at least two of a plurality of the emission diffraction elements are the same.

[4] The optical element according to any one of [1] to [3], in which the in-plane periods and the in-plane rotation directions of the liquid crystal diffraction layers in at least two of a plurality of the emission diffraction elements are different from each other.

[5] The optical element according to any one of [1] to [4], in which the incidence diffraction portion includes a plurality of the incidence diffraction elements, in at least two of the plurality of incidence diffraction elements, the in-plane periods of the liquid crystal diffraction layers are the same and the in-plane rotation directions are different from each other, the emission diffraction portion includes a plurality of the emission diffraction elements, and in at least two of the plurality of emission diffraction elements, the in-plane periods of the liquid crystal diffraction layers are the same and the in-plane rotation directions are different from each other.

[6] The optical element according to [5], in which in n incidence diffraction portions of the incidence portion and n emission diffraction portions of the emission portion, the number of combinations of the incidence diffraction portions and the emission diffraction portions where the in-plane period of the liquid crystal diffraction layer of the incidence diffraction element and the in-plane period of the liquid crystal diffraction layer of the emission diffraction element are the same is n, and n represents an integer of 1 or more.

[7] The optical element according to any one of [1] to [6], wherein at least one of the incidence diffraction portions includes two incidence diffraction elements, and in the at least one of the incidence diffraction portions that includes the two incidence diffraction elements, an angle between the in-plane rotation directions of the liquid crystal diffraction layers of the incidence diffraction elements is 90°.

[8] The optical element according to any one of [1] to [6], in which the incidence portion includes a plurality of the incidence diffraction portions each of which includes two incidence diffraction elements, and at least two of the incidence diffraction portions are the same and an angle between the in-plane rotation directions of the liquid crystal diffraction layers of the two incidence diffraction elements in the incidence diffraction portion is 45°.

[9] The optical element according to any one of [1] to [6], in which the incidence portion includes a plurality of the incidence diffraction portions each of which includes two incidence diffraction elements, and at least two of the incidence diffraction portions are the same and an angle between the in-plane rotation directions of the liquid crystal diffraction layers of the two incidence diffraction elements in the incidence diffraction portion is 90°.

[10] The optical element according to any one of [1] to [9], wherein at least one of the emission diffraction portions includes two emission diffraction elements, and in the at least one of the emission diffraction portions that includes the two emission diffraction elements, an angle between the in-plane rotation directions of the liquid crystal diffraction layers of the emission diffraction elements is 90°.

[11] The optical element according to any one of [1] to [9], in which the emission portion includes a plurality of the emission diffraction portions each of which includes two emission diffraction elements, and at least two of the emission diffraction portions are the same and an angle between the in-plane rotation directions of the liquid crystal diffraction layers of the two emission diffraction elements in the emission diffraction portion is 45°.

[12] The optical element according to any one of [1] to [9], in which the emission portion includes a plurality of the emission diffraction portions each of which includes two emission diffraction elements, and at least two of the emission diffraction portions are the same and an angle between the in-plane rotation directions of the liquid crystal diffraction layers of the two emission diffraction elements in the emission diffraction portion is 90°.

[13] The optical element according to any one of [1] to [12], in which the liquid crystal diffraction layer is a cholesteric liquid crystal layer obtained by immobilizing a cholesteric liquid crystalline phase.

[14] The optical element according to [13], in which in a cross-section of the cholesteric liquid crystal layer observed with a scanning electron microscope, bright portions and dark portions derived from the cholesteric liquid crystalline phase are tilted with respect to a main surface of the cholesteric liquid crystal layer, and in a case where an angle between the main surface of the cholesteric liquid crystal layer and the bright portions and the dark portions of the cross-section of the cholesteric liquid crystal layer is set as a tilt angle θ, the tilt angle θ has a region of 10° or more.

[15] The optical element according to [14], in which the cholesteric liquid crystal layer has a region where the tilt angle θ continuously increases in one thickness direction, and a difference between a maximum value and a minimum value of the tilt angle θ in the thickness direction is 10° or more.

[16] The optical element according to any one of [13] to [15], in which the incidence diffraction element includes two cholesteric liquid crystal layers where turning directions of circularly polarized light to be selectively reflected are different from each other.

[17] The optical element according to any one of [13] to [16], in which the emission portion includes two emission diffraction portions each of which includes two emission diffraction elements including the cholesteric liquid crystal layers where turning directions of circularly polarized light to be selectively reflected are the same, and in the two emission diffraction portions, turning directions of circularly polarized light to be selectively reflected by the cholesteric liquid crystal layers of the emission diffraction elements forming the respective emission diffraction portions are different from each other.

[18] The optical element according to [16] or [17], in which the in-plane rotation direction of the cholesteric liquid crystal layers where the turning directions of circularly polarized light to be selectively reflected are different are different by 180°.

[19] An image display apparatus comprising:
the optical element according to any one of [1] to [18]; and
a display element that emits an image to the incidence diffraction portion.

According to an aspect of the present invention, for example, in AR glasses, an image can be displayed with a wide FOV and a wide eye box.

BRIEF DESCRIPTION OF THE DRAWINGS

FIG. 14 is a conceptual diagram showing an emission portion of the optical element shown in FIG. 1.

FIG. 15 is a conceptual diagram showing an action of the emission portion of the optical element shown in FIG. 1.

FIG. 31 is a conceptual diagram showing Example 9.

DESCRIPTION OF THE PREFERRED EMBODIMENTS

Hereinafter, an optical element and an image display apparatus according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in this specification, the meaning of "all", "entire", or "entire surface" includes not only 100% but also a case where an error range is generally allowable in the technical field, for example, 99% or more, 95% or more, or 90% or more.

In the present specification, visible light refers to light having a wavelength which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, light in a wavelength range of 420 to 490 nm refers to blue light, light in a wavelength range of 495 to 570 nm refers to green light, and light in a wavelength range of 620 to 750 nm refers to red light.

Figure 1:
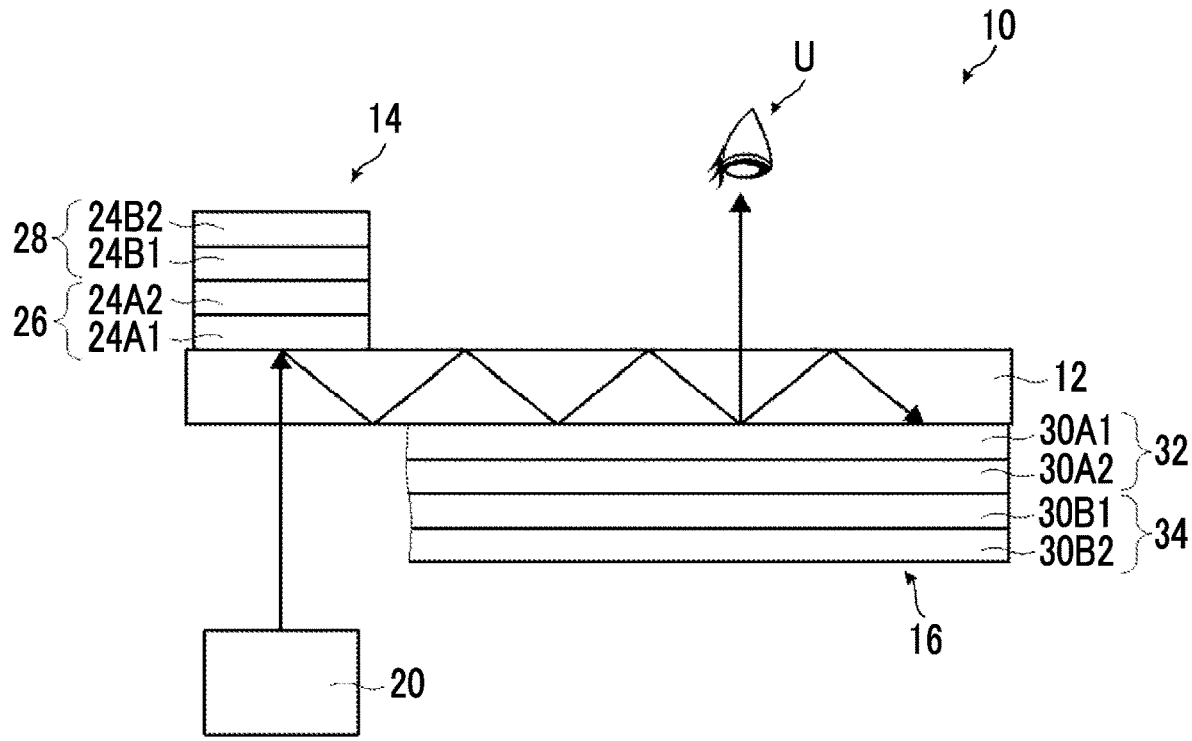
FIG. 1 is a diagram conceptually showing an example of an optical element according to the present invention.

FIG. 1 conceptually shows an example of the optical element and the image display apparatus according to the embodiment of the present invention.

Figure 2:
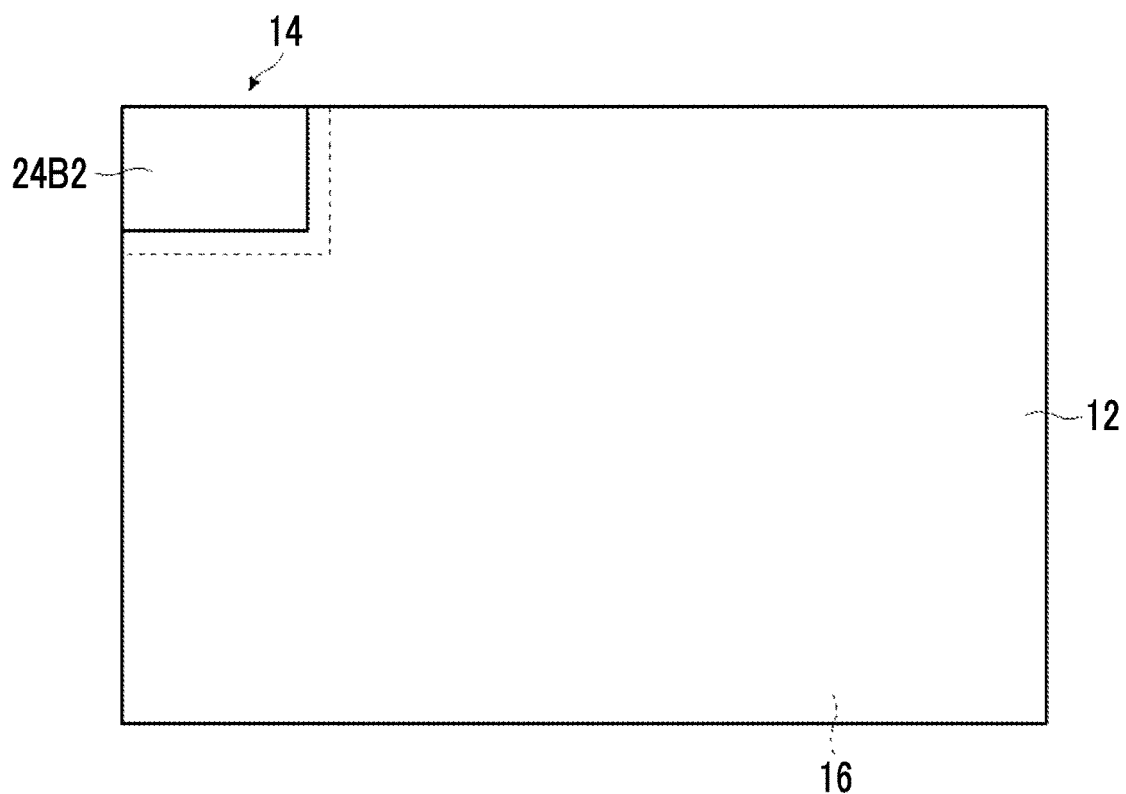
FIG. 2 is a diagram conceptually showing a plane of the optical element shown in FIG. 1.

FIG. 2 is a plan view conceptually showing the optical element shown in FIG. 1. FIG. 2 is a diagram showing the optical element shown in FIG. 1 in a case where the optical element is seen from an observation direction of an image by a user U shown in FIG. 1.

As shown in FIGS. 1 and 2, an optical element 10 includes: a light guide plate 12; an incidence portion 14 that includes incidence diffraction elements; and an emission portion 16 that includes emission diffraction elements.

In the optical element 10 in the example shown in the drawing, the incidence portion 14 is provided in one corner portion of a main surface of the rectangular light guide plate 12. The emission portion 16 is provided on another main surface of the light guide plate 12 to cover the entire surface of a region of the light guide plate 12 other than the incidence portion 14 in a plane direction. The main surface is the maximum surface of a sheet-shaped material (a plate-shaped material, a film, or a layer).

As shown in FIG. 1, in the image display apparatus shown in the example shown in the drawing, light that carries an image displayed by a display 20 is diffracted and reflected by the incidence portion 14 to be incident into the light guide plate 12. The light incident into the light guide plate 12 propagates in the light guide plate 12 and is emitted to the emission portion 16. The emission portion 16 diffracts and reflects the incident light to emit the light from the light guide plate 12 to an observation position by the user U.

In the example shown in the drawing, the incidence portion 14 is configured such that an incidence diffraction element 24A1, an incidence diffraction element 24A2, an incidence diffraction element 24B1, and an incidence diffraction element 24B2 are laminated in order from the light guide plate 12 side. The incidence diffraction element 24A1 and the incidence diffraction element 24A2 form a first incidence diffraction portion 26. In addition, the incidence diffraction element 24B1 and the incidence diffraction element 24B2 form a second incidence diffraction portion 28. The number of the incidence diffraction elements in the incidence diffraction portion may be one or three or more, and the number of the incidence diffraction portions in the incidence portion 14 may also be three or more.

On the other hand, the emission portion 16 is configured such that an emission diffraction element 30A1, an emission diffraction element 30A2, an emission diffraction element 30B1, and an emission diffraction element 30B2 are laminated in order from the light guide plate 12 side. The emission diffraction element 30A1 and the emission diffraction element 30A2 form a first emission diffraction portion 32. In addition, the emission diffraction element 30B1 and the emission diffraction element 30B2 form a second emission diffraction portion 34. The number of the emission diffraction elements in the emission diffraction portion may be three or more, and the number of the emission diffraction portions in the emission portion 16 may also be three or more.

In the example shown in the drawing, each of the incidence diffraction element and the emission diffraction element includes the liquid crystal diffraction layer. Therefore, in a preferable aspect, both of the incidence diffraction element and the emission diffraction element are reflective diffraction elements.

In the optical element 10 shown in the example shown in the drawing, the incidence diffraction element 24A1, the incidence diffraction element 24A2, the incidence diffraction element 24B1, the incidence diffraction element 24B2, the emission diffraction element 30A1, the emission diffraction element 30A2, the emission diffraction element 30B1, and the emission diffraction element 30B2 selectively reflects light in the same wavelength range.

Here, the image display apparatus including the optical element 10 according to the embodiment of the present invention may display a color image or a monochrome image.

In a case where the image display apparatus including the optical element 10 displays a monochrome image, each of the incidence diffraction element and the emission diffraction element includes a liquid crystal diffraction layer that selectively reflects light in a wavelength range of the corresponding color.

On the other hand, in a case where the image display apparatus including the optical element 10 displays a color image, Each of the incidence portion 14 and the emission portion 16 may reflect blue light, green light, and red light using one liquid crystal diffraction layer, may include a liquid crystal diffraction layer corresponding to each of blue light, green light, and red light, and may include a liquid crystal diffraction layer corresponding to two colors of blue light, green light, and red light and a liquid crystal diffraction layer corresponding to the remaining color.

Alternatively, in a case where the image display apparatus including the optical element 10 displays a color image, the image display apparatus may include an incidence portion and an emission portion for blue light, an incidence portion and an emission portion for green light, and an incidence portion and an emission portion for red light, or may include an incidence portion and an emission portion corresponding to two colors of blue light, green light, and red light and an incidence portion and an emission portion corresponding to the remaining color. In a case where the optical element 10 includes a plurality of incidence portions and a plurality of emission portions, the incidence portions and the emission portions may be disposed and laminated or may be disposed at different positions in a plane direction of the light guide plate 12.

In the optical element 10, the members that are laminated are optionally bonded to each other using an adhesive layer.

As long as it has a sufficient light-transmitting property, the bonding layer may be a layer formed of an adhesive that has fluidity during bonding and becomes a solid after bonding, a layer formed of a pressure sensitive adhesive that is a gel-like (rubber-like) flexible solid during bonding and of which the gel state does not change after bonding, or a layer formed of a material having characteristics of both the adhesive and the pressure sensitive adhesive. Accordingly, the bonding layer may be any well-known layer that is used for bonding a sheet-shaped material in an optical device or an optical element, for example, an optical clear adhesive (OCA), an optically transparent double-sided tape, or an ultraviolet curable resin.

Alternatively, instead of bonding the members using the bonding layer, the members may be held using a frame, a jig, or the like to form the optical element according to the embodiment of the present invention.

The image display apparatus including the optical element 10 according to the embodiment of the present invention may display a color image or a monochrome image.

In a case where a color image is displayed, each of the incidence portion 14 and the emission portion 16 reflects blue light, green light, and red light.

Hereinafter, each of the components forming the image display apparatus and the display element according to the embodiment of the present invention will be described.

[Display (Display Element)]

In the image display apparatus according to the embodiment of the present invention, the display 20 is not particularly limited. For example, various well-known displays used in AR glasses or the like can be used.

Examples of the display include a liquid crystal display (including Liquid Crystal On Silicon (LCOS)), an organic electroluminescent display, and a scanning type display employing a digital light processing (DLP) or Micro Electro Mechanical Systems (MEMS) mirror.

The display may display a color image or may display a monochrome image. In addition, in a case where the display device displays a color image, the display device may include three displays corresponding to a blue image, a green image, and a red image, respectively.

In the image display apparatus according to the embodiment of the present invention, optionally, a well-known projection lens used in AR glasses or the like may be provided between the display 20 and the light guide plate (incidence portion).

Here, in the image display apparatus according to the embodiment of the present invention, light to be emitted from the display 20 is not limited and is preferably unpolarized light (natural light) or circularly polarized light.

Optionally, depending on the polarization of light to be emitted from the display, a circularly polarizing plate consisting of a linear polarizer and a λ/4 plate, a λ/4 plate, or the like may be provided between the display 20 and the light guide plate 12.

[Light Guide Plate]

The light guide plate 12 is a well-known light guide plate that reflects light incident thereinto and propagates (guides) the reflected light.

As the light guide plate 12, various well-known light guide plates used for a backlight unit or the like of AR glasses or a liquid crystal display can be used without any particular limitation.

The refractive index of the light guide plate 12 is not particularly limited and is preferably high. Specifically, the refractive index of the light guide plate 12 is preferably 1.7 to 2.0 and more preferably 1.8 to 2.0. By adjusting the refractive index of the light guide plate 12 to be 1.7 to 2.0, an angle range where light can be totally reflected and propagate in the light guide plate 12 can be widened.

[Incidence Portion and Emission Portion]

The incidence portion 14 includes the first incidence diffraction portion 26 and the second incidence diffraction portion 28. The first incidence diffraction portion 26 includes the incidence diffraction element 24A1 and the incidence diffraction element 24A2. The second incidence diffraction portion 28 includes the incidence diffraction element 24B1 and the incidence diffraction element 24B2.

The emission portion 16 includes the first emission diffraction portion 32 and the second emission diffraction portion 34. The first emission diffraction portion 32 includes the emission diffraction element 30A1 and the emission diffraction element 30A2. The second emission diffraction portion 34 includes the emission diffraction element 30B1 and the emission diffraction element 30B2.

In the following description, the incidence diffraction element will also be referred to as the incidence element, and the emission diffraction element will also be referred to as the emission element.

Both of the incidence element and the emission element are reflective polarization diffraction elements. Specifically, in a preferable aspect, each of the incidence element and the emission element includes a cholesteric liquid crystal layer as a liquid crystal diffraction layer, and selectively reflects right circularly polarized light or left circularly polarized light.

As described above, the incidence element 24A1, the incidence element 24A2, the incidence element 24B1, the incidence element 24B2, the emission element 30A1, the emission element 30A2, the emission element 30B 1, and the emission element 30B2 selectively reflect light in the same wavelength range. That is, in the cholesteric liquid crystal layers forming the incidence element and the emission element, selective reflection wavelength ranges and selective reflection center wavelengths are the same.

Here, the incidence element 24A1, the incidence element 24A2, the incidence element 24B1, the incidence element 24B2, the emission element 30A1, the emission element 30A2, the emission element 30B1, and the emission element 30B2 have basically the same configuration, except that in-plane rotation directions and/or in-plane periods described below are different.

Accordingly, in the following description, in a case where the incidence element and the emission element do not need to be distinguished from each other, these diffraction elements will also be collectively referred to as "liquid crystal diffraction element".

(Liquid Crystal Diffraction Element)

The liquid crystal diffraction element will be described using FIGS. 3 to 5.

Figure 3:
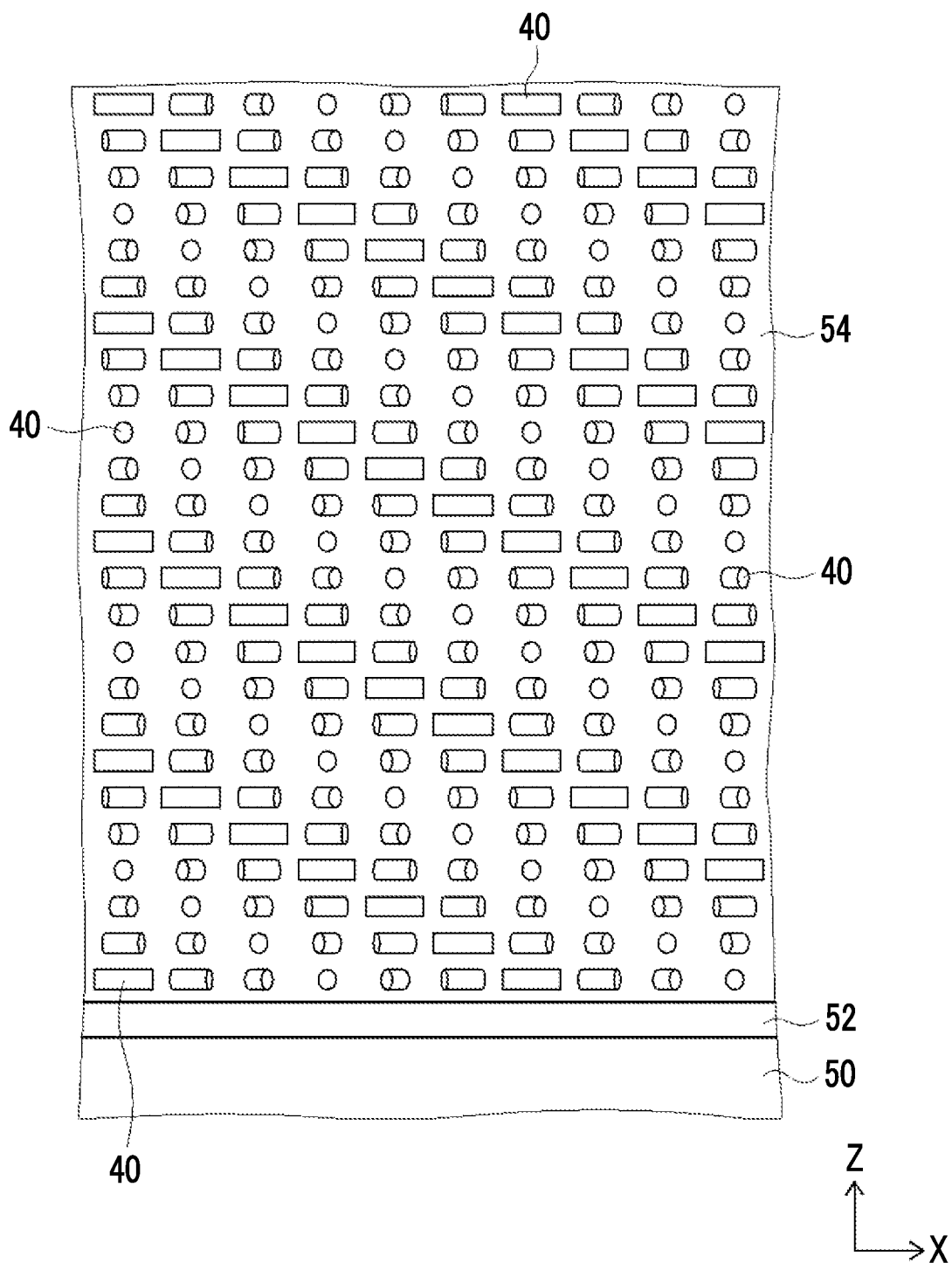
FIG. 3 is a diagram conceptually showing an example of a liquid crystal diffraction element.

FIG. 3 is a diagram conceptually showing a layer configuration of the liquid crystal diffraction element. As conceptually shown in FIG. 3, the liquid crystal diffraction element includes a support 50, an alignment film 52, and a cholesteric liquid crystal layer 54 as a liquid crystal diffraction layer that exhibits an action as a diffraction element.

Figure 4:
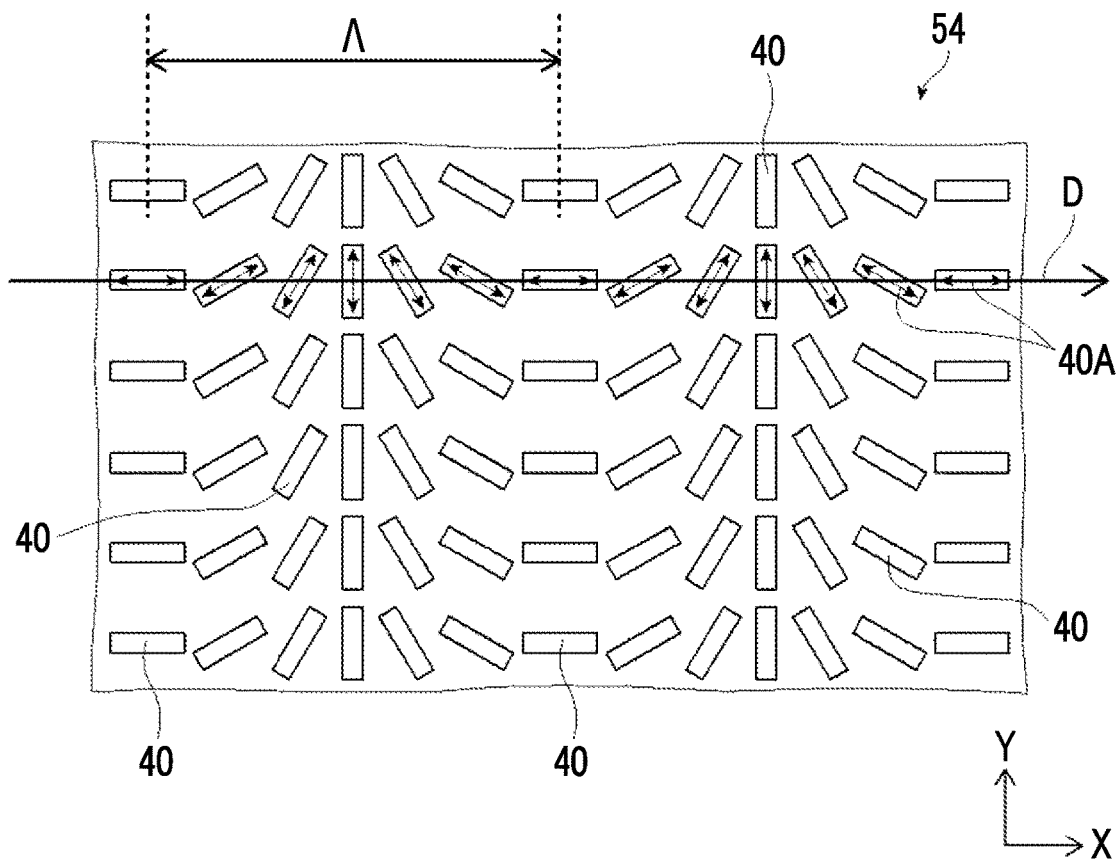
FIG. 4 is a plan view conceptually showing a liquid crystal layer of the liquid crystal diffraction element shown in FIG. 3.

FIG. 4 is a schematic diagram showing an alignment state of a liquid crystal compound in a plane of a main surface of the cholesteric liquid crystal layer 54.

In the following description, it is assumed that a main surface of the cholesteric liquid crystal layer 54 is an X-Y plane and a cross-section perpendicular to the X-Y plane is an X-Z plane. That is, FIG. 3 corresponds to a schematic diagram of the X-Z plane of the cholesteric liquid crystal layer 54, and FIG. 4 corresponds to a schematic diagram of the X-Y plane of the cholesteric liquid crystal layer 54.

Figure 5:
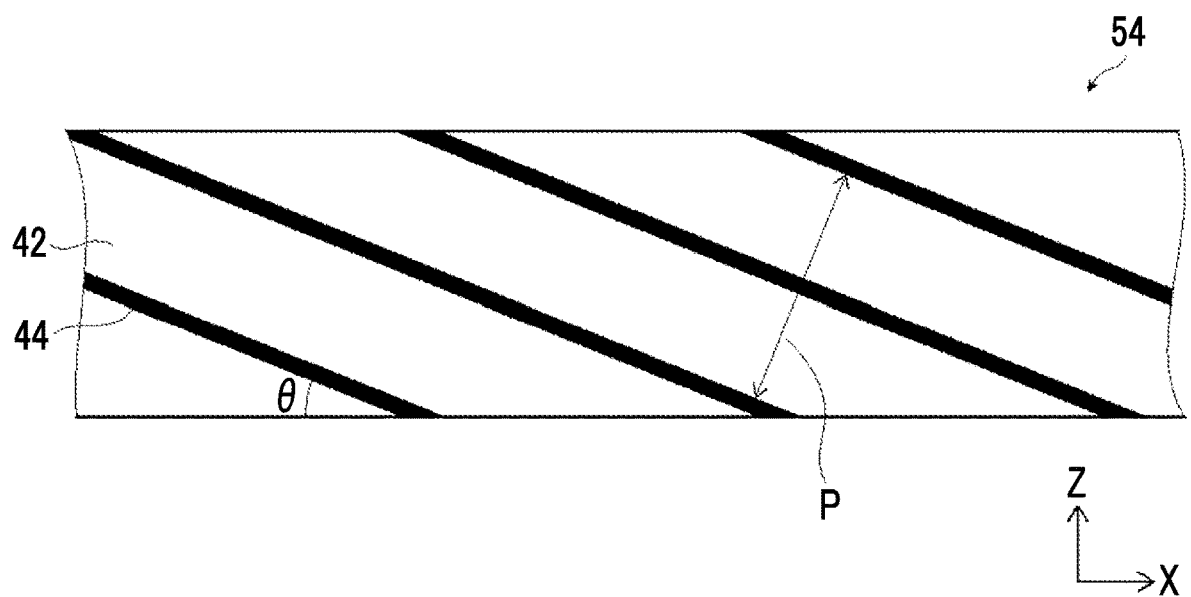
FIG. 5 is a diagram conceptually showing a cross-sectional scanning electron microscopic (SEM) image of the liquid crystal layer shown in FIG. 4.

As shown in FIGS. 3 to 5, the cholesteric liquid crystal layer 54 is a layer obtained by cholesteric alignment of a liquid crystal compound. In addition, FIGS. 3 to 5 show an example in which the liquid crystal compound forming the cholesteric liquid crystal layer is a rod-like liquid crystal compound.

In the following description, the cholesteric liquid crystal layer will also be referred to as "liquid crystal layer".

The liquid crystal diffraction element shown in FIG. 3 includes the support 50, the alignment film 52, and the liquid crystal layer 54. However, the present invention is not limited to this configuration. The liquid crystal diffraction element may include only the alignment film 52 and the liquid crystal layer 54 by peeling off the support 50 after bonding the laminate to the light guide plate 12 and the like. Alternatively, the liquid crystal diffraction element may include only the liquid crystal layer 54 by peeling off the support 50 and the alignment film 52 after bonding the laminate to the light guide plate 12 and the like.

<Support>

The support 50 supports the alignment film 52 and the liquid crystal layer 54.

As the support 50, various sheet-shaped materials (films or plate-shaped materials) can be used as long as they can support the alignment film 52 and the liquid crystal layer 54.

A transmittance of the support 50 with respect to corresponding light is preferably 50% or higher, more preferably 70% or higher, and still more preferably 85% or higher.

The thickness of the support 50 is not particularly limited and may be appropriately set depending on the use of the liquid crystal diffraction element, a material for forming the support 50, and the like in a range where the alignment film 52 and the liquid crystal layer 54 can be supported.

The thickness of the support 50 is preferably 1 to 2000 µm, more preferably 3 to 500 µm, and still more preferably 5 to 250 µm.

The support 50 may have a monolayer structure or a multi-layer structure.

In a case where the support 50 has a monolayer structure, examples thereof include supports formed of glass, triacetyl cellulose (TAC), polyethylene terephthalate (PET), polycarbonates, polyvinyl chloride, acryl, polyolefin, and the like. In a case where the support 50 has a multi-layer structure, examples thereof include a support including: one of the above-described supports having a monolayer structure that is provided as a substrate; and another layer that is provided on a surface of the substrate.

<Alignment Film>

In the liquid crystal diffraction element, the alignment film 52 is formed on a surface of the support 50.

The alignment film 52 is an alignment film for aligning the liquid crystal compound 40 to a predetermined liquid crystal alignment pattern during the formation of the liquid crystal layer 54.

Although described below, in the present invention, the liquid crystal layer 54 has a liquid crystal alignment pattern in which a direction of an optical axis 40A (refer to FIG. 4) derived from the liquid crystal compound 40 changes while continuously rotating in one in-plane direction. Accordingly, the alignment film 52 is formed such that the liquid crystal layer 54 can form the liquid crystal alignment pattern.

In the following description, "the direction of the optical axis 40A rotates" will also be simply referred to as "the optical axis 40A rotates".

As the alignment film 52, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as w-tricosanoic acid, dioctadecylmethylammonium chloride, or methyl stearate.

The alignment film 52 formed by a rubbing treatment can be formed by rubbing a surface of a polymer layer with paper or fabric in a given direction multiple times.

As the material used for the alignment film 52, for example, a material for forming polyimide, polyvinyl alcohol, a polymer having a polymerizable group described in JP1997-152509A (JP-H9-152509A), or an alignment film 52 such as JP2005-97377A, JP2005-99228A, and JP2005-128503A is preferable.

In the liquid crystal diffraction element, for example, the alignment film 52 can be suitably used as a so-called photo-alignment film obtained by irradiating a photo-alignment material with polarized light or non-polarized light. That is, in the liquid crystal diffraction element, a photo-alignment film that is formed by applying a photo-alignment material to the support 50 is suitably used as the alignment film 52.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the alignment film that can be used in the present invention include: an azo compound described in JP2006-285197A, JP2007-76839A, JP2007-138138A, JP2007-94071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitably used.

The thickness of the alignment film 52 is not particularly limited. The thickness with which a required alignment function can be obtained may be appropriately set depending on the material for forming the alignment film 52.

The thickness of the alignment film 52 is preferably 0.01 to 5 μm and more preferably 0.05 to 2 μm.

A method of forming the alignment film 52 is not limited. Any one of various well-known methods corresponding to a material for forming the alignment film 52 can be used. For example, a method including: applying the alignment film 52 to a surface of the support 50; drying the applied alignment film 52; and exposing the alignment film 52 to laser light to form an alignment pattern can be used.

Figure 9:
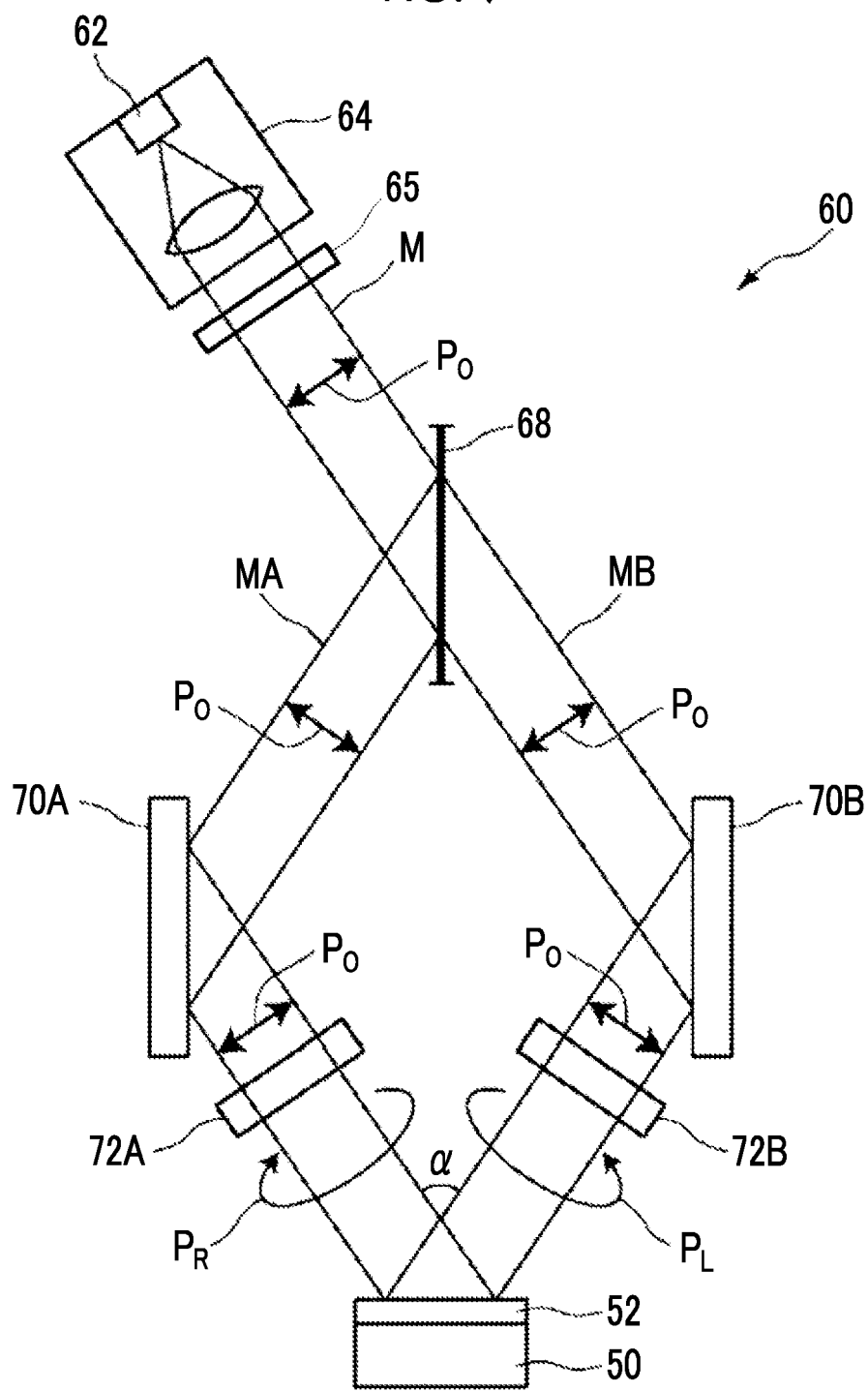
FIG. 9 is a conceptual diagram showing an example of an exposure device that exposes an alignment film.

FIG. 9 conceptually shows an example of an exposure device that exposes the alignment film 52 to form an alignment pattern.

An exposure device 60 shown in FIG. 9 includes: a light source 64 including a laser 62; a λ/2 plate 65 that changes a polarization direction of laser light M emitted from the laser 62; a polarization beam splitter 68 that splits the laser light M emitted from the laser 62 into two beams MA and MB; mirrors 70A and 70B that are disposed on optical paths of the split two beams MA and MB; and λ/4 plates 72A and 72B.

The light source 64 emits linearly polarized light $P_O$. The λ/4 plate 72A converts the linearly polarized light $P_O$ (beam MA) into right circularly polarized light $P_R$, and the λ/4 plate 72B converts the linearly polarized light $P_O$ (beam MB) into left circularly polarized light $P_L$.

The support 50 including the alignment film 52 on which the alignment pattern is not yet formed is disposed at an exposed portion, the two beams MA and MB intersect and interfere with each other on the alignment film 52, and the alignment film 52 is irradiated with and exposed to the interference light.

Due to the interference in this case, the polarization state of light with which the alignment film 52 is irradiated periodically changes according to interference fringes. As a result, an alignment film having an alignment pattern in which the alignment state periodically changes can be obtained. In the following description, this alignment film having the alignment pattern will also be referred to as "patterned alignment film".

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 40A derived from the liquid crystal compound 40 continuously rotates in the one in-plane direction, the length of the single period over which the optical axis 40A rotates by 180° in the one in-plane direction in which the optical axis 40A rotates can be adjusted.

By forming the cholesteric liquid crystal layer on the alignment film 52 having the alignment pattern in which the alignment state periodically changes, as described below, the liquid crystal layer 54 having the liquid crystal alignment pattern in which the optical axis 40A derived from the liquid crystal compound 40 continuously rotates in the one in-plane direction can be formed.

In addition, by rotating the optical axes of the λ/4 plates 72A and 72B by 90°, respectively, the rotation direction of the optical axis 40A can be reversed.

As described above, the patterned alignment film has a liquid crystal alignment pattern in which the liquid crystal compound is aligned such that the direction of the optical axis of the liquid crystal compound in the liquid crystal layer formed on the patterned alignment film changes while continuously rotating in at least one in-plane direction.

In a case where an axis in the direction in which the liquid crystal compound is aligned is an alignment axis, it can be said that the patterned alignment film has an alignment pattern in which the direction of the alignment axis changes while continuously rotating in at least one in-plane direction. The alignment axis of the patterned alignment film can be detected by measuring absorption anisotropy. For example, in a case where the amount of light transmitted through the patterned alignment film is measured by irradiating the patterned alignment film with linearly polarized light while rotating the patterned alignment film, it is observed that a direction in which the light amount is the maximum or the minimum gradually changes in the one in-plane direction.

In the present invention, the alignment film 52 is provided as a preferable aspect and is not an essential component.

For example, the following configuration can also be adopted, in which, by forming the alignment pattern on the support 50 using a method of rubbing the support 50, a method of processing the support 50 with laser light or the like, the liquid crystal layer has the liquid crystal alignment pattern in which the direction of the optical axis 40A derived from the liquid crystal compound 40 changes while continuously rotating in at least one in-plane direction. That is, in the present invention, the support 50 may be made to function as the alignment film.

<Liquid Crystal Layer (Cholesteric Liquid Crystal Layer)>

In the liquid crystal diffraction element, the liquid crystal layer 54 is formed on a surface of the alignment film 52.

The liquid crystal layer 54 is a cholesteric liquid crystal layer that is obtained by immobilizing a cholesteric liquid crystalline phase and has a liquid crystal alignment pattern in which a direction of an optical axis derived from a liquid crystal compound changes while continuously rotating in at least one in-plane direction.

As conceptually shown in FIG. 3, the liquid crystal layer 54 has a helical structure in which the liquid crystal compound 40 is helically turned and laminated as in a cholesteric liquid crystal layer obtained by immobilizing a typical cholesteric liquid crystalline phase. In the helical structure, a configuration in which the liquid crystal compound 40 is helically rotated once (rotated by 360°) and laminated is set as one helical pitch (helical pitch P), and plural pitches of the helically turned liquid crystal compound 40 are laminated.

As is well known, the cholesteric liquid crystalline phase exhibits selective reflectivity with respect to left or circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

For example, in the liquid crystal layer 54 that selectively reflects right circularly polarized light, the helical twisted direction of the cholesteric liquid crystalline phase is the right direction.

The turning direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection wavelength range (circularly polarized light reflection wavelength range) where selective reflection is exhibited depends on $\Delta n$ of the cholesteric liquid crystalline phase and the helical pitch P and satisfies a relationship of $\Delta\lambda=\Delta n \times P$. Therefore, the width of the selective reflection wavelength range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

Accordingly, regarding the wavelength of light that is reflected (diffracted) by the liquid crystal diffraction element, the selective reflection wavelength range of the liquid crystal layer 54 may be set, for example, by adjusting the helical pitch P of the liquid crystal layer 54 according to each of the liquid crystal diffraction elements.

The half-width of the reflection wavelength range is adjusted depending on the application of the optical element 10 and may be, for example, 10 to 500 nm and is preferably 20 to 300 nm and more preferably 30 to 100 nm.

As shown in FIG. 4, in the X-Y plane of the liquid crystal layer 54, the liquid crystal compounds 40 are arranged along a plurality of arrangement axes D parallel to the X-Y plane. On each of the arrangement axes D, the direction of the optical axis 40A of the liquid crystal compound 40 changes while continuously rotating in the one in-plane direction along the arrangement axis D. In the example shown in the drawing, the optical axis 40A rotates counterclockwise in the arrangement axis D. That is, the direction of the arrangement axis D (that is, the X direction) is the in-plane rotation direction in the present invention.

Here, for the convenience of description, it is assumed that the arrangement axis D is directed to the X direction. In addition, in the Y direction, the liquid crystal compounds 40 in which the directions of the optical axes 40A are the same are arranged at regular intervals.

"The direction of the optical axis 40A of the liquid crystal compound 40 changes while continuously rotating in the one in-plane direction along the arrangement axis D" represents that angles between the optical axes 40A of the liquid crystal compounds 40 and the arrangement axes D vary depending on positions in the arrangement axis D direction and gradually change from θ to θ+180° or θ−180° along the arrangement axis D. That is, in each of the plurality of liquid crystal compounds 40 arranged along the arrangement axis D, as shown in FIG. 4, the optical axis 40A changes along the arrangement axis D while rotating on a given angle basis.

A difference between the angles of the optical axes 40A of the liquid crystal compounds 40 adjacent to each other in the arrangement axis D direction is preferably 45° or less, more preferably 15° or less, and still more preferably less than 15°.

In addition, in the present specification, in a case where the liquid crystal compound 40 is a rod-like liquid crystal compound, the optical axis 40A of the liquid crystal compound 40 refers to a molecular major axis of the rod-like liquid crystal compound. On the other hand, in a case where the liquid crystal compound 40 is a disk-like liquid crystal compound, the optical axis 40A of the liquid crystal compound 40 refers to an axis parallel to the normal direction with respect to a disc plane of the disk-like liquid crystal compound.

In the liquid crystal layer 54, in the liquid crystal alignment pattern of the liquid crystal compound 40, the length (distance) over which the optical axis 40A of the liquid crystal compound 40 rotates by 180° in the arrangement axis D direction in which the optical axis 40A changes while continuously rotating in a plane, that is, the length Λ of the single period in the liquid crystal alignment pattern is set as the in-plane period Λ.

That is, a distance between centers of two liquid crystal compounds 40 in the arrangement axis D direction is the in-plane period Λ, the two liquid crystal compounds having the same angle in the arrangement axis D direction. Specifically, as shown in FIG. 4, a distance between centers in the arrangement axis D direction of two liquid crystal compounds 40 in which the arrangement axis D direction and the direction of the optical axis 40A match each other is the in-plane period Λ.

In the liquid crystal alignment pattern of the liquid crystal layer 54, the in-plane period Λ is repeated in the arrangement axis D direction, that is, in the one in-plane direction in which the direction of the optical axis 40A changes while continuously rotating. In the liquid crystal diffraction element, the in-plane period Λ is the period of the diffraction structure.

On the other hand, in the liquid crystal compound 40 forming the liquid crystal layer 54, the directions of the optical axes 40A are the same in the direction (in FIG. 4, the Y direction) perpendicular to the arrangement axis D direction, that is, the Y direction perpendicular to the one in-plane direction in which the optical axis 40A continuously rotates.

In other words, in the liquid crystal compound 40 forming the liquid crystal layer 54, angles between the optical axes 40A of the liquid crystal compound 40 and the arrangement axis D (X direction) are the same in the Y direction.

In a case where a cross-section of the cholesteric liquid crystal layer in a thickness direction is observed with a scanning electron microscope (SEM), a stripe pattern where bright portions and dark portions derived from a cholesteric liquid crystalline phase are alternately provided is observed.

Here, in a case where an X-Z plane of the liquid crystal layer 54 shown in FIG. 3, that is, a cross-section in the thickness direction is observed with an SEM, a stripe pattern in which bright portions 42 and dark portions 44 are tilted at a predetermined tilt angle θ with respect to the main surface (X-Y plane) as shown in FIG. 5 is observed.

This tilt angle θ is not particularly limited and is preferably 10° or more and more preferably 20° or more.

It is preferable that the tilt angle θ is 10° or more from the viewpoint of obtaining a high diffraction efficiency at a large diffraction angle.

In this SEM cross-section, an interval between the bright portions 42 adjacent to each other or between the dark portions 44 adjacent to each other in a normal direction of lines formed by the bright portions 42 or the dark portions 44 corresponds to a ½ pitch. That is, as indicated by P in FIG. 5, two bright portions 42 and two dark portions 44 correspond to one helical pitch (one helical turn), that is, the helical pitch P.

Hereinafter, an action of diffraction of the liquid crystal layer will be described.

In a cholesteric liquid crystal layer of the related art, a helical axis derived from a cholesteric liquid crystalline phase is perpendicular to the main surface (X-Y plane), and a reflecting surface thereof is parallel to the main surface (X-Y plane). In addition, the optical axis of the liquid crystal compound is not tilted with respect to the main surface (X-Y plane). In other words, the optical axis is parallel to the main surface (X-Y plane). Accordingly, in a case where the X-Z plane of the cholesteric liquid crystal layer in the related art is observed with an SEM, an arrangement direction in which bright portions and dark portions are alternately arranged is perpendicular to the main surface (X-Y plane).

The cholesteric liquid crystalline phase has specular reflectivity. Therefore, in a case where light is incident from the normal direction into the cholesteric liquid crystal layer, the light is reflected in the normal direction.

Figure 6:
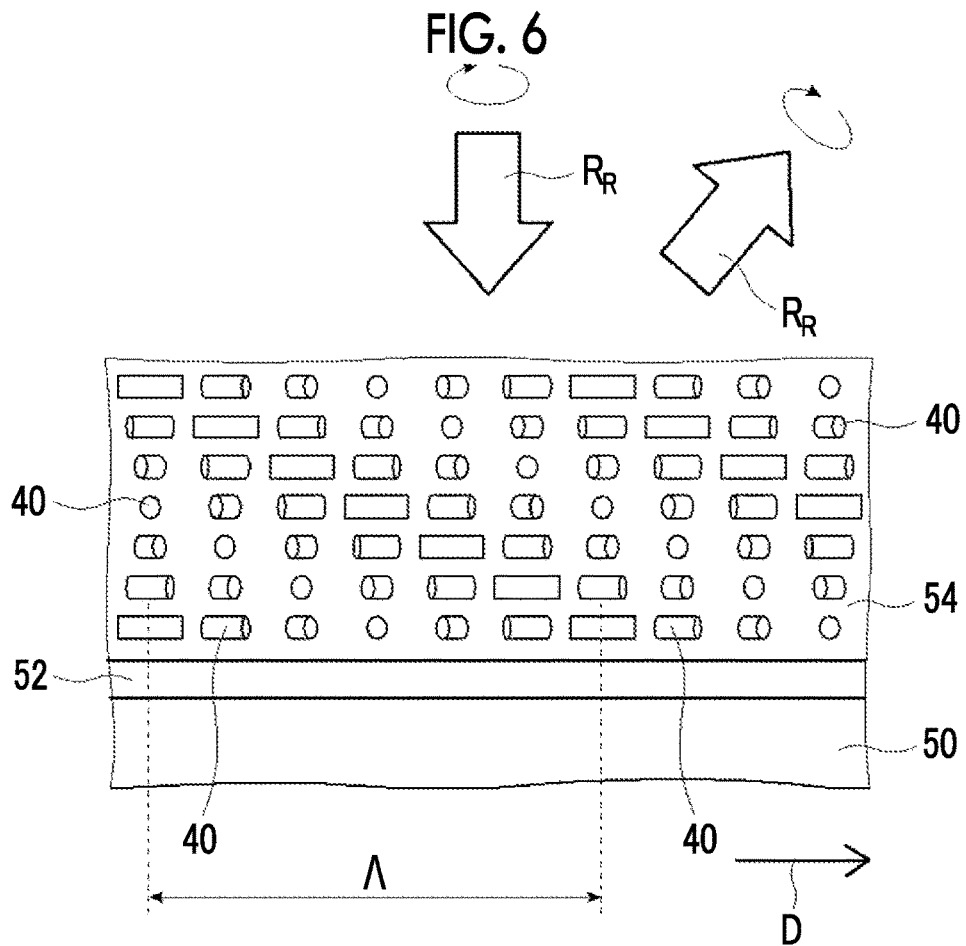
FIG. 6 is a conceptual diagram showing an action of the liquid crystal layer shown in FIG. 4.

On the other hand, the liquid crystal layer 54 reflects incident light in a state where it is tilted in the arrangement axis D direction with respect to the specular reflection. The liquid crystal layer 54 has the liquid crystal alignment pattern in which the optical axis 40A changes while continuously rotating in the arrangement axis D direction in a plane (the predetermined one in-plane direction). Hereinafter, the description will be made with reference to FIG. 6.

For example, it is assumed that the liquid crystal layer 54 is a cholesteric liquid crystal layer that selectively reflects right circularly polarized light $R_R$ of red light. Accordingly, in a case where light is incident into the liquid crystal layer 54, the liquid crystal layer 54 reflects only right circularly polarized light $R_R$ of red light and allows transmission of the other light.

Here, in the liquid crystal layer 54, the optical axis 40A of the liquid crystal compound 40 changes while rotating in the arrangement axis D direction (the one in-plane direction).

The liquid crystal alignment pattern formed in the liquid crystal layer 54 is a pattern that is periodic in the arrangement axis D direction. Therefore, as conceptually shown in FIG. 6, the right circularly polarized light $R_R$ of red light incident into the liquid crystal layer 54 is reflected (diffracted) in a direction corresponding to the period of the liquid crystal alignment pattern, and the reflected right circularly polarized light $R_R$ of red light is reflected (diffracted) in a direction tilted with respect to the XY plane (the main surface of the cholesteric liquid crystal layer) in the arrangement axis D direction.

As a result, in a case where the liquid crystal layer 54 is applied to an optical element or the like, the liquid crystal layer 54 can be used as a diffraction element in which light incident from a direction perpendicular to the main surface of the light guide plate can be reflected (diffracted) at an angle at which total reflection occurs in the light guide plate and the light guided in the light guide plate by total reflection can be reflected (diffracted) in a direction perpendicular to the main surface of the light guide plate.

In the liquid crystal layer 54, by appropriately setting the arrangement axis D direction as the one in-plane direction in which the optical axis 40A rotates, the reflection direction (diffraction angle) of light can be adjusted.

For example, in a case where circularly polarized light having the same wavelength and the same turning direction is reflected, by reversing the arrangement axis D direction, a reflection direction of the circularly polarized light can be reversed.

Further, in the liquid crystal layer having the same liquid crystal alignment pattern, the reflection direction is reversed by adjusting the helical turning direction of the liquid crystal compound 40, that is, the turning direction of circularly polarized light to be reflected.

For example, in a case where the helical turning direction is right-twisted, the liquid crystal layer selectively reflects right circularly polarized light, and has the liquid crystal alignment pattern in which the optical axis 40A rotates counterclockwise in the arrangement axis D direction. As a result, the right circularly polarized light is reflected in a state where it is tilted in the arrangement axis D direction.

In addition, for example, in a case where the helical turning direction is left-twisted, the liquid crystal layer selectively reflects left circularly polarized light, and has the liquid crystal alignment pattern in which the optical axis 40A rotates counterclockwise in the arrangement axis D direction. As a result, the left circularly polarized light is reflected in a state where it is tilted in a direction opposite to the arrangement axis D direction.

That is, in the liquid crystal layers where the helical turning directions are opposite to each other, the arrangement axis D directions are adjusted to be opposite to each other, that is, to be different by 180°, light can be tilted and reflected in the same direction.

As described above, in the liquid crystal diffraction element, in the liquid crystal alignment pattern of the liquid crystal compound in the liquid crystal layer, the in-plane period Λ as the length over which the optical axis of the liquid crystal compound rotates by 180° is the period (single period) of the diffraction structure. In addition, in the liquid crystal layer, the one in-plane direction (arrangement axis D direction) in which the optical axis of the liquid crystal compound changes while rotating, that is, the in-plane rotation direction is the periodic direction of the diffraction structure.

In the optical element 10 according to the embodiment of the present invention, the length of the in-plane period Λ of the liquid crystal diffraction element is not particularly limited, and may be appropriately adjusted depending on the incidence angle into the light guide plate 12, the size of diffraction of light for emitting the light from the light guide plate 12, and the like.

The length of the single period of the liquid crystal diffraction element is preferably 0.1 μm to 10 μm, more preferably 0.1 μm to 1 μm, and still more preferably a wavelength λ or less of incident light from the viewpoint of propagating light in the light guide plate 12 by total reflection.

In the liquid crystal layer having the liquid crystal alignment pattern, as the in-plane period Λ decreases, the angle of reflected light with respect to the incidence light increases. That is, as the in-plane period Λ decreases, reflected light can be reflected in a state where it is largely tilted with respect to incidence light.

In addition, in the liquid crystal layer having the liquid crystal alignment pattern, the reflection angle (diffraction angle) of light varies depending on the wavelength of light to be reflected. Specifically, as the wavelength of light increases, the angle of reflected light with respect to incidence light increases.

In the example shown in FIG. 3, a configuration in which, on the X-Z plane of the liquid crystal layer 54, the optical axes 40A of the liquid crystal compound 40 is aligned to be parallel with respect to the main surface (X-Y plane) is adopted.

However, the present invention is not limited to this configuration. For example, as conceptually shown in FIG. 7, a configuration in which, on the X-Z plane of the liquid crystal layer 54, the optical axes 40A of the liquid crystal compound 40 is aligned to be tilted with respect to the main surface (X-Y plane) may be adopted.

Figure 7:
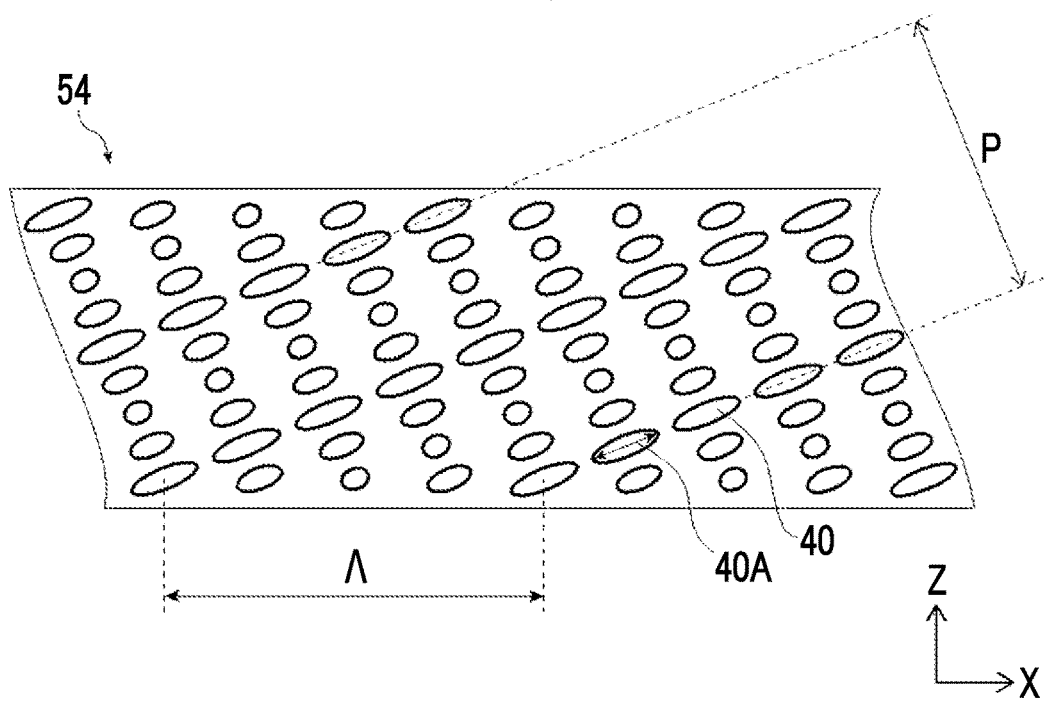
FIG. 7 is a diagram conceptually showing another example of the liquid crystal layer used in the liquid crystal diffraction element.

In addition, the example shown in FIG. 7 shows the configuration in which, on the X-Z plane of the liquid crystal layer 54, the tilt angle of the liquid crystal compound 40 with respect to the main surface (X-Y plane) is uniform in the thickness direction (Z direction). However, the present invention is not limited to this configuration. In the liquid crystal layer 54, a region where the tilt angle of the liquid crystal compound 40 varies in the thickness direction may be provided.

Figure 8:
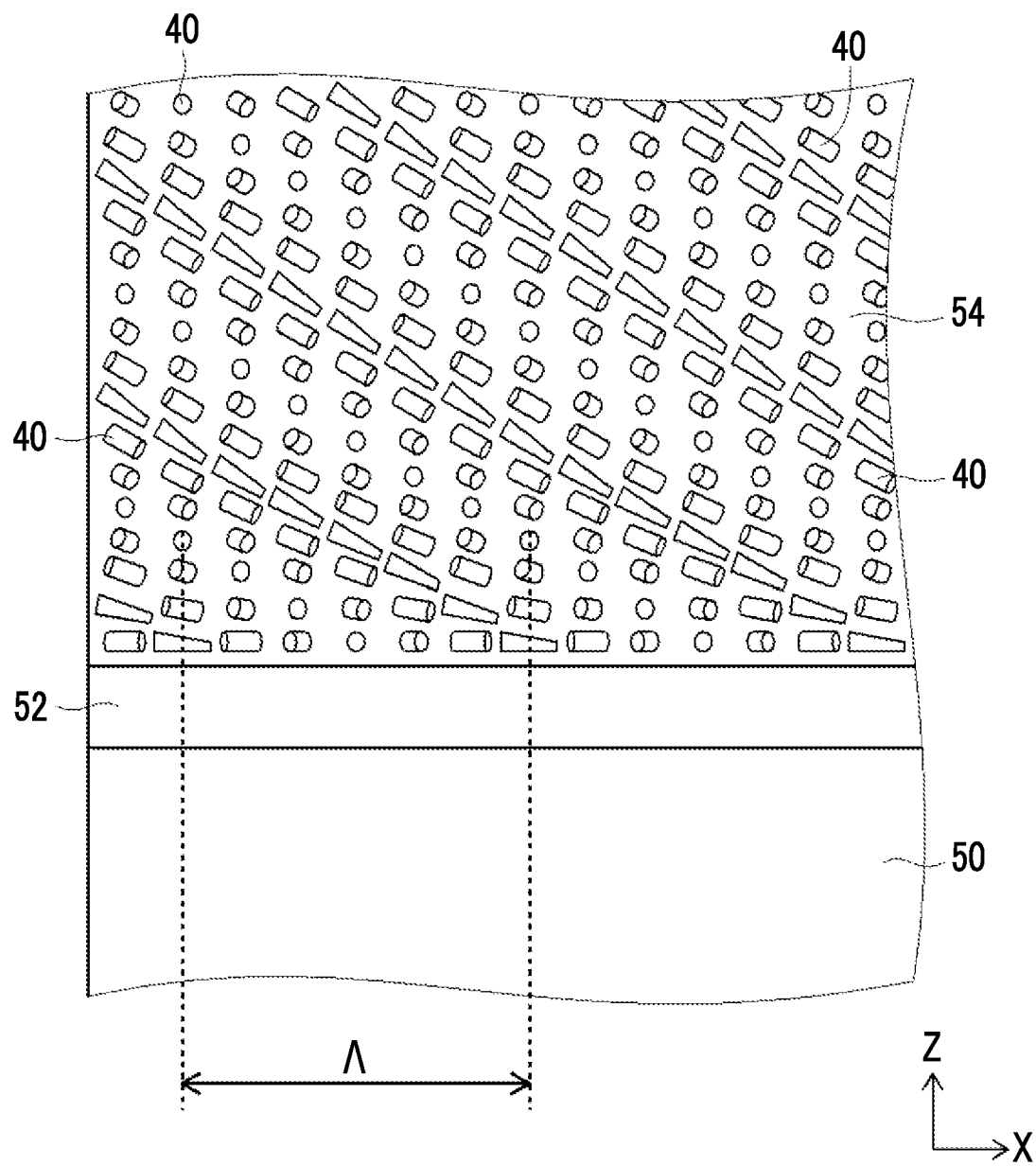
FIG. 8 is a diagram conceptually showing another example of the liquid crystal layer used in the liquid crystal diffraction element.

For example, in an example shown in FIG. 8, the optical axis 40A of the liquid crystal compound 40 at an interface of the liquid crystal layer on the alignment film 52 side is parallel to the main surface (the pretilt angle is 0°), the tilt angle of the liquid crystal compound 40 increases in a direction away from the interface on the alignment film 52 side to the thickness direction, and the liquid crystal compound is aligned at a given tilt angle on another interface (air interface).

In the cross-section of the liquid crystal layer 54 shown in FIG. 8 observed with an SEM, as the angle of the bright portions and the dark portions derived from the cholesteric liquid crystalline phase with respect to the main surface, that is, the tilt angle θ (refer to FIG. 5) gradually increases as the distance from the interface on the alignment film 52 side increases in the thickness direction.

In this liquid crystal layer 54, the helical pitch P of the cholesteric liquid crystalline phase changes in the thickness direction. That is, in the liquid crystal layer 54, the helical pitch P gradually increases as the distance from the interface on the alignment film 52 side increases in the thickness direction.

As described above, the wavelength of light to be selectively reflected by the liquid crystal layer 54 (cholesteric liquid crystalline phase) varies depending on the helical pitch, and as the helical pitch P increases, the wavelength of light to be selectively reflected increases. Accordingly, in the liquid crystal layer 54 shown in FIG. 8 where the tilt angle θ gradually increases as the distance from the interface on the alignment film 52 side increases in the thickness direction, light in a wide wavelength range can be reflected.

In the liquid crystal layer 54 shown in FIG. 8 where the tilt angle θ gradually increases as the distance from the interface on the alignment film 52 side increases in the thickness direction, it is preferable that the tilt angle θ has a region of 10° or more.

In the liquid crystal layer 54, it is preferable that the tilt angle θ has a region of 10° or more from the viewpoint of obtaining a large diffraction angle with a high diffraction efficiency.

In this liquid crystal layer 54, it is more preferable that the tilt angle θ has a region of 20° or more, and it is still more preferable that the tilt angle θ has a region of 30° or more.

In addition, in the liquid crystal layer 54 where the tilt angle θ gradually increases as the distance from the interface on the alignment film 52 side increases in the thickness direction, it is also preferable that a difference between a maximum value and a minimum value of the tilt angle θ is 10° or more.

It is preferable that the difference between the maximum value and the minimum value of the tilt angle θ is 10° or more from the viewpoints that the diffraction angle of light can increase and the wavelength range of light to be selectively reflected from the liquid crystal layer 54 can be widened.

In the liquid crystal layer 54, the difference between the maximum value and the minimum value of the tilt angle θ is more preferably 15° or more and still more preferably 20° or more.

This way, the liquid crystal layer 54 may have a configuration in which the optical axis of the liquid crystal compound has a pretilt angle at one interface among the upper and lower interfaces or may have a pretilt angle at both of the interfaces. In addition, the pretilt angles at both of the interfaces may be different from each other.

The liquid crystal compound has the tilt angle (is tilted). As a result, in a case where light is diffracted, the effective birefringence index of the liquid crystal compound increases, and the diffraction efficiency can be improved.

The average angle (average tilt angle) between the optical axis 40A of the liquid crystal compound 40 and the main surface (X-Y plane) is preferably 5° to 80° and more preferably 10° to 50°. The average tilt angle can be measured by observing the X-Z plane of the liquid crystal layer 54 with a polarization microscope. In particular, it is preferable that, on the X-Z plane of the liquid crystal layer 54, the optical axis 40A of the liquid crystal compound 40 is aligned to be tilted with respect to the main surface (X-Y plane) in the same direction.

In a case where the cross-section of the cholesteric liquid crystal layer is observed with a polarization microscope, the tilt angle is a value obtained by measuring the angle between the optical axis 40A of the liquid crystal compound 40 and the main surface at any five or more positions and obtaining the average value thereof.

Light that is vertically incident into the liquid crystal diffraction element (liquid crystal layer 54) travels obliquely in an oblique direction in the liquid crystal layer along with a bending force. In a case where light travels in the liquid crystal layer, diffraction loss is generated due to a deviation from conditions such as a diffraction period that are set to obtain a desired diffraction angle with respect to the vertically incident light.

In a case where the liquid crystal compound is tilted, an orientation in which a higher birefringence index is generated than that in an orientation in which light is diffracted as compared to a case where the liquid crystal compound is not tilted is present. In this direction, the effective extraordinary light refractive index increases, and thus the birefringence index as a difference between the extraordinary light refractive index and the ordinary light refractive index increases.

By setting the orientation of the tilt angle according to the desired diffraction orientation, a deviation from the original diffraction conditions in the orientation can be suppressed. As a result, it is presumed that, in a case where the liquid crystal compound having a tilt angle is used, a higher diffraction efficiency can be obtained.

In addition, it is preferable that the tilt angle is controlled by treating the interface of the liquid crystal layer 54.

By pretilting the alignment film on the support side interface, the tilt angle of the liquid crystal compound can be controlled. For example, by exposing the alignment film to ultraviolet light from the front and subsequently obliquely exposing the alignment film during the formation of the alignment film, the liquid crystal compound in the liquid crystal layer formed on the alignment film can be made to have a pretilt angle. In this case, the liquid crystal compound is pretilted in a direction in which the single axis side of the liquid crystal compound can be seen with respect to the second irradiation direction. Since the liquid crystal compound having an orientation in a direction perpendicular to the second irradiation direction is not pretilted, a region where the liquid crystal compound is pretilted and a region where the liquid crystal compound is not pretilted are present in a plane. This configuration is suitable for improving the diffraction efficiency because it contributes to the most improvement of birefringence in the desired direction in a case where light is diffracted in the direction.

Further, an additive for promoting the pretilt angle can also be added to the liquid crystal layer or to the alignment film. In this case, the additive can be used as a factor for further improving the diffraction efficiency.

This additive can also be used for controlling the pretilt angle on the air side interface.

Here, in a cross-section of the liquid crystal layer 54 observed with an SEM, the bright portions and the dark portions derived from a cholesteric liquid crystalline phase are tilted with respect to the main surface. In the liquid crystal layer, it is preferable that, in a case where an in-plane retardation Re is measured from a normal direction and a direction tilted with respect to a normal line, a direction in which the in-plane retardation Re is minimum in any one of a slow axis plane or a fast axis plane is tilted from the normal direction. Specifically, it is preferable that an absolute value of the measured angle between the direction in which the in-plane retardation Re is minimum and the normal line is 5° or more. In other words, it is preferable that the liquid crystal compound of the liquid crystal layer is tilted with respect to the main surface and the tilt direction substantially matches the bright portions and the dark portions of the liquid crystal layer. The normal direction is a direction perpendicular to the main surface.

By the liquid crystal layer having the above-described configuration, circularly polarized light can be diffracted with a higher diffraction efficiency than the liquid crystal layer in which the liquid crystal compound is parallel to the main surface.

In the configuration in which the liquid crystal compound of the liquid crystal layer is tilted with respect to the main surface and the tilt direction substantially matches the bright portions and the dark portions, bright portions and dark portions corresponding to a reflecting surface matches the optical axis of the liquid crystal compound. Therefore, the action of the liquid crystal compound on light reflection (diffraction) increases, the diffraction efficiency can be improved. As a result, the amount of reflected light with respect to incidence light can be further improved.

In the fast axis plane or the slow axis plane of the liquid crystal layer, the absolute value of the tilt angle of the optical axis of the liquid crystal layer is preferably 5° or more, more preferably 15° or more, and still more preferably 20° or more.

It is preferable that the absolute value of the tilt angle of the optical axis is 15° or more from the viewpoint that the direction of the liquid crystal compound matches the bright portions and the dark portions more suitably such that the diffraction efficiency can be improved.

Further, the liquid crystal layer 54 may be a layer where, even in a case where the tilt angle θ of the bright portions and the dark portions does not gradually increase, the helical pitch of the cholesteric liquid crystalline phase gradually changes in the thickness direction. For example, the liquid crystal layer 54 may be a cholesteric liquid crystal layer where the helical pitch P gradually increases as the distance from the interface on the alignment film 52 side increases in the thickness direction.

As described above, the wavelength of light to be selectively reflected by the liquid crystal layer 54 (cholesteric liquid crystalline phase) varies depending on the helical pitch, and as the helical pitch P increases, the wavelength of light to be selectively reflected increases. Accordingly, in the liquid crystal layer 54 where the helical pitch P gradually changes and increases in the thickness direction, light in a wide wavelength range can be reflected.

<<Method of Forming Liquid Crystal Layer>>

The liquid crystal layer 54 can be formed by immobilizing a liquid crystal phase in a layer shape, the liquid crystal phase obtained by aligning a liquid crystal compound in a predetermined alignment state. For example, the cholesteric liquid crystal layer can be formed by immobilizing a cholesteric liquid crystalline phase in a layer shape.

The structure in which a cholesteric liquid crystalline phase is immobilized may be a structure in which the alignment of the liquid crystal compound as a liquid crystal phase is immobilized. Typically, the structure in which a liquid crystal phase is immobilized is preferably a structure which is obtained by making the polymerizable liquid crystal compound to be in a state where a predetermined liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a liquid crystal phase is immobilized is not particularly limited as long as the optical characteristics of the liquid crystal phase are maintained, and the liquid crystal compound 40 in the liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the liquid crystal layer include a liquid crystal composition including a liquid crystal compound. It is preferable that the liquid crystal compound is a polymerizable liquid crystal compound.

In addition, the liquid crystal composition used for forming the liquid crystal layer may further include a surfactant and a chiral agent.

—Polymerizable Liquid Crystal Compound—

The polymerizable liquid crystal compound may be a rod-like liquid crystal compound or a disk-like liquid crystal compound.

Examples of the rod-like polymerizable liquid crystal compound include a rod-like nematic liquid crystal compound. As the rod-like nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a polymer liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described polymer liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Like Liquid Crystal Compound—

As the disk-like liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the liquid crystal layer may include a surfactant.

It is preferable that the surfactant is a compound that can function as an alignment control agent contributing to the stable or rapid alignment of a cholesteric liquid crystalline phase. Examples of the surfactant include a silicone-based surfactant and a fluorine-based surfactant. Among these, a fluorine-based surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine-based surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

—Chiral Agent (Optically Active Compound—

The chiral agent has a function of causing a helical structure of a cholesteric liquid crystalline phase to be formed. The chiral agent may be selected depending on the purpose because a helical twisted direction or a helical pitch derived from the compound varies.

The chiral agent is not particularly limited, and a well-known compound (for example, Liquid Crystal Device Handbook (No. 142 Committee of Japan Society for the Promotion of Science, 1989), Chapter 3, Article 4-3, chiral agent for twisted nematic (TN) or super twisted nematic (STN), p. 199), isosorbide (chiral agent having an isosorbide structure), or an isomannide derivative can be used.

In addition, the chiral agent in which back isomerization, dimerization, isomerization, dimerization or the like occurs due to light irradiation such that the helical twisting power (HTP) decreases can also be suitably used.

In general, the chiral agent includes an asymmetric carbon atom. However, an axially asymmetric compound or a planar asymmetric compound not having an asymmetric carbon atom can also be used as the chiral agent. Examples of the axially asymmetric compound or the planar asymmetric compound include binaphthyl, helicene, paracyclophane, and derivatives thereof. The chiral agent may include a polymerizable group. In a case where both the chiral agent and the liquid crystal compound have a polymerizable group, a polymer which includes a repeating unit derived from the polymerizable liquid crystal compound and a repeating unit derived from the chiral agent can be formed due to a polymerization reaction of a polymerizable chiral agent and the polymerizable liquid crystal compound. In this aspect, it is preferable that the polymerizable group in the polymerizable chiral agent is the same as the polymerizable group in the polymerizable liquid crystal compound. Accordingly, the polymerizable group of the chiral agent is preferably an unsaturated polymerizable group, an epoxy group, or an aziridinyl group, more preferably an unsaturated polymerizable group, and still more preferably an ethylenically unsaturated polymerizable group.

In addition, the chiral agent may be a liquid crystal compound.

In a case where the chiral agent includes a photoisomerization group, a pattern having a desired reflection wavelength corresponding to a luminescence wavelength can be formed by irradiation of an actinic ray or the like through a photomask after coating and alignment, which is preferable. As the photoisomerization group, an isomerization portion of a photochromic compound, an azo group, an azoxy group, or a cinnamoyl group is preferable. Specific examples of the compound include compounds described in JP2002-080478A, JP2002-080851A, JP2002-179668A, JP2002-179669A, JP2002-179670A, JP2002-179681A, JP2002-179682A, JP2002-338575A, JP2002-338668A, JP2003-313189A, and JP2003-313292A.

The content of the chiral agent in the liquid crystal composition is preferably 0.01% to 200 mol % and more preferably 1% to 30 mol % with respect to the content molar amount of the liquid crystal compound.

—Polymerization Initiator—

In a case where the liquid crystal composition includes a polymerizable compound, it is preferable that the liquid crystal composition includes a polymerization initiator. In an aspect where a polymerization reaction progresses with ultraviolet irradiation, it is preferable that the polymerization initiator is a photopolymerization initiator which initiates a polymerization reaction with ultraviolet irradiation.

Examples of the photopolymerization initiator include an α-carbonyl compound (described in U.S. Pat. Nos. 2,367,661A and 2,367,670A), an acyloin ether (described in U.S. Pat. No. 2,448,828A), an α-hydrocarbon-substituted aromatic acyloin compound (described in U.S. Pat. No. 2,722,512A), a polynuclear quinone compound (described in U.S. Pat. Nos. 3,046,127A and 2,951,758A), a combination of a triarylimidazole dimer and p-aminophenyl ketone (described in U.S. Pat. No. 3,549,367A), an acridine compound and a phenazine compound (described in JP1985-105667A (JP-S60-105667A) and U.S. Pat. No. 4,239,850A), and an oxadiazole compound (described in U.S. Pat. No. 4,212,970A).

The content of the photopolymerization initiator in the liquid crystal composition is preferably 0.1 to 20 mass % and more preferably 0.5 to 12 mass % with respect to the content of the liquid crystal compound.

—Crosslinking Agent—

In order to improve the film hardness after curing and to improve durability, the liquid crystal composition may optionally include a crosslinking agent. As the crosslinking agent, a curing agent which can perform curing with ultraviolet light, heat, moisture, or the like can be suitably used.

The crosslinking agent is not particularly limited and can be appropriately selected depending on the purpose. Examples of the crosslinking agent include: a polyfunctional acrylate compound such as trimethylol propane tri(meth)acrylate or pentaerythritol tri(meth)acrylate; an epoxy compound such as glycidyl (meth)acrylate or ethylene glycol diglycidyl ether; an aziridine compound such as 2,2-bis hydroxymethyl butanol-tris [3-(1-aziridinyl)propionate] or 4,4-bis(ethyleneiminocarbonylamino)diphenylmethane; an isocyanate compound such as hexamethylene diisocyanate or a biuret type isocyanate; a polyoxazoline compound having an oxazoline group at a side chain thereof; and an alkoxysilane compound such as vinyl trimethoxysilane or N-(2-aminoethyl)-3-aminopropyltrimethoxysilane. In addition, depending on the reactivity of the crosslinking agent, a well-known catalyst can be used, and not only film hardness and durability but also productivity can be improved. Among these crosslinking agents, one kind may be used alone, or two or more kinds may be used in combination.

The content of the crosslinking agent is preferably 3% to 20 mass % and more preferably 5% to 15 mass % with respect to the solid content mass of the liquid crystal composition. In a case where the content of the crosslinking agent is in the above-described range, an effect of improving a crosslinking density can be easily obtained, and the stability of a liquid crystal phase is further improved.

—Other Additives—

Optionally, a polymerization inhibitor, an antioxidant, an ultraviolet absorber, a light stabilizer, a coloring material, metal oxide fine particles, or the like can be added to the liquid crystal composition in a range where optical performance and the like do not deteriorate.

In a case where the liquid crystal layer is formed, it is preferable that the liquid crystal composition is used as liquid.

The liquid crystal composition may include a solvent. The solvent is not particularly limited and can be appropriately selected depending on the purpose. An organic solvent is preferable.

The organic solvent is not particularly limited and can be appropriately selected depending on the purpose. Examples of the organic solvent include a ketone, an alkyl halide, an amide, a sulfoxide, a heterocyclic compound, a hydrocarbon, an ester, and an ether. Among these crosslinking agents, one kind may be used alone, or two or more kinds may be used in combination. Among these, a ketone is preferable in consideration of an environmental burden.

In a case where the liquid crystal layer is formed, it is preferable that the liquid crystal layer is formed by applying the liquid crystal composition to a surface where the liquid crystal layer is to be formed, aligning the liquid crystal compound to a state of a desired liquid crystalline phase, and curing the liquid crystal compound.

That is, in a case where the cholesteric liquid crystal layer is formed on the alignment film 52, it is preferable that the liquid crystal layer obtained by immobilizing a cholesteric liquid crystalline phase is formed by applying the liquid crystal composition to the alignment film 52, aligning the liquid crystal compound to a state of a cholesteric liquid crystalline phase, and curing the liquid crystal compound.

For the application of the liquid crystal composition, a printing method such as ink jet or scroll printing or a well-known method such as spin coating, bar coating, or spray coating capable of uniformly applying liquid to a sheet-shaped material can be used.

The applied liquid crystal composition is optionally dried and/or heated and then is cured to form the liquid crystal layer. In the drying and/or heating step, the liquid crystal compound in the liquid crystal composition may be aligned to a cholesteric liquid crystalline phase. In the case of heating, the heating temperature is preferably 200° C. or lower and more preferably 130° C. or lower.

The aligned liquid crystal compound is optionally further polymerized. Regarding the polymerization, thermal polymerization using light irradiation may be performed, and photopolymerization is preferable. Regarding the light irradiation, ultraviolet light is preferably used. The irradiation energy is preferably 20 mJ/cm$^2$ to 50 J/cm$^2$ and more preferably 50 to 1500 mJ/cm$^2$. In order to promote a photopolymerization reaction, light irradiation may be performed under heating conditions or in a nitrogen atmosphere. The wavelength of irradiated ultraviolet light is preferably 250 to 430 nm.

In a case where a chiral agent where the HTP changes depending on the polarization of light is used as the chiral agent added to the liquid crystal composition, light irradiation for changing the HTP of the chiral agent may be performed before the polymerization of the liquid crystal compound. Alternatively, light irradiation by the photopolymerization of the liquid crystal compound may also be light irradiation for changing the HTP of the chiral agent. As a result, the above-described liquid crystal layer where the helical pitch P of the cholesteric liquid crystalline phase gradually changes can be obtained.

The thickness of the liquid crystal layer 54 is not particularly limited, and the thickness with which a required light reflectivity can be obtained may be appropriately set depending on the use of the optical element, the light reflectivity required for the liquid crystal layer, the material for forming the liquid crystal layer 54, and the like.

<Other Liquid Crystal Layers (Liquid Crystal Diffraction Elements)>

In the optical element in the example shown in the drawing, in the incidence element and the emission element, a reflective liquid crystal diffraction element including the liquid crystal layer 54 as a cholesteric liquid crystal layer is used. However, the present invention is not limited to this configuration.

For example, a liquid crystal diffraction element that has the liquid crystal alignment pattern where the optical axis continuously rotates in at least one in-plane direction and in which the liquid crystal compound does not form a cholesteric liquid crystalline phase in the thickness direction can also be used. The liquid crystal diffraction element may have a configuration in which the liquid crystal compound is helically twisted and rotates in the thickness direction to some extent that a cholesteric liquid crystalline phase is not formed.

Figure 10:
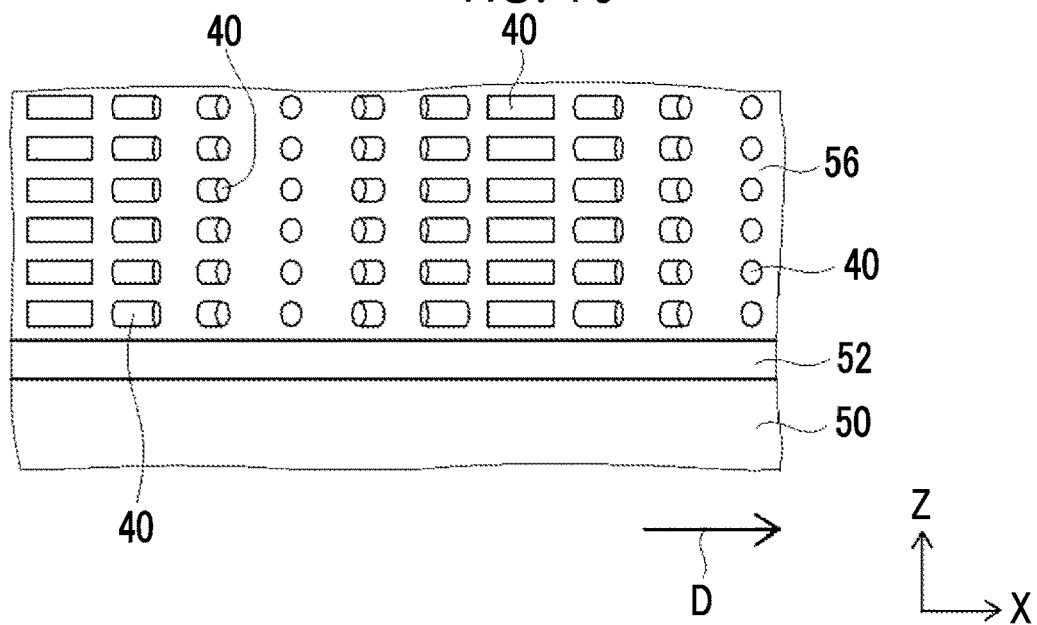
FIG. 10 is a diagram conceptually showing another example of the liquid crystal diffraction element.
Figure 11:
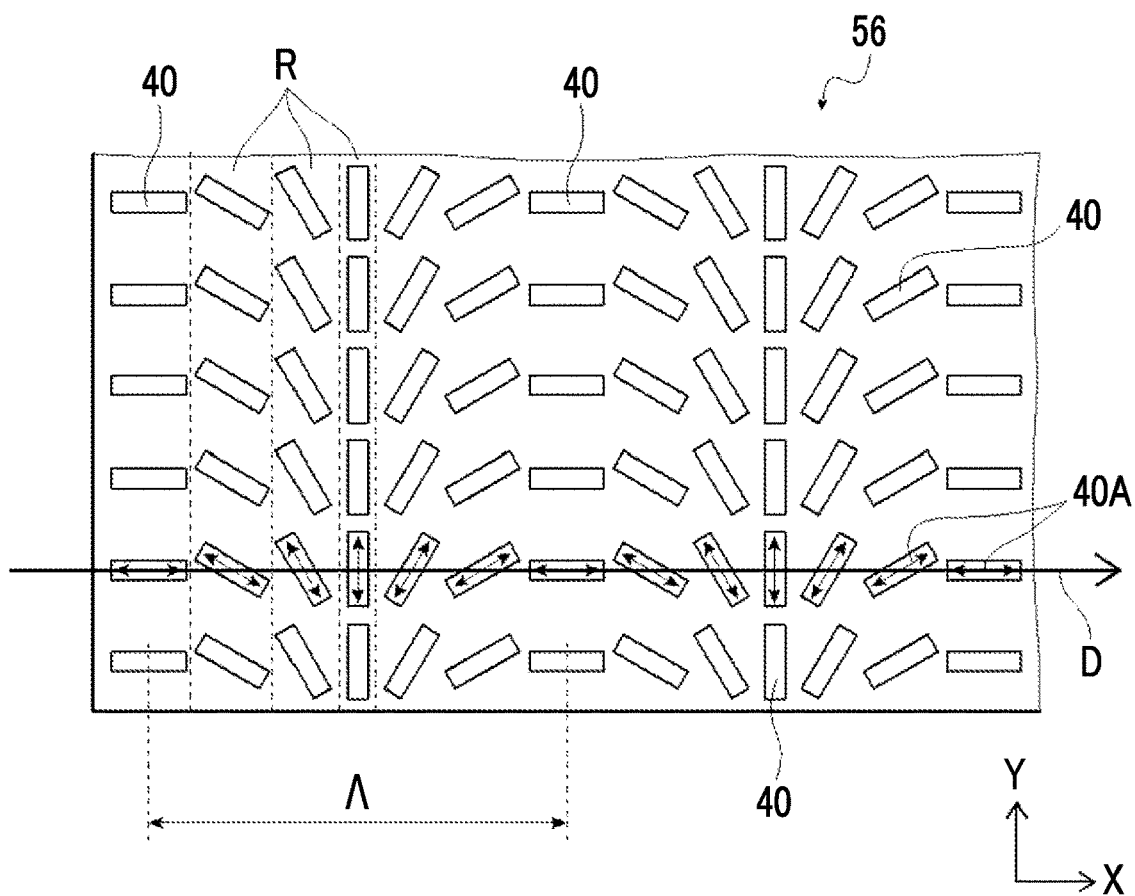
FIG. 11 is a plan view conceptually showing the liquid crystal layer of the liquid crystal diffraction element shown in FIG. 10.

FIGS. 10 and 11 show an example of another liquid crystal diffraction element.

A liquid crystal diffraction element shown in FIGS. 10 and 11 includes the support 50, the alignment film 52, and a liquid crystal layer 56. As the support 50 and the alignment film 52, those described above can be used.

As in the (cholesteric) liquid crystal layer 54, the liquid crystal layer 56 of the liquid crystal diffraction element shown in FIG. 11 also has the liquid crystal alignment pattern in which the optical axis 40A of the liquid crystal compound 40 continuously rotates along the arrangement axis D. FIG. 11 also shows only the liquid crystal compound of the surface of the alignment film 52 as in FIG. 4.

In the liquid crystal diffraction element shown in FIG. 10, the liquid crystal compound 40 forming the liquid crystal layer 56 is not helically twisted and does not rotate in the thickness direction, and the optical axis 40A is positioned at the same position in the plane direction. The liquid crystal layer can be formed by adding a chiral agent to a liquid crystal composition during the formation of the liquid crystal layer.

As described above, the liquid crystal layer 56 has the liquid crystal alignment pattern in which the direction of the optical axis 40A derived from the liquid crystal compound 40 changes while continuously rotating in the arrangement axis D direction in a plane, that is, in the X direction. That is, in this example, the in-plane rotation direction is also the arrangement axis D direction, that is, the X direction.

On the other hand, regarding the liquid crystal compound 40 forming the liquid crystal layer 56, the liquid crystal compounds 40 having the same direction of the optical axes 40A are arranged at regular intervals in the Y direction perpendicular to the X direction, that is, the Y direction perpendicular to the arrangement axis D as the one in-plane direction in which the optical axis 40A continuously rotates.

In other words, regarding the liquid crystal compound 40 forming the liquid crystal layer 56, in the liquid crystal compounds 40 arranged in the Y direction, angles between the directions of the optical axes 40A and the arrangement axis D direction are the same.

In the liquid crystal compounds arranged in the Y direction in the liquid crystal layer 56, the angles between the optical axes 40A and the X direction (the one in-plane direction in which the direction of the optical axis of the liquid crystal compound 40 rotates) are the same. Regions where the liquid crystal compounds 40 in which the angles between the optical axes 40A and the arrangement axis D are the same are disposed in the Y direction will be referred to as "regions R".

In this case, it is preferable that an in-plane retardation (Re) value of each of the regions R is a half wavelength, that is, λ/2. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 40 in the direction of the optical axis 40A and a refractive index of the liquid crystal compound 40 in a direction perpendicular to the optical axis 40A in a plane of the region R. That is, the difference Δn in refractive index is the same as the difference in refractive index of the liquid crystal compound 40.

In a case where circularly polarized light is incident into the above-described liquid crystal layer 56, the light is refracted such that the direction of the circularly polarized light is converted.

Figure 12:
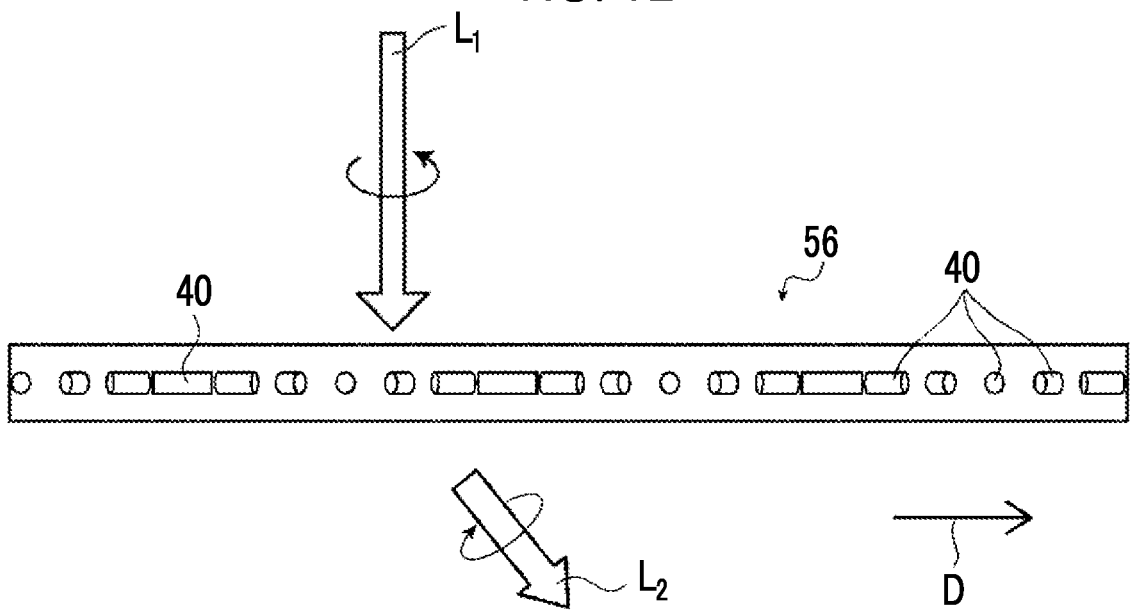
FIG. 12 is a conceptual diagram showing an action of the liquid crystal layer shown in FIG. 10.
Figure 13:
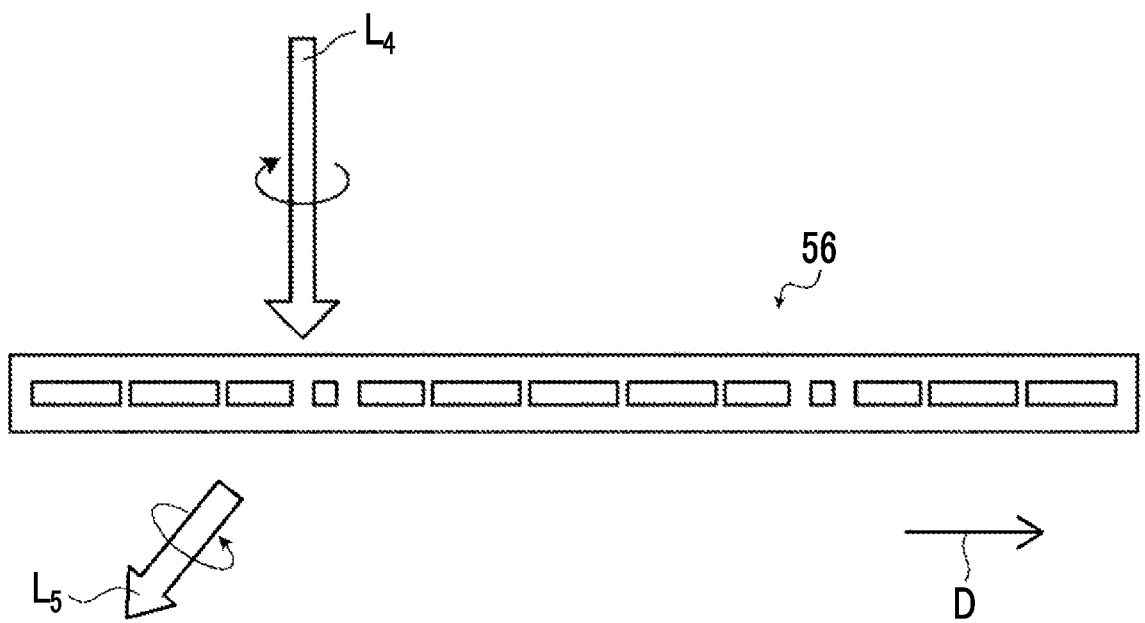
FIG. 13 is a conceptual diagram showing the action of the liquid crystal layer shown in FIG. 10.

This action is conceptually shown in FIGS. 12 and 13. In the liquid crystal layer 56, the value of the product of the difference in refractive index of the liquid crystal compound and the thickness of the optically-anisotropic layer is $\lambda/2$.

As shown in FIG. 12, in a case where the value of the product of the difference in refractive index of the liquid crystal compound in the liquid crystal layer 56 and the thickness of the optically-anisotropic layer is $\lambda/2$ and incidence light $L_1$ as left circularly polarized light is incident into the liquid crystal layer 56, the incidence light $L_1$ transmits through the liquid crystal layer 56 to be imparted with a retardation of 180°, and the transmitted light $L_2$ is converted into right circularly polarized light.

In addition, the liquid crystal alignment pattern formed in the liquid crystal layer 56 is a pattern that is periodic in the arrangement axis D direction. Therefore, the transmitted light $L_2$ travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrangement axis D direction with respect to an incidence direction.

On the other hand, as shown in FIG. 13, in a case where the value of the product of the difference in refractive index of the liquid crystal compound in the liquid crystal layer 56 and the thickness of the optically-anisotropic layer is $\lambda/2$ and incidence light $L_4$ of right circularly polarized light is incident into the liquid crystal layer 56, the incidence light $L_4$ transmits through the liquid crystal layer 56 to be imparted with a retardation of 180°, and the transmitted light $L_4$ is converted into transmitted light $L_5$ of left circularly polarized light.

In addition, the liquid crystal alignment pattern formed in the liquid crystal layer 56 is a pattern that is periodic in the arrangement axis D direction. Therefore, the transmitted light $L_5$ travels in a direction different from a traveling direction of the incidence light $L_4$. In this case, the transmitted Light $L_5$ travels in a direction different from the transmitted light $L_2$, that is, in a direction opposite to the arrangement axis D direction with respect to the incidence direction. This way, the incidence light $L_4$ is converted into the transmitted light $L_5$ of left circularly polarized light that is tilted by a predetermined angle in a direction opposite to the arrangement axis D direction with respect to an incidence direction.

As in the liquid crystal layer 54, by changing the in-plane period Λ of the liquid crystal alignment pattern formed in the liquid crystal layer 56, refraction angles of the transmitted light components $L_2$ and $L_5$ can be adjusted. Specifically, even in the liquid crystal layer 56, as the in-plane period Λ of the liquid crystal alignment pattern decreases, light components transmitted through the liquid crystal compounds 40 adjacent to each other more strongly interfere with each other. Therefore, the transmitted light components $L_2$ and $L_5$ can be more largely refracted.

In addition, by reversing the rotation direction of the optical axis 40A of the liquid crystal compound 40 that rotates in the arrangement axis D direction, the refraction direction of transmitted light can be reversed. That is, in the example FIGS. 10 to 13, the rotation direction of the optical axis 40A toward the arrangement axis D direction is clockwise. By setting this rotation direction to be counterclockwise, the refraction direction of transmitted light can be reversed.

From the viewpoint of diffraction efficiency, even in a case where the liquid crystal diffraction element that allows transmission of incidence light and diffracts incidence light is used, it is preferable to use a liquid crystal diffraction element having a region where the liquid crystal compound is twisted and rotates (the twisted angle is less than 360°). In particular, in a case where light is diffracted at an angle where the light is reflected in the light guide plate, from the viewpoint of diffraction efficiency, a liquid crystal diffraction element including a region in which a liquid crystal compound is twisted and rotates can be suitably used. In addition, from the viewpoint of diffraction efficiency, it is preferable to use a laminate in which liquid crystal diffraction elements having different angles at which the liquid crystal compound is twisted and rotates is laminated, or it is preferable to use a laminate in which liquid crystal diffraction elements having different directions in which the liquid crystal compound is twisted and rotates are laminated.

In the optical element according to the embodiment of the present invention, in a case where a transmissive incidence element and a transmissive emission element are used, a positional relationship between the incidence element, the emission element, the display 20, and the user U is opposite to that in a case where a reflective incidence element and a reflective emission element are used. That is, the optical element is configured such that an image from the display 20 is incident from the incidence portion side instead of the light guide plate 12, the image is incident into the emission portion from the light guide plate, and the image transmitted through the emission portion is emitted to the observation position by the user U.

In addition, as the incidence element and the emission element in the optical element according to the embodiment of the present invention, different liquid crystal diffraction elements may be used.

For example, a transmissive liquid crystal diffraction element including the liquid crystal layer 56 may be used in the incidence portion 14, and a reflective liquid crystal diffraction element including the liquid crystal layer 54 may be used in the emission portion 16.

As the described above, in the optical element 10 in the example shown in the drawing, the incidence portion 14 includes the first incidence diffraction portion 26 and the second incidence diffraction portion 28. The first incidence diffraction portion 26 includes the incidence element 24A1 and the incidence element 24A2. The second incidence diffraction portion 28 includes the incidence element 24B1 and the incidence element 24B2.

The emission portion 16 includes the first emission diffraction portion 32 and the second emission diffraction portion 34. The first emission diffraction portion 32 includes the emission element 30A1 and the emission element 30A2. The second emission diffraction portion 34 includes the emission element 30B1 and the emission element 30B2.

In the incidence portion 14, in the liquid crystal layers 54 of the incidence element 24A1 and the incidence element 24A2 forming the first incidence diffraction portion 26, the in-plane periods Λ are the same, and the in-plane rotation directions (the directions (X directions) of the arrangement axis D) are different. Likewise, in the liquid crystal layers 54 of the incidence element 24B1 and the incidence element 24B2 forming the second incidence diffraction portion 28, the in-plane periods Λ are the same, and the in-plane rotation directions are different.

In the following description, the term "liquid crystal layer 54" will be omitted and, for example, "the in-plane period Λ of the incidence element 24A1" or "the rotation direction of the incidence element 24A1" will be used.

In addition, in the incidence elements 24A1 and 24A2 and the incidence elements 24B1 and 24B2, the in-plane periods Λ and the in-plane rotation directions are different. That is, in the first incidence diffraction portion 26 and the second incidence diffraction portion 28, the in-plane periods Λ and the in-plane rotation directions of the incidence elements forming the respective diffraction portions are different.

In a case where the incidence diffraction portion includes three or more incidence elements, in at least two of the incidence elements, the in-plane periods may be the same, and the in-plane rotation directions may be different.

In addition, in a case where the incidence portion includes three or more incidence diffraction portions, in at least two of the incidence diffraction portions, the in-plane periods Λ may be the same, and the in-plane rotation directions may be different.

Regarding this point, the same can also be applied to the emission portion and the emission diffraction portion.

In the emission portion 16 of the optical element 10 in the example shown in the drawing, in the emission element 30A1 and the emission element 30A2 forming the first emission diffraction portion 32, the in-plane periods Λ are the same, and the in-plane rotation directions are different. Likewise, in the emission element 30B1 and the emission element 30B2 forming the second emission diffraction portion 34, the in-plane periods Λ are the same, and the in-plane rotation directions are different.

In addition, in the emission elements 30A1 and 30A2 and the emission elements 30B1 and 30B2, the in-plane periods Λ and the in-plane rotation directions are different. That is, in the first emission diffraction portion 32 and the second emission diffraction portion 34, the in-plane periods Λ and the in-plane rotation directions of the incidence elements forming the respective diffraction portions are different.

FIG. 14 conceptually shows an example of the emission portion 16.

Relationships between the in-plane periods Λ and the in-plane rotation directions in the emission elements and the emission diffraction portions are also the same as those in the incidence elements and the emission diffraction portions of the incidence portion 14.

In each of the emission elements shown in FIG. 14, an arrow in the drawing represents the in-plane rotation direction.

In the emission element 30A1 and the emission element 30A2 forming the first emission diffraction portion 32, the in-plane periods Λ are the same, and an angle between the in-plane rotation direction of the emission element 30A1 and the in-plane rotation direction of the emission element 30A2 is 90°.

In addition, in the emission element 30B1 and the emission element 30B2 forming the second emission diffraction portion 34, the in-plane periods Λ are the same, and an angle between the in-plane rotation directions of the emission element 30B1 and the in-plane rotation direction of the emission element 30B2 is 90°.

Further, an angle (intersecting angle γ) between the in-plane rotation direction of the emission element forming the first emission diffraction portion 32 and the in-plane rotation direction of the emission element forming the second emission diffraction portion 34 is 45°.

For example, assuming that the in-plane rotation direction of the emission element 30A1 is 0°, the in-plane rotation direction of the emission element 30A2 is 90°, the in-plane rotation direction of the emission element 30B1 is 45°, and the in-plane rotation direction of the emission element 30B2 is −45° (315').

It is desirable that an in-plane period $\Lambda_A$ of the emission element forming the first emission diffraction portion 32 and an in-plane period $\Lambda_B$ of the emission element forming the second emission diffraction portion 34 satisfy the following relationship from the viewpoint of preventing multiple images from being displayed.

$$\Lambda_B = \Lambda_A / |2 \cos \gamma|$$

Figure 16:
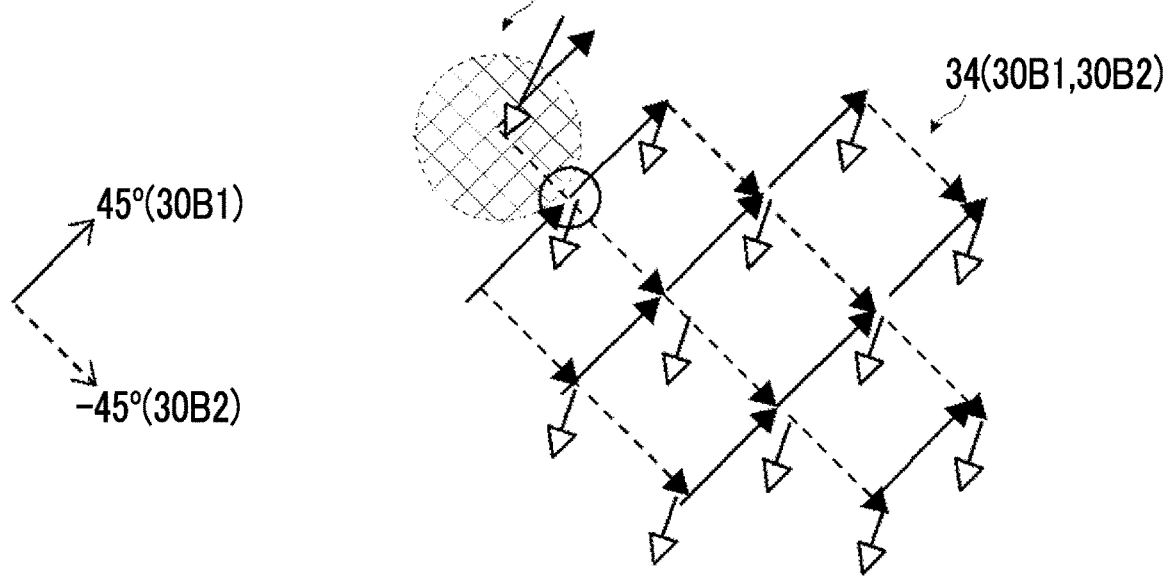
FIG. 16 is a conceptual diagram showing the action of the emission portion of the optical element shown in FIG. 1.

The optical element 10 according to the embodiment of the present invention has the above-described configuration such that, by the diffraction of the emission diffraction portion 32 and the emission diffraction portion 34 forming the emission portion 16, for example, as shown in FIGS. 15 and 16, light can be made to two-dimensionally propagate (black arrow) in the light guide plate 12, and the light can be two-dimensionally emitted (white arrow) from the light guide plate 12. Regarding this point, the same can also be applied to the incidence portion 14.

As a result, for example, in a case where the optical element 10 according to the embodiment of the present invention is used for, for example, AR glasses, a wide FOV and a wide eye box (viewing zone) can be realized.

In a preferable aspect of the incidence portion, the incidence portion includes a plurality of incidence diffraction portions each of which includes two incidence diffraction elements, and at least two of the incidence diffraction portions are the same and an angle between the in-plane rotation directions of the liquid crystal diffraction layers of the two incidence diffraction elements in the incidence diffraction portion is 45°. Further, it is also preferable that the incidence portion includes a plurality of incidence diffraction portions each of which includes two incidence diffraction elements, and at least two of the incidence diffraction portions are the same and an angle between the in-plane rotation directions of the liquid crystal diffraction layers of the two incidence diffraction elements in the incidence diffraction portion is 90°.

In a preferable aspect of the emission portion, the emission portion includes a plurality of emission diffraction portions each of which includes two emission diffraction elements, and at least two of the emission diffraction portions are the same and an angle between the in-plane rotation directions of the liquid crystal diffraction layers of the two emission diffraction elements in the emission diffraction portion is 45°. Further, it is also preferable that the emission portion includes a plurality of emission diffraction portions each of which includes two emission diffraction elements, and at least two of the emission diffraction portions are the same and an angle between the in-plane rotation directions of the liquid crystal diffraction layers of the two emission diffraction elements in the emission diffraction portion is 90°.

Figure 17:
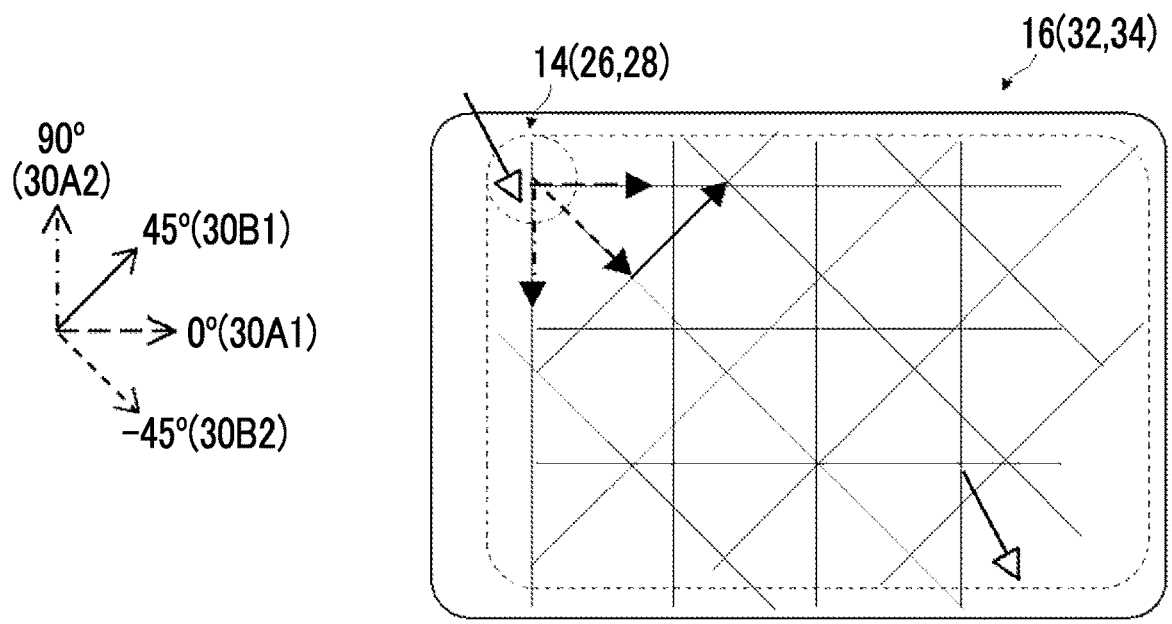
FIG. 17 is a conceptual diagram showing the action of the emission portion of the optical element shown in FIG. 1.

This way, in the optical element 10 according to the embodiment of the present invention, in the incidence portion 14, incidence light can be two-dimensionally widened to propagate in the light guide plate 12, and as conceptually shown in FIG. 17, light can propagate and be emitted from the light guide plate 12 to the entire surface of the emission portion 16.

As a result, as described above, in the optical element 10 according to the embodiment of the present invention, the eye box can be widened in AR glasses or the like.

Here, in the first emission diffraction portion 32 and the second emission diffraction portion 34, an angle between the in-plane rotation directions of the emission elements is 45°.

That is, light that is diffracted by the first emission diffraction portion 32 is not likely to be diffracted by the second emission diffraction portion 34, and light that is diffracted by the second emission diffraction portion 34 is not likely to be diffracted by the first emission diffraction portion 32. Therefore, there is no light that is diffracted by both of the first emission diffraction portion 32 and the second emission diffraction portion 34, and the occurrence of multiple images can be prevented.

In the optical element 10 according to the embodiment of the present invention, the angle between the in-plane rotation directions of the incidence element 24A1 and the incidence element 24A2 of the first incidence diffraction portion 26, the angle between the in-plane rotation directions of the incidence element 24B1 and the incidence element 24B2 of the second incidence diffraction portion, the angle between the in-plane rotation directions of the emission element 30A1 and the emission element 30A2 of the first emission diffraction portion 32, and the angle between the in-plane rotation directions of the emission element 30B 1 and the emission element 30B2 of the second emission diffraction portion 34 are not limited.

In addition, the angle between the in-plane rotation directions of the incidence element 24A1 and the incidence element 24A2 of the first incidence diffraction portion 26 and the incidence element 24B1 and the incidence element 24B2 of the second incidence diffraction portion, and the angle between the in-plane rotation directions of the emission element 30A1 and the emission element 30A2 of the first emission diffraction portion 32 and the emission element 30B 1 and the emission element 30B2 of the second emission diffraction portion 34 are not limited.

The above-described effect of preventing multiple images becomes higher as the angle between the in-plane rotation directions increases. In addition, as described above, it is preferable that the angle between the in-plane rotation directions in the incidence element 24A1 and the incidence element 24A2 or the like is large.

In consideration of this point, it is preferable that the angle between the in-plane rotation directions of the incidence element 24A1 and the incidence element 24A2 of the first incidence diffraction portion 26 and the incidence element 24B1 and the incidence element 24B2 of the second incidence diffraction portion is large.

On the other hand, in the optical element 10, the in-plane periods Λ in the incidence element 24A1 and the incidence element 24A2 of the first incidence diffraction portion 26 are the same, and the in-plane periods Λ in the incidence element 24B1 and the incidence element 24B2 of the second incidence diffraction portion 28 are the same. Further, in the incidence element 24A1 and the incidence element 24A2 of the first incidence diffraction portion 26 and the incidence element 24B1 and the incidence element 24B2 of the second incidence diffraction portion 28, the in-plane periods Λ are different.

Likewise, in the optical element 10, the in-plane periods Λ in the emission element 30A1 and the emission element 30A2 of the first emission diffraction portion 32 are the same, and the in-plane periods Λ in the emission element 30B 1 and the emission element 30B2 of the second emission diffraction portion 34 are the same. Further, in the emission element 30A1 and the emission element 30A2 of the first emission diffraction portion 32 and the emission element 30B1 and the emission element 30B2 of the second emission diffraction portion 34, the in-plane periods Λ are different.

Further, in the optical element 10 in the example shown in the drawing, in the incidence element 24A1 and the incidence element 24A2 of the first incidence diffraction portion 26 and the emission element 30A1 and the emission element 30A2 of the first emission diffraction portion 32, the in-plane periods Λ are the same, and in the incidence element 24B1 and the incidence element 24B2 of the second incidence diffraction portion 28 and the emission element 30B1 and the emission element 30B2 of the second emission diffraction portion 34, the in-plane periods Λ are the same.

The optical element 10 according to the embodiment of the present invention has the above-described configuration such that, in a case where the optical element 10 is used for AR glasses or the like, a wide FOV can be obtained.

In order to ensure a wide FOV and to appropriately display an image, it is necessary that the incidence portion 14 that causes an image emitted from the display 20 to be incident into the light guide plate 12 causes the light (image) of the entire display surface of the display 20 to be incident into the light guide plate 12 at an angle where the light can be totally reflected from the light guide plate 12.

However, the angle of the light incident from the display 20 into the incidence portion 14 varies depending on positions on the display surface of the display 20. Accordingly, with one diffraction element, it is difficult to cause the light of the entire display surface of the display 20 to be incident into the light guide plate 12 at an angle where the light can be totally reflected from the light guide plate 12.

On the other hand, in the optical element 10 according to the embodiment of the present invention, incidence elements where the in-plane periods Λ are different are used as the first incidence diffraction portion 26 and the second incidence diffraction portion 28.

As described above, in the liquid crystal layer 54 of the liquid crystal diffraction element, the angle of light diffraction varies depending on the in-plane period Λ. Specifically, as the in-plane period Λ decreases, light is diffracted at a larger bending angle and reflected. Therefore, by using the incidence elements where the in-plane periods Λ are different, depending on display positions of the display 20, light can be caused to be incident into the light guide plate 12 at an angle where the light can be totally reflected from the light guide plate 12.

Figure 18:
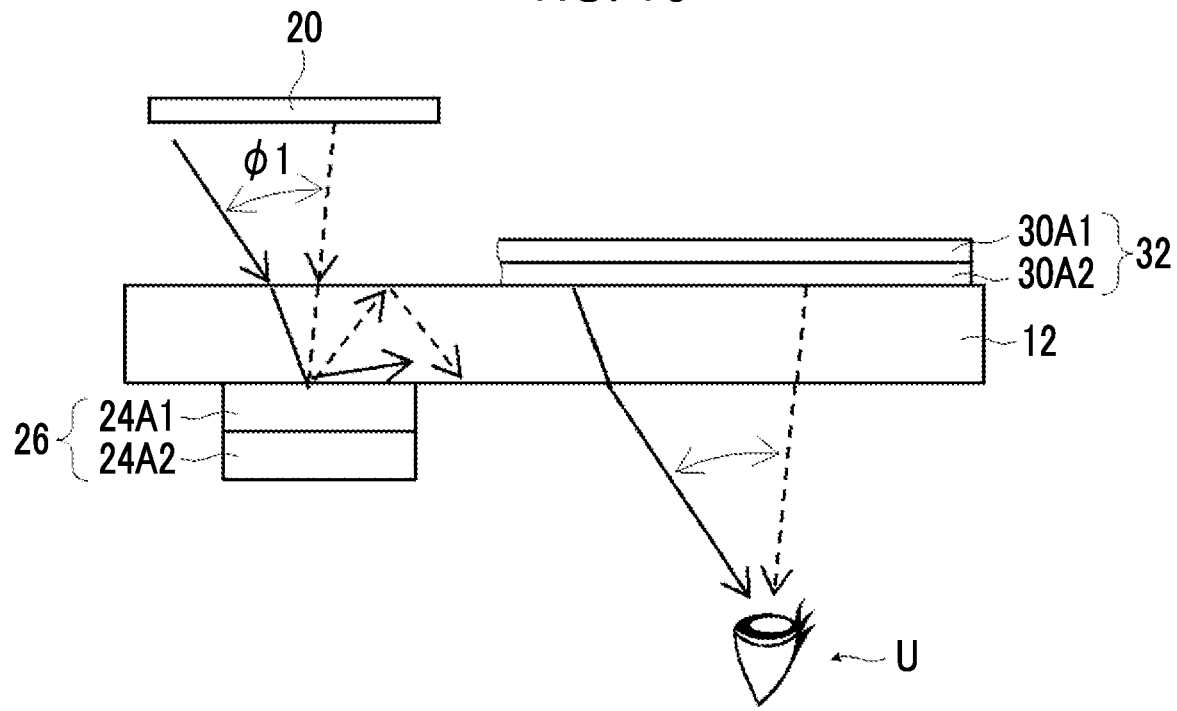
FIG. 18 is a conceptual diagram showing an action of an incidence portion of the optical element shown in FIG. 1.

For example, as conceptually shown in FIG. 18, in the incidence element 24A1 and the incidence element 24A2 of the first incidence diffraction portion 26, the in-plane periods Λ are set such that light in an angle range φ1 from a solid line to a broken line of the display 20 on the left side in the drawing is incident into the light guide plate 12 at an angle where the light can be totally reflected from the light guide plate 12.

Therefore, even in a case where light other than the light in the angle range φ1 is incident into the first incidence diffraction portion 26, the light does not propagate in the light guide plate 12 while being repeatedly totally reflected.

In addition, as described above, in the incidence element 24A1 and the incidence element 24A2 of the first incidence diffraction portion 26 and the emission element 30A1 and the emission element 30A2 of the first emission diffraction portion 32, the in-plane periods Λ are the same. Accordingly, the light that is diffracted by the first incidence diffraction portion 26 to be incident into the light guide plate 12 is diffracted and emitted from the first emission diffraction portion 32.

Figure 19:
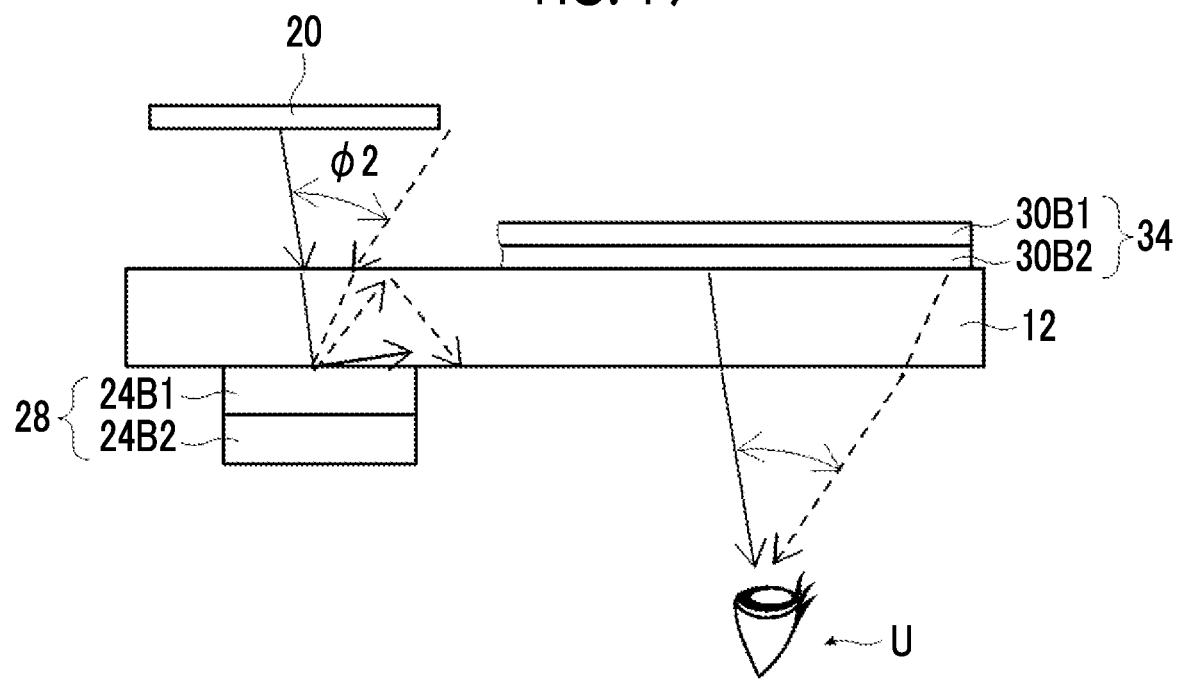
FIG. 19 is a conceptual diagram showing the action of an incidence portion of the optical element shown in FIG. 1.

For example, as conceptually shown in FIG. 19, in the incidence element 24B1 and the incidence element 24B2 of the second incidence diffraction portion 28, the in-plane periods Λ are set such that light in an angle range φ2 from a solid line to a broken line of the display 20 on the right side in the drawing is incident into the light guide plate 12 at an angle where the light can be totally reflected from the light guide plate 12.

Therefore, even in a case where light other than the light in the angle range φ2 is incident into the first incidence diffraction portion 26, the light does not propagate in the light guide plate 12 while being repeatedly totally reflected.

In addition, as described above, in the incidence element 24B1 and the incidence element 24B2 of the second incidence diffraction portion 28 and the emission element 30B 1 and the emission element 30B2 of the second emission diffraction portion 34, the in-plane periods Λ are the same. Accordingly, the light that is diffracted by the second incidence diffraction portion 28 to be incident into the light guide plate 12 is diffracted and emitted from the second emission diffraction portion 34.

In the angle range φ2, light travels in a direction opposite to the light propagation direction in the light guide plate 12. Accordingly, in the incidence element 24B1 or the like, the in-plane period Λ is shorter than that of the incidence element 24A1 or the like such that the light is diffracted at a larger bending angle.

Figure 20:
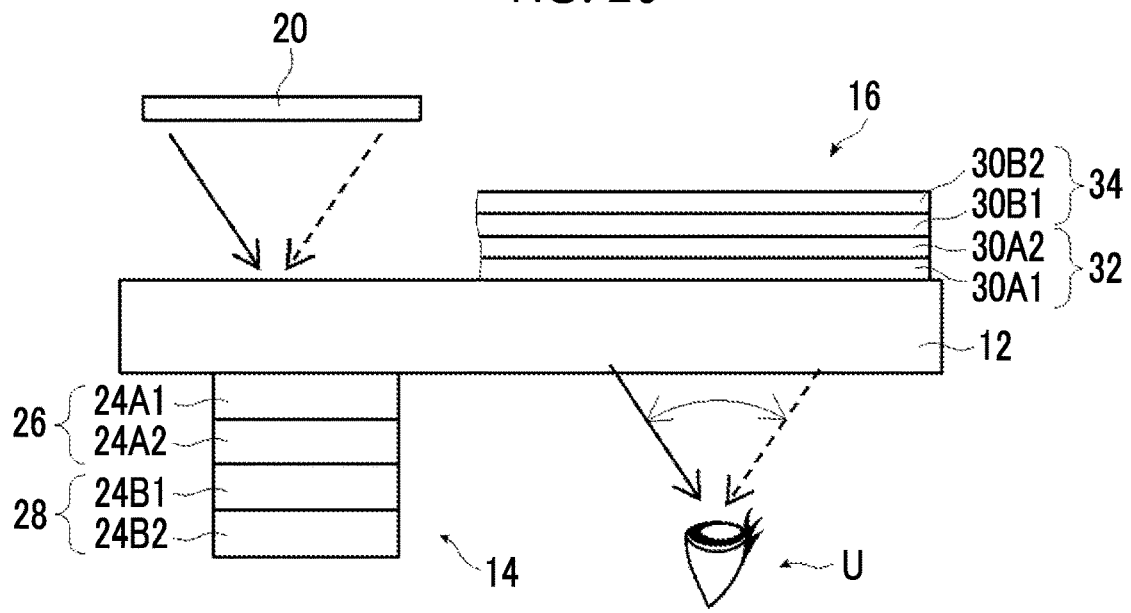
FIG. 20 is a conceptual diagram showing the action of the incidence portion of the optical element shown in FIG. 1.

Accordingly, in the optical element 10 according to the embodiment of the present invention, as conceptually shown in FIG. 20, the light of the entire display surface of the display 20 can be caused by the incidence portion 14 to be incident into the light guide plate 12 at an angle the light can be totally reflected and propagate in the light guide plate 12, and the light propagated in the light guide plate 12 can be emitted from the emission portion 16 to an observation portion by the user U.

Therefore, in the optical element 10 according to the embodiment of the present invention, the above-described wide eye box can be realized, and the FOV can also be widened.

In the optical element 10 according to the embodiment of the present invention, the in-plane periods Λ of the incidence element 24A1 and the incidence element 24A2 of the first incidence diffraction portion 26, the incidence element 24B1 and the incidence element 24B2 of the second incidence diffraction portion 28, the emission element 30A1 and the emission element 30A2 of the first emission diffraction portion 32, and the emission element 30B1 and the emission element 30B2 of the second emission diffraction portion 34 are also not limited.

That is, depending on the refractive index of the light guide plate 12, the size of the display surface of the display 20, the distance between the display 20 and the light guide plate 12, and the like, the in-plane periods Λ of the elements may be appropriately set such that the light of the entire display surface of the display 20 can be incident into the light guide plate 12 at an angle where the light can be totally reflected and propagate in the light guide plate 12.

It is preferable that, in n incidence diffraction portions of the incidence portion and n emission diffraction portions of the emission portion, the number of combinations of the incidence diffraction portions and the emission diffraction portions where the in-plane period of the liquid crystal diffraction layer of the incidence diffraction element and the in-plane period of the liquid crystal diffraction layer of the emission diffraction element are the same is n. Here, n represents an integer of 1 or more.

In the incidence portion 14 of the optical element 10 according to the embodiment of the present invention, the incidence element 24A1 and the incidence element 24A2 of the first incidence diffraction portion 26 and the incidence element 24B1 and the incidence element 24B2 of the second incidence diffraction portion 28 may be formed of a plurality of incidence elements (incidence diffraction elements).

For example, both of the incidence element 24A1 and the incidence element 24A2 may be formed of a first incidence element and a second incidence element. In addition, both of the incidence element 24B1 and the incidence element 24B2 may be formed of a first incidence element and a second incidence element.

In a case where the incidence element 24A1 and/or the incidence element 24A2 are formed of the first incidence element and the second incidence element, it is preferable that the first incidence element and the second incidence element are liquid crystal diffraction elements where turning directions of circularly polarized light to be selectively reflected are opposite to each other. For example, in a case where the first incidence element includes a liquid crystal diffraction element that selectively reflects right circularly polarized light, it is preferable that the second incidence element includes a liquid crystal diffraction element that selectively reflects left circularly polarized light.

That is, in the incidence portion 14 of the optical element 10 according to the embodiment of the present invention, the incidence element 24A1 and the incidence element 24A2 of the first incidence diffraction portion 26 and the incidence element 24B1 and the incidence element 24B2 of the second incidence diffraction portion 28 may include the liquid crystal layer 54 that selectively reflects right circularly polarized light and the liquid crystal layer 54 that selectively reflects left circularly polarized light.

With this configuration, light that carries an image emitted from the display 20 can be used without waste, the brightness of the light emitted from the light guide plate 12 can be increased, and the brightness of the display image can be increased.

In a case where one incidence element is formed of the first incidence element and the second incidence element, one incidence element may include two liquid crystal diffraction elements shown in FIG. 3 as the first incidence element and the second incidence element.

Alternatively, in a case where one incidence element is formed of the first incidence element and the second incidence element, one liquid crystal diffraction element shown in FIG. 3 may be formed of both of the liquid crystal layer 54 that selectively reflects right circularly polarized light and the liquid crystal layer 54 that selectively reflects left circularly polarized light. In this case, the two liquid crystal layers 54 are considered as the first incidence element and the second incidence element.

As described above, the liquid crystal diffraction element shown in FIG. 3 does not need to include the support 50 or does not need to include the support 50 and the alignment film 52.

Here, as described above, the diffraction directions from the liquid crystal layers 54 are opposite to each other as right circularly polarized light and left circularly polarized light. Accordingly, in order to diffract light in the same direction, it is necessary that the angle between the in-plane rotation directions of the liquid crystal layer 54 that selectively reflects right circularly polarized light and the liquid crystal layer 54 that selectively reflects left circularly polarized light is 180°. That is, in this case, in order to diffract light in the same direction, it is necessary that the in-plane rotation directions of the liquid crystal layer 54 that selectively reflects right circularly polarized light and the liquid crystal layer 54 that selectively reflects left circularly polarized light are opposite to each other.

As a result, light can be diffracted in the same direction by the first incidence element and the second incidence element forming one incidence element. In other words, in this configuration, the first incidence element and the second incidence element forming one incidence element can be considered as liquid crystal diffraction elements having basically the same optical action, except that turning directions of circularly polarized light to be selectively reflected are different.

In a case where one incidence element is formed of the first incidence element and the second incidence element, it is preferable that the in-plane periods Λ of the first incidence element and the second incidence element forming one incidence element are the same.

In addition, in the incidence portion 14, in a case where one incidence element is formed of the first incidence element and the second incidence element and includes the liquid crystal layer 54 that selectively reflects right circularly polarized light and the liquid crystal layer 54 that selectively reflects left circularly polarized light, it is preferable that the emission portion 16 also includes the liquid crystal layer 54 that selectively reflects right circularly polarized light and the liquid crystal layer 54 that selectively reflects left circularly polarized light correspondingly.

In this case, for example, the emission element of the first emission diffraction portion 32 may selectively reflect right circularly polarized light or left circularly polarized light, and the emission element of the second emission diffraction portion 34 may selectively reflect the other circularly polarized light.

Regarding this point, the same can also be applied to a case where both of the first incidence diffraction portion 26 and the second incidence diffraction portion 28 described below include only one incidence element, one incidence diffraction portion selectively reflects right circularly polarized light, and the other incidence diffraction portion reflects left circularly polarized light.

In the above-described optical element 10, the first incidence diffraction portion 26 includes a plurality of incidence elements, that is, the incidence element 24A1 and the incidence element 24A2. In addition, the second incidence diffraction portion 28 also includes a plurality of incidence elements, that is, the incidence element 24B1 and the incidence element 24B2.

However, the present invention is not limited to this configuration. That is, in the optical element according to the embodiment of the present invention, the first incidence diffraction portion 26 may include only the incidence element 24A1, and/or the second incidence diffraction portion 28 may include only the incidence element 24B1.

In a case where the first incidence diffraction portion 26 includes only the incidence element 24A1 and the second incidence diffraction portion 28 also includes only the incidence element 24B1, various configurations can be adopted.

For example, in a case where the first incidence diffraction portion 26 includes only the incidence element 24A1 and the second incidence diffraction portion 28 also includes only the incidence element 24B1, as described above, the incidence element 24A1 may be formed of the first incidence element that selectively reflects right circularly polarized light or left circularly polarized light and the second incidence element that selectively reflects the other circularly polarized light, and the incidence element 24B1 may also be formed of the first incidence element that selectively reflects right circularly polarized light or left circularly polarized light and the second incidence element that selectively reflects the other circularly polarized light.

In addition, in a case where the first incidence diffraction portion 26 includes only the incidence element 24A1 and the second incidence diffraction portion 28 also includes only the incidence element 24B1, the incidence element 24A1 may selectively reflect right circularly polarized light or left circularly polarized light and the incidence element 24B1 may selectively reflect the other circularly polarized light.

Further, in a case where the first incidence diffraction portion 26 includes only the incidence element 24A1 and the second incidence diffraction portion 28 also includes only the incidence element 24B1, the incidence element 24A1 may selectively reflect right circularly polarized light or left circularly polarized light and the incidence element 24B1 may selectively reflect circularly polarized light in the same turning direction.

In the emission portion 16 of the optical element 10 in the example shown in the drawing, the in-plane periods Λ in the emission element 30A1 and the emission element 30A2 of the first emission diffraction portion 32 are the same, and the in-plane periods Λ in the emission element 30B1 and the emission element 30B2 of the second emission diffraction portion 34 are the same.

However, the present invention is not limited to this configuration. For example, as described above, in a case where the first incidence diffraction portion 26 includes only the incidence element 24A1 and the second incidence diffraction portion 28 also includes only the incidence element 24B1, the in-plane period Λ of the emission element 30A1 and the emission element 30A2 of the first emission diffraction portion 32 and the in-plane period Λ of the emission element 30B1 and the emission element 30B2 of the second emission diffraction portion 34 may be different from each other.

In this case, an in-plane period $\Lambda_2$ of the emission element 30A2 and the emission element 30B2 may be calculated as follows.

The in-plane period of the incidence element forming the incidence diffraction portion is represented by $\Lambda_{in}$. In addition, the angle between the in-plane rotation directions of the emission element 30A1 and the emission element 30A2 and the angle between the in-plane rotation directions of the emission element 30B1 and the emission element 30B2 are an intersecting angle ρ.

The in-plane period $\Lambda_2$ of the emission element 30A2 and the emission element 30B2 is obtained from the following expression.

$$\Lambda_2 = \Lambda_{in}/|2\cos\rho|$$

In this case, the in-plane period Λ of the emission element 30A1 of the first emission diffraction portion 32 is matched to the in-plane period Λ of the incidence element 24A1 of the first incidence diffraction portion 26, and the in-plane period Λ of the emission element 30B1 of the second emission diffraction portion 34 is matched to the in-plane period Λ of the incidence element 24B1 of the second incidence diffraction portion 28.

In the optical element 10 shown in FIG. 1, all of the emission elements of the emission portion 16 are disposed one surface of the light guide plate 12. However, the present invention is not limited to this configuration. That is, the emission elements of the emission portion 16 may be divided and disposed on both surfaces of the light guide plate 12.

Figure 21:
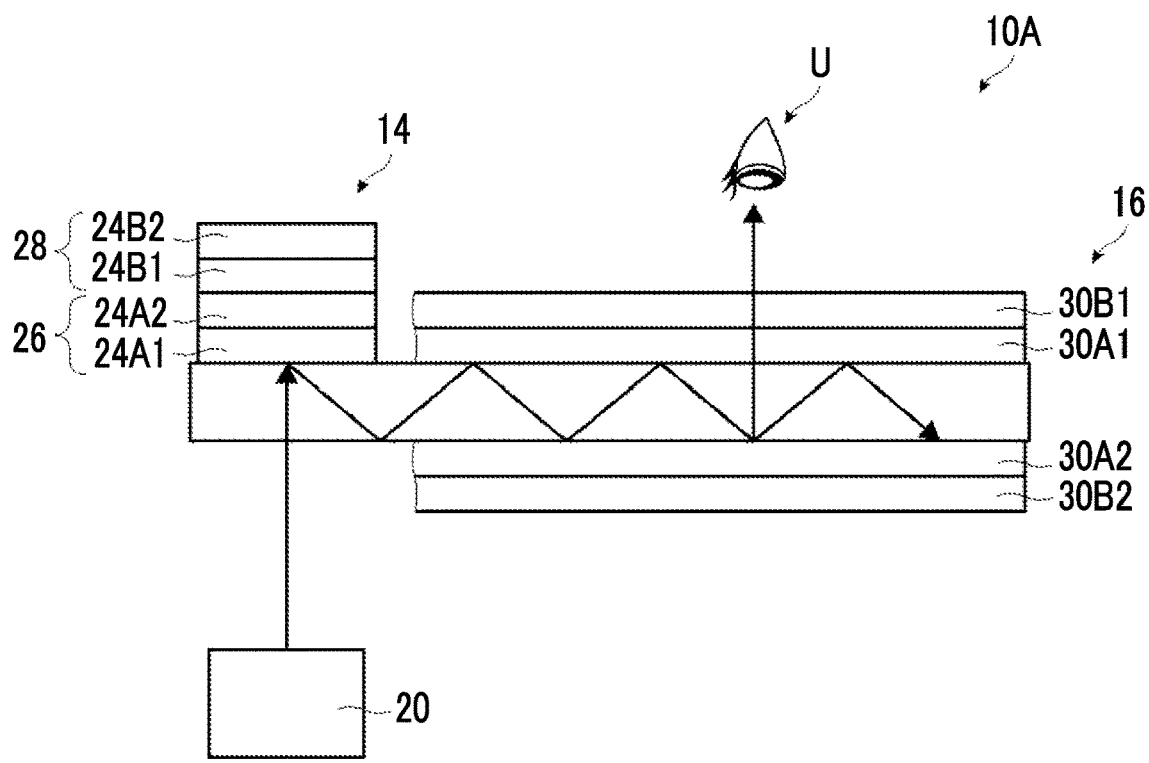
FIG. 21 is a diagram conceptually showing another example of the optical element according to the present invention.

For example, as in an optical element 10A conceptually shown in FIG. 21, the emission element 30A1 and the emission element 30B1 are provided on one surface of the light guide plate on an observation position side by the user U, and the emission element 30A2 and the emission element 30B2 are provided on another surface of the light guide plate.

In this configuration, the emission element 30A1 and the emission element 30B1 diffracts and reflects light in a direction opposite to the observation position by the user U. As shown below in Examples, as in the optical element 10 shown in FIG. 1, the user U can observe an image of light emitted from the light guide plate 12.

Hereinabove, the optical element and the image display apparatus according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.
(Formation of Liquid Crystal Diffraction Element R-1)
(Formation of Alignment Film)

A glass substrate was used as the support.

The following coating liquid for forming an alignment film was applied to the support using a spin coater at 2500 rpm for 30 seconds. The support on which the coating film of the coating liquid for forming an alignment film was formed was dried using a hot plate at 60° C. for 60 seconds. As a result, an alignment film was formed.

Coating Liquid for Forming Alignment Film

| | |
|---|---|
| The following material for photo-alignment | 1.00 part by mass |
| Water | 16.00 parts by mass |
| Butoxyethanol | 42.00 parts by mass |
| Propylene glycol monomethyl ether | 42.00 parts by mass |

—Material for Photo-Alignment—

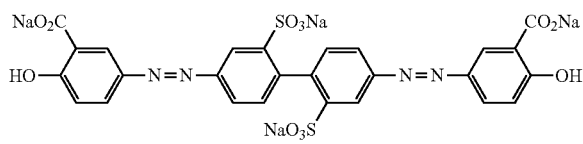

(Exposure of Alignment Film (Exposure Step))

The alignment film was exposed using the exposure device shown in FIG. 9 to form an alignment film P-1 having an alignment pattern.

In the exposure device, a laser that emits laser light having a wavelength (355 nm) was used as the laser. The exposure amount of the interference light was 3000 mJ/cm$^2$. An intersecting angle (intersecting angle α) between the two laser beams was adjusted such that the in-plane period Λ (the length over which the optical axis rotates by 180°) of an alignment pattern formed by interference of two laser beams was 0.490

(Formation of Cholesteric Liquid Crystal Layer)

As the liquid crystal composition forming the cholesteric liquid crystal layer, the following liquid crystal composition LC-1 was prepared.

Liquid Crystal Composition LC-1

| | |
|---|---|
| Liquid crystal compound L-1 | 100.00 parts by mass |
| Polymerization initiator (KAYACURE DETX-S, manufactured by Nippon Kayaku Co., Ltd.) | 1.00 part by mass |
| Chiral agent Ch-1 | 4.00 parts by mass |
| Methyl ethyl ketone | 142.06 parts by mass |

Liquid Crystal Compound L-1

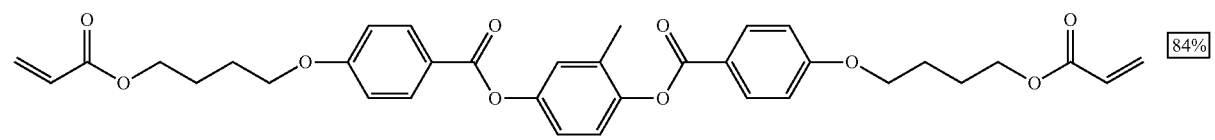

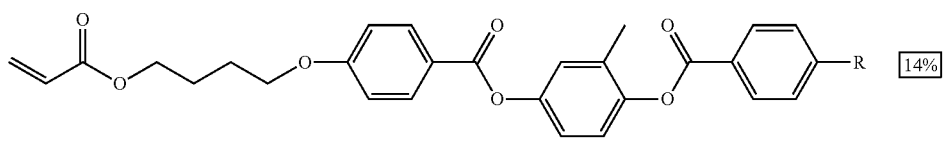

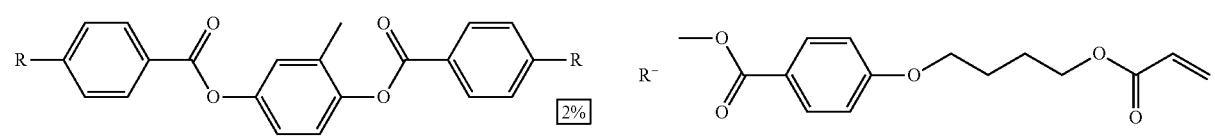

Chiral Agent Ch-1

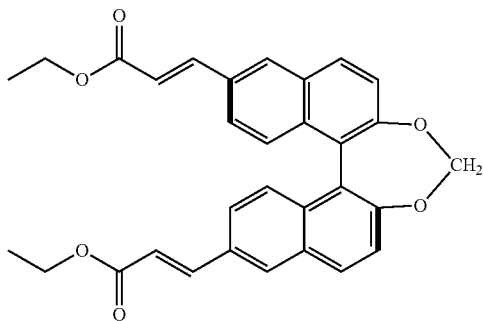

This chiral agent Ch-1 is a chiral agent that forms a right-handed helix (dextrorotation).

The above-described liquid crystal composition LC-1 was applied to the alignment film P-1 using a spin coater. Here, the thickness of the formed film was adjusted to 14 μm.

The coating film of the liquid crystal composition LC-1 was heated on a hot plate at 80° C. for 3 minutes (180 sec).

Next, the liquid crystal composition was exposed using a high-pressure mercury lamp at 80° C. in a nitrogen atmosphere through a long pass filter of 300 nm and a short pass filter of 350 nm. The exposure was performed such that the light irradiation dose measured at a wavelength of 315 nm was 20 mJ/cm$^2$.

Next, the coating film was irradiated with ultraviolet light having a wavelength of 365 nm at 80° C. at an irradiation dose of 1000 mJ/cm$^2$ using a high-pressure mercury lamp in a nitrogen atmosphere. As a result, the liquid crystal composition LC-1 was cured, the alignment of the liquid crystal compound was immobilized, and a cholesteric liquid crystal layer was formed.

Thus, a liquid crystal diffraction element including the support, the alignment film, and the cholesteric liquid crystal layer shown in FIG. 3 was prepared.

The liquid crystal diffraction element was cut in a direction along the rotation direction of the optical axis, and a cross-section was observed with an SEM. By analyzing the SEM image, the thickness d of the cholesteric liquid crystal layer, the single period Λ of the liquid crystal alignment pattern, the length helical pitch P of one helical pitch, and the tilt (tilt angle θ) of the bright portions and the dark portions with respect to the main surface were measured. As a result, a shape was observed in which the helical pitch P continuously increased and the tilt angle θ continuously increased in the thickness direction from the alignment film side to the side away from the alignment film.

Assuming that the interface side of the alignment film was 0 μm, in a section of 0 to 2.0 μm in the thickness direction, the average helical pitch P was 0.33 μm, and the tilt angle θ was 20°. In a section of 12.0 to 14.0 μm in the thickness direction, the average helical pitch P was 0.51 μm, and the tilt angle θ was 31°.

(Formation of Liquid Crystal Diffraction Elements R-2 to R-6 and L-1 to L-5)

Liquid crystal diffraction elements were prepared using the same method as that of the liquid crystal diffraction element R-1, except that the intersecting angle α (in-plane period Λ) during the exposure of the alignment film P-1, the composition of the liquid crystal composition, and the thickness of the film were changed as shown in Table 1, and the same measurement was performed.

In the liquid crystal diffraction elements L-1 to L-5, the following chiral agent Ch-2 was used instead of the above-described chiral agent Ch-1.

Chiral Agent Ch-2

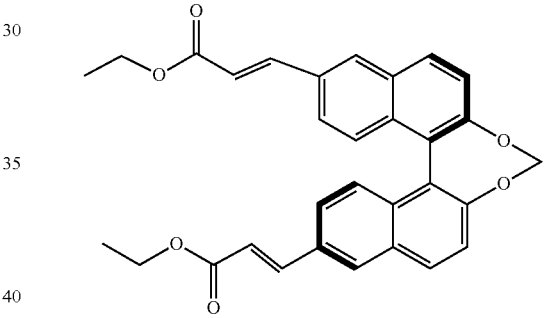

This chiral agent Ch-2 is a chiral agent that forms a left-handed helix (levorotation).

TABLE 1

| Liquid Crystal Diffraction Element | | | R-1 | | L-1 | | R-2 | |
|---|---|---|---|---|---|---|---|---|
| Alignment Film | Exposure Step | Laser Wavelength [nm] | 355 | | 355 | | 355 | |
| | | Set Angle α [deg.] | 44.7 | | 44.7 | | 65.1 | |
| | | In-Plane Period Λ [μm] | 0.467 | | 0.467 | | 0.330 | |
| Liquid Crystal Layer | Composition | Kind | LC-1 | | LC-1 | | LC-1 | |
| | | Liquid Crystal Compound [Part(s) by Mass] | L-1 | 100 | L-1 | 100 | L-1 | 100 |
| | | Polymerization Initiator [Part(s) by Mass] | KYACURE DETX-S | 1 | KYACURE DETX-S | 1 | KYACURE DETX-S | 1 |
| | | Chiral Agent [Part(s) by Mass] | Ch-1 | 4 | Ch-2 | 4 | Ch-1 | 5 |

TABLE 1-continued

| | | | | | | | | | |
|---|---|---|---|---|---|---|---|---|---|
| | | Solvent [Part(s) by Mass] | MEK | 142.06 | MEK | 142.06 | MEK | 143.41 |
| | | Concentration of Solid Contents [mass %] | 42.5 | | 42.5 | | 42.5 | |
| SEM | | Thickness [μm] | 14 | | 14 | | 14 | |
| | | Helical Pitch P [μm] | 0.330~0.510 | | 0.330~0.510 | | 0.290~0.535 | |
| | | Angle θ of Helical Period [deg.] | 20~31 | | 20~31 | | 26~54 | |

| | Liquid Crystal Diffraction Element | | L-2 | | R-3 | | L-3 | |
|---|---|---|---|---|---|---|---|---|
| Alignment Film | Exposure Step | Laser Wavelength [nm] | 355 | | 355 | | 355 | |
| | | Set Angle α [deg.] | 65.1 | | 44.7 | | 44.7 | |
| | | In-Plane Period Λ [μm] | 0.330 | | 0.467 | | 0.467 | |
| Liquid Crystal Layer | Composition | Kind | LC-1 | | LC-1 | | LC-1 | |
| | | Liquid Crystal Compound [Part(s) by Mass] | L-1 | 100 | L-1 | 100 | L-1 | 100 |
| | | Polymerization Initiator [Part(s) by Mass] | KYACURE DETX-S | 1 | KYACURE DETX-S | 1 | KYACURE DETX-S | 1 |
| | | Chiral Agent [Part(s) by Mass] | Ch-2 | 5 | Ch-1 | 4 | Ch-2 | 4 |
| | | Solvent [Part(s) by Mass] | MEK | 143.41 | MEK | 420.00 | MEK | 420.00 |
| | | Concentration of Solid Contents [mass %] | 42.5 | | 20 | | 20 | |
| SEM | | Thickness [μm] | 14 | | 2 | | 2 | |
| | | Helical Pitch P [μm] | 0.290~0.535 | | 0.330~0.510 | | 0.330~0.510 | |
| | | Angle θ of Helical Period [deg.] | 26~54 | | 20~31 | | 20~31 | |

| | Liquid Crystal Diffraction Element | | R-4 | | L-4 | | R-5 | |
|---|---|---|---|---|---|---|---|---|
| Alignment Film | Exposure Step | Laser Wavelength [nm] | 355 | | 355 | | 355 | |
| | | Set Angle α [deg.] | 65.1 | | 65.1 | | 65.1 | |
| | | In-Plane Period Λ [μm] | 0.330 | | 0.330 | | 0.330 | |
| Liquid Crystal Layer | Composition | Kind | LC-1 | | LC-1 | | LC-1 | |
| | | Liquid Crystal Compound [Part(s) by Mass] | L-1 | 100 | L-1 | 100 | L-1 | 100 |
| | | Polymerization Initiator [Part(s) by Mass] | KYACURE DETX-S | 1 | KYACURE DETX-S | 1 | KYACURE DETX-S | 1 |
| | | Chiral Agent [Part(s) by Mass] | Ch-1 | 5 | Ch-2 | 5 | Ch-1 | 4 |
| | | Solvent [Part(s) by Mass] | MEK | 424.00 | MEK | 424.00 | MEK | 142.06 |
| | | Concentration of Solid Contents [mass %] | 20 | | 20 | | 42.5 | |
| SEM | | Thickness [μm] | 2 | | 2 | | 8 | |
| | | Helical Pitch P [μm] | 0.290~0.535 | | 0.290~0.535 | | 0.330~0.510 | |
| | | Angle θ of Helical Period [deg.] | 26~54 | | 26~54 | | 28~47 | |

| | | Liquid Crystal Diffraction Element | | L-5 | | R-6 | |
|---|---|---|---|---|---|---|---|
| | Alignment Film | Exposure Step | Laser Wavelength [nm] | 355 | | 355 | |
| | | | Set Angle α [deg.] | 99.0 | | 99.0 | |
| | | | In-Plane Period Λ [μm] | 0.233 | | 0.233 | |
| | Liquid Crystal Layer | Composition | Kind | LC-1 | | LC-1 | |
| | | | Liquid Crystal Compound [Part(s) by Mass] | L-1 | 100 | L-1 | 100 |
| | | | Polymerization Initiator [Part(s) by Mass] | KYACURE DETX-S | 1 | KYACURE DETX-S | 1 |
| | | | Chiral Agent [Part(s) by Mass] | Ch-2 | 6 | Ch-1 | 6 |

TABLE 1-continued

|   |   | | | | | |
|---|---|---|---|---|---|---|
| | | Solvent [Part(s) by Mass] | MEK | 144.76 | MEK | 144.76 |
| | | Concentration of Solid Contents [mass %] | | 42.5 | | 42.5 |
| | | Thickness [μm] | | 8 | | 8 |
| SEM | | Helical Pitch P [μm] | | 0.250~0.400 | | 0.250~0.400 |
| | | Angle θ of Helical Period [deg.] | | 32~59 | | 32~59 |

Example 1 and Comparative Example 1

(Application to AR Glasses)

An optical element was prepared by peeling off the prepared liquid crystal diffraction elements R-1 to R-4 from the support and transferring the liquid crystal diffraction elements to the light guide plate to obtain the configuration shown in FIG. 21 and Table 2, and the effect of display in AR glasses was verified. The planar shape of the optical element is the same as shown in FIG. 2.

As the light guide plate, a glass plate (refractive index: 1.70, thickness: 0.50 mm) was used.

Figure 22:
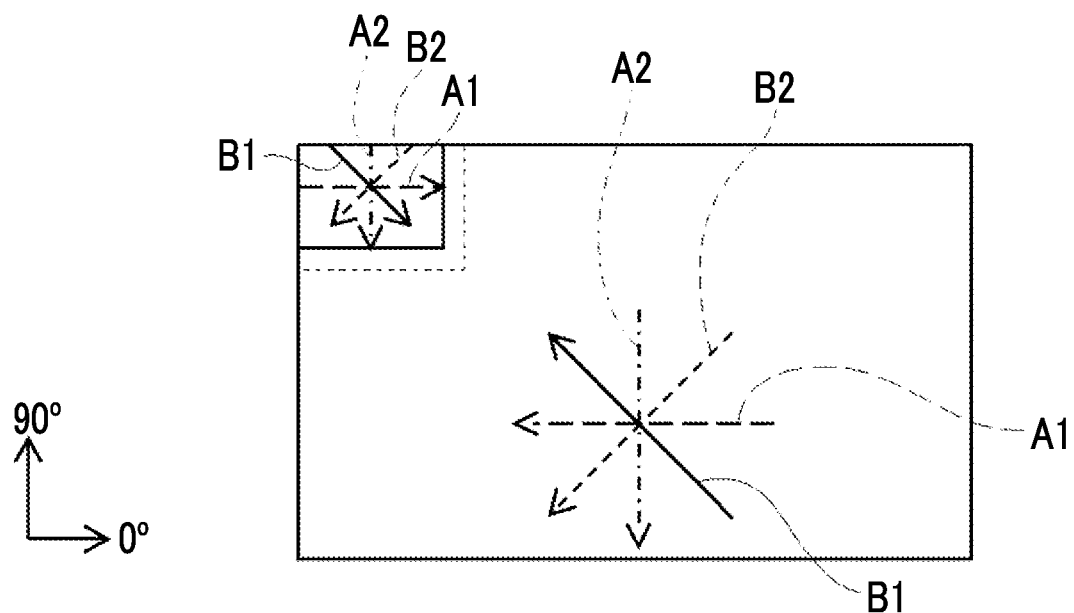
FIG. 22 is a conceptual diagram showing Example 1.

The in-plane rotation directions of the incidence elements and the emission elements at an angle from the observation direction of AR glasses are shown in Table 2 and FIG. 22. In this example, for convenience of description, the in-plane rotation direction of the incidence element A1 was set as 0°. Regarding this point, the same can also be applied to Examples 2 to 6 shown below.

In FIG. 22, an arrow A1 of the incidence portion indicates the in-plane rotation direction of the incidence element 24A1, an arrow A2 of the incidence portion indicates the in-plane rotation direction of the incidence element 24A2, an arrow B1 of the incidence portion indicates the in-plane rotation direction of the incidence element 24B1, and an arrow B2 of the incidence portion indicates the in-plane rotation direction of the incidence element 24B2. In addition, in FIG. 22, an arrow A1 of the emission portion indicates the in-plane rotation direction of the emission element 30A1, an arrow A2 of the emission portion indicates the in-plane rotation direction of the emission element 30A2, an arrow B1 of the emission portion indicates the in-plane rotation direction of the emission element 30B1, and an arrow B2 of the emission portion indicates the in-plane rotation direction of the emission element 30B2. Regarding this point, the same can also be applied to Examples 2 to 6 shown below (FIGS. 23 to 27).

As shown in Table 2, in Comparative Example 1, the second incidence diffraction portion and the second emission diffraction portion are not provided. That is, in Comparative Example 1, the second incidence diffraction portion and the second emission diffraction portion do not include the incidence elements corresponding to the arrow B1 and the arrow B2 shown in FIG. 22.

In addition, as a display of the AR glasses, a DLP type projector was used.

As a result, in Example 1, it was verified that RGB colors can be displayed on the entire display surface of the display as compared to Comparative Example 1 where the second incidence diffraction portion and the second emission diffraction portion are not provided.

TABLE 2

| | | | | Example 1 | Comparative Example 1 | Example 2 | Example 3 | Example 4 | Example 5 | Example 6 |
|---|---|---|---|---|---|---|---|---|---|---|
| Incident Portion | First Diffraction Portion | A1 | First Incidence Element In-Plane Rotation Direction | R-1 0° | R-1 0° | R-1 0° | R-1 0° | R-1 0° | R-1 0° | R-1 0° |
| | | | Second Incidence Element In-Plane Rotation Direction | — | — | L-1 180° | L-1 180° | L-1 180° | — | — |
| | | A2 | First Incidence Element In-Plane Rotation Direction | R-1 270° | R-1 270° | R-1 270° | R-1 270° | — | — | — |
| | | | Second Incidence Element In-Plane Rotation Direction | — | — | L-1 90° | L-1 90° | — | — | — |
| | Second Diffraction Portion | B1 | First Incidence Element In-Plane Rotation Direction | R-2 315° | — | R-2 315° | R-2 315° | R-2 270° | L-2 90° | R-2 270° |
| | | | Second Incidence Element In-Plane Rotation Direction | — | — | L-2 135° | L-2 135° | L-2 90° | — | — |
| | | B2 | First Incidence Element In-Plane Rotation Direction | R-2 225° | — | R-2 225° | R-2 225° | — | — | — |
| | | | Second Incidence Element In-Plane Rotation Direction | — | — | L-2 45° | L-2 45° | — | — | — |

TABLE 2-continued

|  |  |  |  | Example 1 | Comparative Example 1 | Example 2 | Example 3 | Example 4 | Example 5 | Example 6 |
|---|---|---|---|---|---|---|---|---|---|---|
| Emission Portion | First Diffraction Portion | A1 | Emission Element | R-3 | R-3 | R-3 | R-3 | R-3 | R-3 | R-3 |
|  |  |  | In-Plane Rotation Direction | 180° | 180° | 180° | 0° | 270° | 270° | 270° |
|  |  | A2 | Emission Element | R-3 | R-3 | R-3 | R-3 | R-5 | R-5 | R-5 |
|  |  |  | In-Plane Rotation Direction | 270° | 270° | 270° | 270° | 225° | 225° | 225° |
|  | Second Diffraction Portion | B1 | Emission Element | R-4 | — | L-4 | L-4 | L-4 | L-4 | R-4 |
|  |  |  | In-Plane Rotation Direction | 135° | — | 315° | 135° | 180° | 180° | 0° |
|  |  | B2 | Emission Element | R-4 | — | L-4 | L-4 | L-5 | L-5 | R-6 |
|  |  |  | In-Plane Rotation Direction | 225° | — | 45° | 45° | 225° | 225° | 45° |

Example 2

Figure 23:
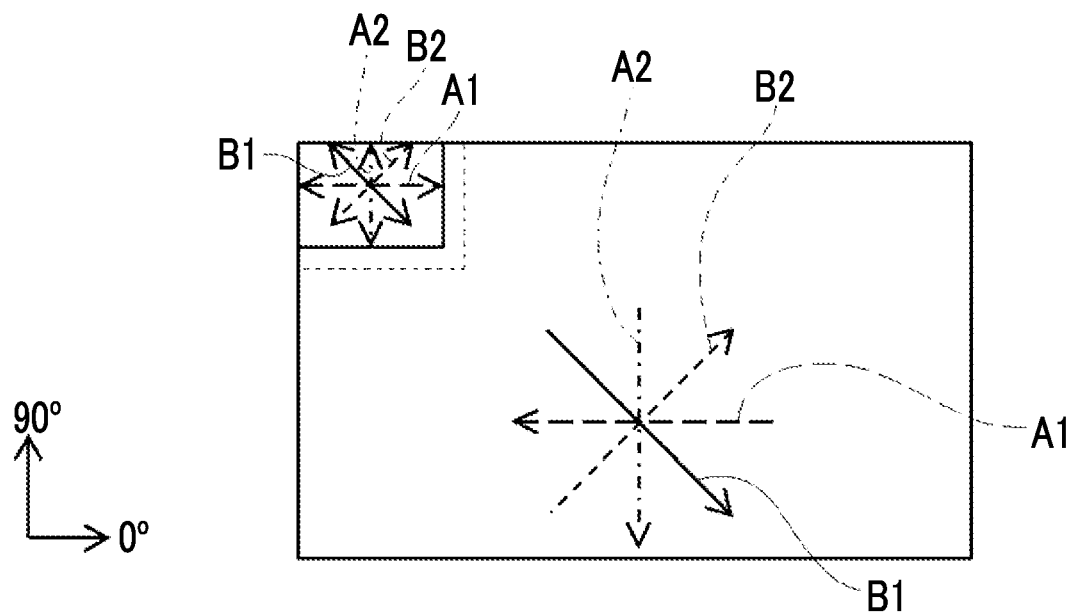
FIG. 23 is a conceptual diagram showing Example 2.

The display of the AR glasses was verified using the same method as that of Example 1, except that the liquid crystal diffraction elements R-1 to R-3 and L-1, L-2, and L-4 were disposed according to the configuration and the angle shown in Table 2 and FIG. 23.

In Example 2, as the incidence elements A1 and A2, the right-handed helical liquid crystal diffraction element R-1 that selectively reflects right circularly polarized light and the left-handed helical liquid crystal diffraction element L-1 that selectively reflects left circularly polarized light were laminated and used. In addition, as the incidence elements B1 and B2, the right-handed helical liquid crystal diffraction element R-2 that selectively reflects right circularly polarized light and the left-handed helical liquid crystal diffraction element L-2 that selectively reflects left circularly polarized light were laminated and used. The liquid crystal diffraction elements were disposed in order from the right-handed helical element and the left-handed helical element from the light guide plate side. That is, in this example, one incidence element is formed of the first incidence element and the second incidence element.

In this example, in the incidence elements A1, A2, B1, and B2, the in-plane rotation directions of the right-handed helical liquid crystal diffraction element R-1 and the left-handed helical liquid crystal diffraction element L-1 and the in-plane rotation directions of the right-handed helical liquid crystal diffraction element R-2 and the left-handed helical liquid crystal diffraction element L-2 and are different by 180°. Therefore, in FIG. 23, the arrows are bidirectional.

The effect of display of the AR glasses was verified using the same method as that of Example 1. As a result, in Example 2, it was verified that RGB colors can be displayed on the entire display surface of the display as compared to Comparative Example 1. Further, in Example 2 where the left-handed helical liquid crystal diffraction elements were laminated and used as the incidence element, it was verified that a clear image that was brighter than that of Example 1 can be displayed.

Example 3

Figure 24:
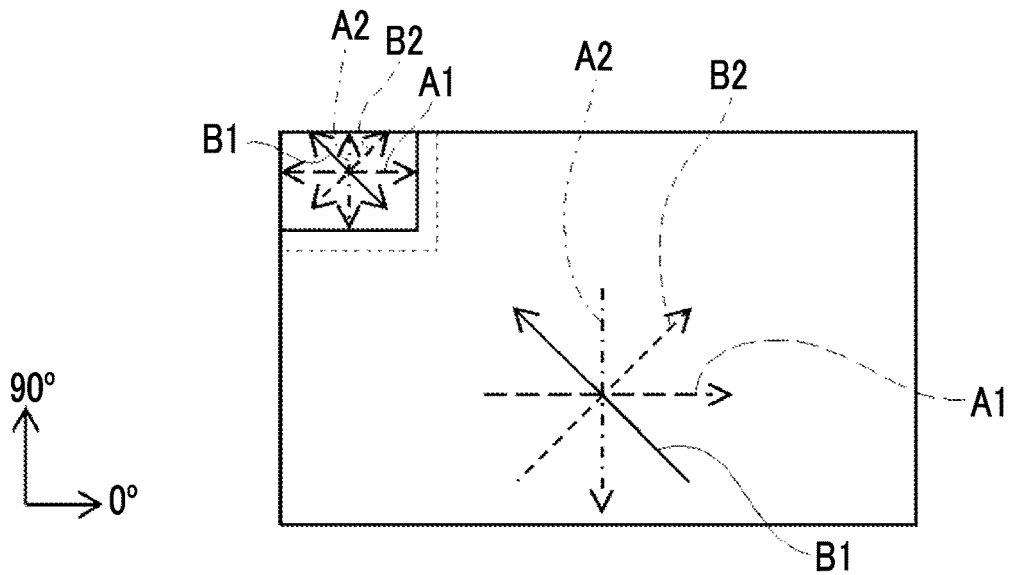
FIG. 24 is a conceptual diagram showing Example 3.

The display of the AR glasses was verified using the same method as that of Example 1, except that, in the configuration shown in FIG. 1, the liquid crystal diffraction elements R-1 to R-3 and L-1, L-2, and L-4 were disposed according to the configuration and the angle shown in Table 2 and FIG. 24.

In Example 3, as in Example 2, as the incidence elements A1 and A2, the right-handed helical liquid crystal diffraction element R-1 that selectively reflects right circularly polarized light and the left-handed helical liquid crystal diffraction element L-1 that selectively reflects left circularly polarized light were laminated and used. In addition, as the incidence elements B1 and B2, the right-handed helical liquid crystal diffraction element R-2 that selectively reflects right circularly polarized light and the left-handed helical liquid crystal diffraction element L-2 that selectively reflects left circularly polarized light were laminated and used. The liquid crystal diffraction elements were disposed in order from the right-handed helical element and the left-handed helical element from the light guide plate side. That is, in this example, one incidence element is also formed of the first incidence element and the second incidence element.

Even in this example, in the incidence elements A1, A2, B1, and B2, the in-plane rotation directions of the right-handed helical liquid crystal diffraction element R-1 and the left-handed helical liquid crystal diffraction element L-1 and the in-plane rotation directions of the right-handed helical liquid crystal diffraction element R-2 and the left-handed helical liquid crystal diffraction element L-2 and are different by 180°. In FIG. 24, the arrows are bidirectional.

As a result, in Example 3, it was verified that RGB colors can be displayed on the entire display surface of the display as compared to Comparative Example 1. Further, in Example 3 where the right-handed helical liquid crystal diffraction elements and the left-handed helical liquid crystal diffraction elements were laminated and used as the incidence element, it was verified that a clear image that was brighter than that of Example 1 can be displayed.

Example 4

Figure 25:
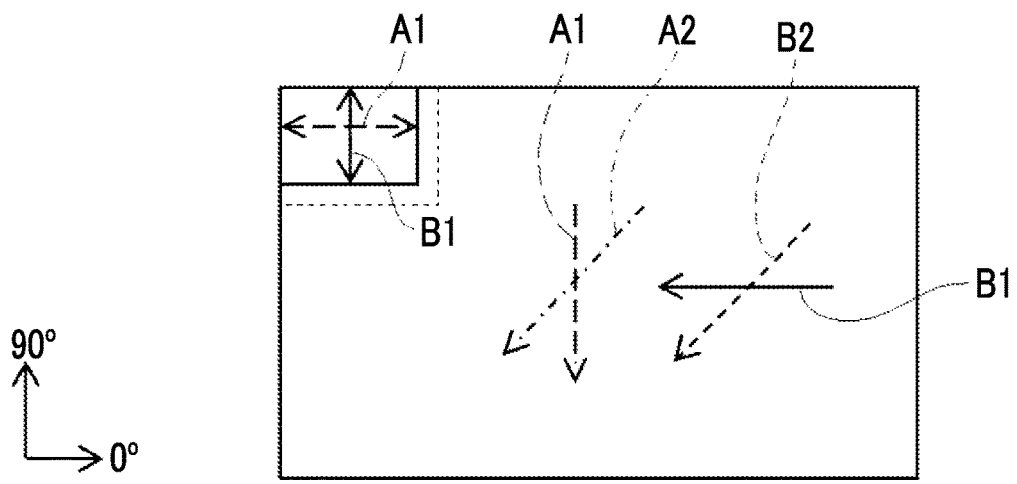
FIG. 25 is a conceptual diagram showing Example 4.

The display of the AR glasses was verified using the same method as that of Example 1, except that, in the configuration shown in FIG. 1, the liquid crystal diffraction elements R-1 to R-3 and R-5 and the liquid crystal diffraction elements L-1, L-2, L-4, and L-5 were disposed according to the configuration and the angle shown in Table 2 and FIG. 25. That is, in this example, the first incidence diffraction portion did not include the incidence element A2, and the second incidence diffraction portion did not include the incidence element B2.

As in Example 2, even in this example, as the incidence element A1, the right-handed helical liquid crystal diffraction element R-1 that selectively reflects right circularly polarized light and the left-handed helical liquid crystal diffraction element L-1 that selectively reflects left circularly polarized light were laminated and used. In addition, as the incidence element B1, the right-handed helical liquid crystal diffraction element R-2 that selectively reflects right circularly polarized light and the left-handed helical liquid crystal diffraction element L-2 that selectively reflects left circularly polarized light were laminated and used. The liquid crystal diffraction elements were disposed in order from the right-handed helical element and the left-handed helical element from the light guide plate side. That is, in this example, one incidence element is formed of the first incidence element and the second incidence element.

Even in this example, in the incidence elements A1 and B1, the in-plane rotation directions of the right-handed helical liquid crystal diffraction element R-1 and the left-handed helical liquid crystal diffraction element L-1 and the in-plane rotation directions of the right-handed helical liquid crystal diffraction element R-2 and the left-handed helical liquid crystal diffraction element L-2 and are different by 180°. In FIG. 25, the arrows are bidirectional.

As a result, in Example 4, it was verified that RGB colors can be displayed on the entire display surface of the display as compared to Comparative Example 1.

Example 5

Figure 26:
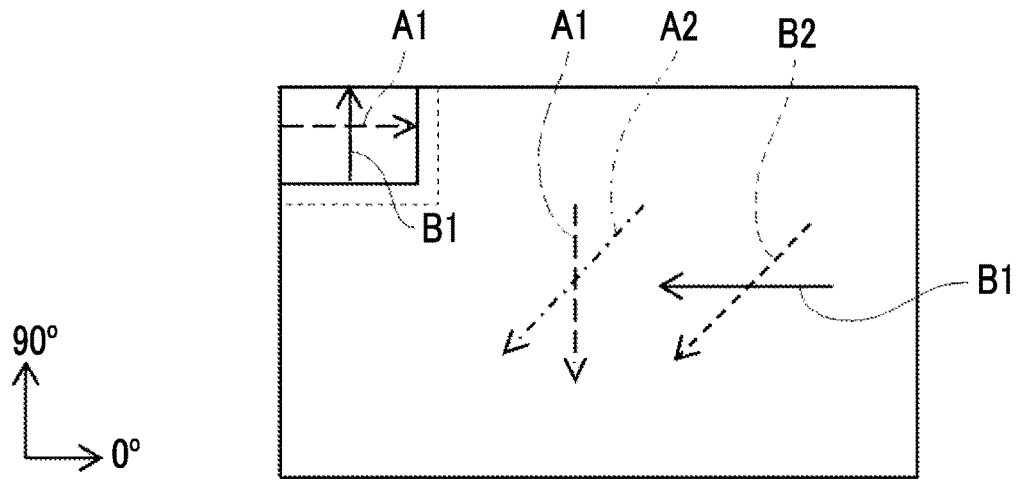
FIG. 26 is a conceptual diagram showing Example 5.

The display of the AR glasses was verified using the same method as that of Example 1, except that, in the configuration shown in FIG. 1, the liquid crystal diffraction elements R-1 and to R-3 to R-5 and the liquid crystal diffraction elements L-2, L-4, and L-5 were disposed according to the configuration and the angle shown in Table 2 and FIG. 26. That is, in this example, the first incidence diffraction portion did not include the incidence element A2, and the second incidence diffraction portion did not include the incidence element B2.

As a result, in Example 5, it was verified that RGB colors can be displayed on the entire display surface of the display as compared to Comparative Example 1.

Example 6

Figure 27:
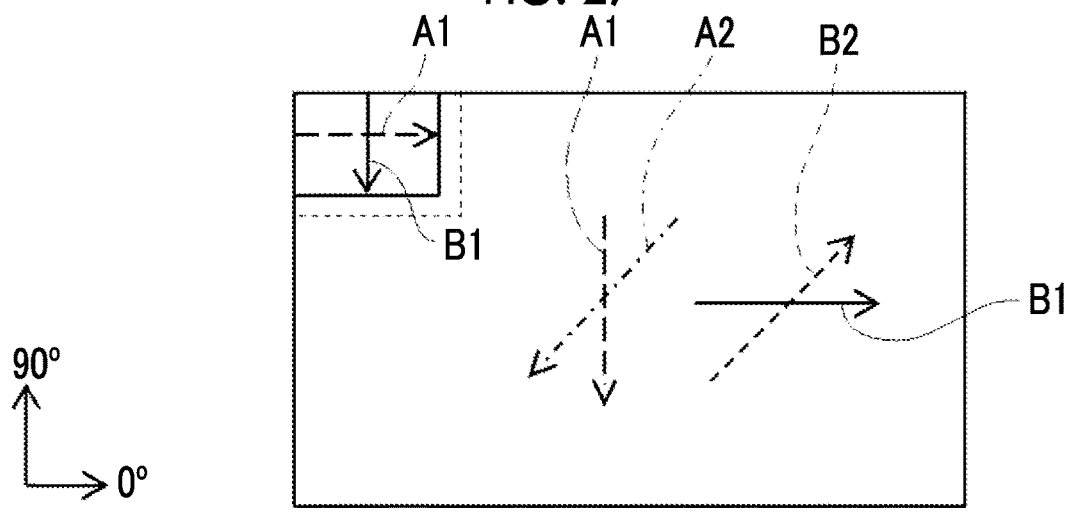
FIG. 27 is a conceptual diagram showing Example 6.

The display of the AR glasses was verified using the same method as that of Example 1, except that, in the configuration shown in FIG. 1, the liquid crystal diffraction elements R-1 to R-6 were disposed according to the configuration and the angle shown in Table 2 and FIG. 27. That is, in this example, the first incidence diffraction portion did not include the incidence element A2, and the second incidence diffraction portion did not include the incidence element B2.

As a result, in Example 6, it was verified that RGB colors can be displayed on the entire display surface of the display as compared to Comparative Example 1.

TABLE 3

| | | | | Example 7 | Example 8 | | | Example 9 |
|---|---|---|---|---|---|---|---|---|
| Incidence Portion | First Diffraction Portion | A1-1 | First Incidence Element In-Plane Rotation Direction | R-1 0° | R-1 0° | A1-1 | First Incidence Element In-Plane Rotation Direction | R-1 270° |
| | | | Second Incidence Element In-Plane Rotation Direction | L-1 180° | L-1 180° | | Second Incidence Element In-Plane Rotation Direction | L-1 90° |
| | | A1-2 | First Incidence Element In-Plane Rotation Direction | R-1 180° | R-1 180° | A1-2 | First Incidence Element In-Plane Rotation Direction | R-1 240° |
| | | | Second Incidence Element In-Plane Rotation Direction | L-1 0° | L-1 0° | | Second Incidence Element In-Plane Rotation Direction | L-1 60° |
| | | A2 | First Incidence Element In-Plane Rotation Direction | R-1 270° | R-1 270° | A1-3 | First Incidence Element In-Plane Rotation Direction | R-1 300° |
| | | | Second Incidence Element In-Plane Rotation Direction | L-1 90° | L-1 90° | | Second Incidence Element In-Plane Rotation Direction | L-1 120° |
| | Second Diffraction Portion | B1 | First Incidence Element In-Plane Rotation Direction | R-2 315° | R-2 315° | | | |
| | | | Second Incidence Element In-Plane Rotation Direction | L-2 135° | L-2 135° | | | |
| | | B2 | First Incidence Element In-Plane Rotation Direction | R-2 225° | R-2 225° | | | |
| | | | Second Incidence Element In-Plane Rotation Direction | L-2 45° | L-2 45° | | | |
| Emission Portion | First Diffraction Portion | A1-1 | Emission Element In-Plane Rotation Direction | R-3 0° | R-3 0° | A1-1 | Emission Element In-Plane Rotation Direction | R-3 270° |

TABLE 3-continued

|  |  |  | Example 7 | Example 8 |  |  | Example 9 |
|---|---|---|---|---|---|---|---|
|  | A1-2 | Emission Element In-Plane Rotation Direction | R-3 180° | L-3 0° | A1-2 | Emission Element In-Plane Rotation Direction | L-3 270° |
|  | A2-1 | Emission Element In-Plane Rotation Direction | R-3 270° | R-3 270° | A2-1 | Emission Element In-Plane Rotation Direction | R-3 240° |
|  | A2-2 | Emission Element In-Plane Rotation Direction | R-3 90° | L-3 270° | A2-2 | Emission Element In-Plane Rotation Direction | L-3 240° |
|  |  |  |  |  | A3-1 | Emission Element In-Plane Rotation Direction | R-3 300° |
|  |  |  |  |  | A3-2 | Emission Element In-Plane Rotation Direction | L-3 300° |
| Second Diffraction Portion | B1-1 | Emission Element In-Plane Rotation Direction | L-4 135° | R-4 135° |  |  |  |
|  | B1-2 | Emission Element In-Plane Rotation Direction | L-4 315° | L-4 135° |  |  |  |
|  | B2-1 | Emission Element In-Plane Rotation Direction | L-4 45° | R-4 45° |  |  |  |
|  | B2-2 | Emission Element In-Plane Rotation Direction | L-4 225° | L-4 45° |  |  |  |

Example 7

Figure 28:
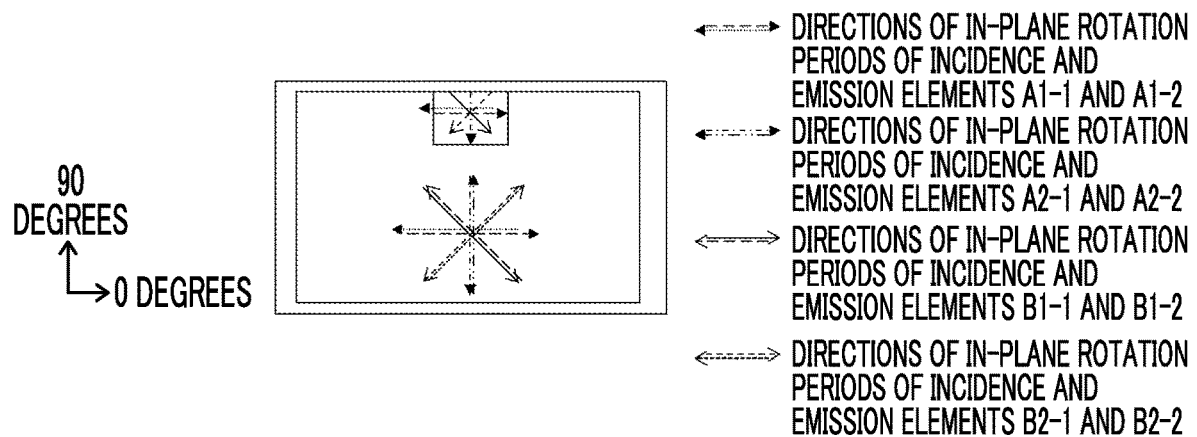
FIG. 28 is a conceptual diagram showing Examples 7 and 8.
Figure 29:
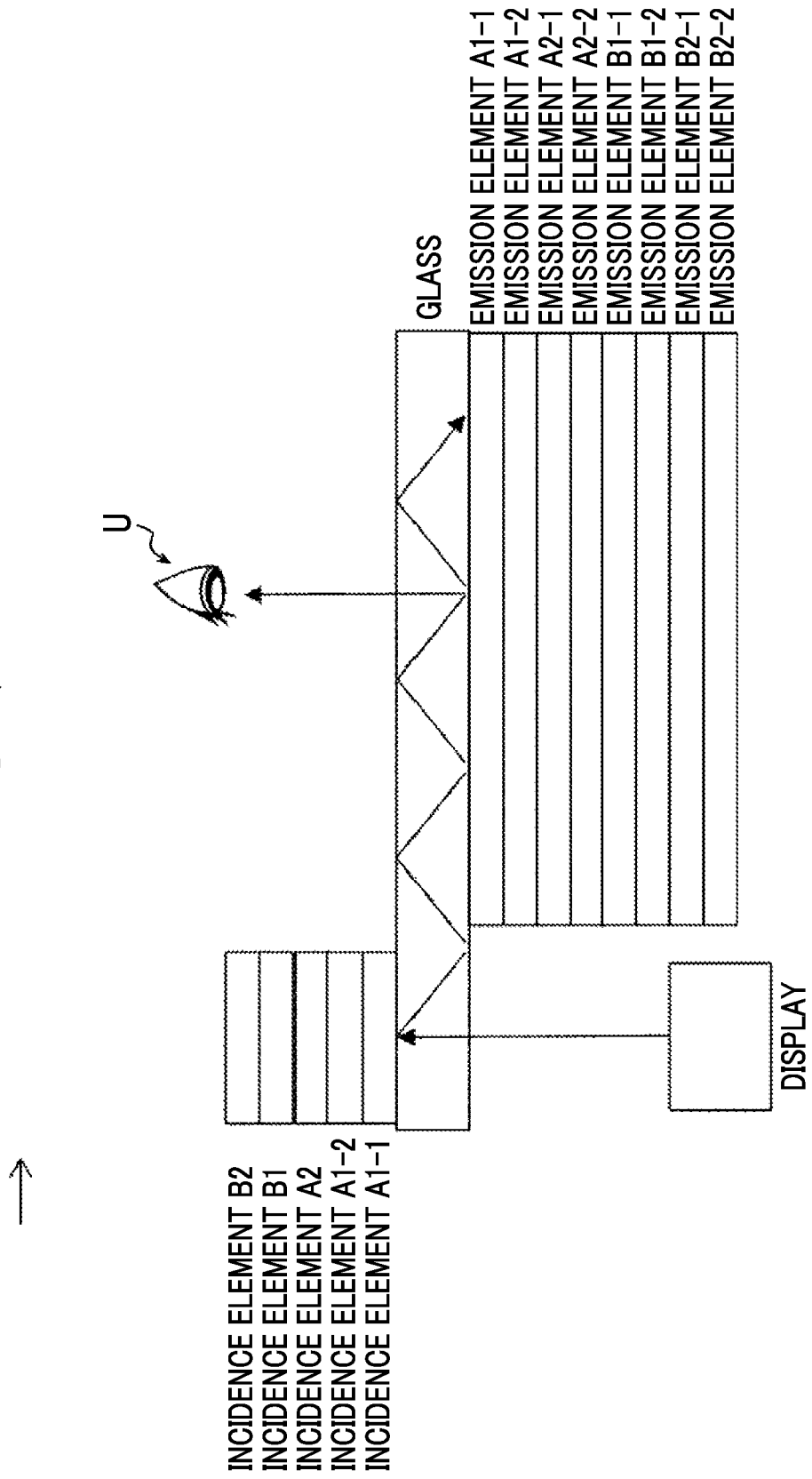
FIG. 29 is a conceptual diagram showing Examples 7 and 8.

The display of the AR glasses was verified using the same method as that of Example 1, except that the liquid crystal diffraction elements R-1, R-2, and to R-3 and the liquid crystal diffraction elements L-1, L-2, and L-4 were disposed according to the configuration and the angle shown in Table 3 and FIGS. 28 and 29.

As a result, in Example 7, it was verified that RGB colors can be displayed on the entire display surface of the display as compared to Comparative Example 1.

Example 8

The display of the AR glasses was verified using the same method as that of Example 1, except that the liquid crystal diffraction elements R-1, R-2, R-3 to R-4 and the liquid crystal diffraction elements L-1, L-2, L-3, and L-4 were disposed according to the configuration and the angle shown in Table 3 and FIGS. 28 and 29.

As a result, in Example 8, it was verified that RGB colors can be displayed on the entire display surface of the display as compared to Comparative Example 1.

Example 9

Figure 30:
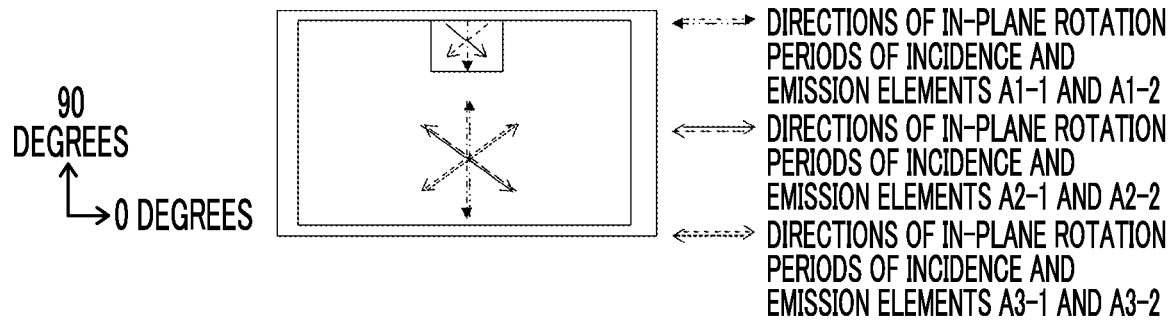
FIG. 30 is a conceptual diagram showing Example 9.

The display of the AR glasses was verified using the same method as that of Example 1, except that the liquid crystal diffraction elements R-1 and to R-3 and the liquid crystal diffraction elements L-1 and L-3 were disposed according to the configuration and the angle shown in Table 3 and FIGS. 30 and 31.

As a result, in Example 9, it was verified that RGB colors can be displayed on the entire display surface of the display as compared to Comparative Example 1.

As can be seen from the above results, the effects of the present invention are obvious.

The present invention is suitably applicable to an image display apparatus such as AR glasses.

EXPLANATION OF REFERENCES 10, 10A: optical element
12: light guide plate
14: incidence portion
16: emission portion
20: display
24A1, 24A2, 24B1, 24B2: incidence diffraction element
26: first incidence diffraction portion
28: second incidence diffraction portion
30A1, 30A2, 30B1, 30B2: emission diffraction element
32: first emission diffraction portion
34: second emission diffraction portion
50: support
52: alignment film
54: liquid crystal layer
40: liquid crystal compound
40A: optical axis
42: bright portion
44: dark portion
50: support
52: alignment film
54: liquid crystal layer
60: exposure device
62: laser
64: light source
65: $\lambda/2$ plate
68: polarization beam splitter
70A, 70B: mirror
72A, 72B: $\lambda/4$ plate
$R_R$: right circularly polarized light of red light
M: laser light
MA, MB: beam
$P_O$: linearly polarized light
$P_R$: right circularly polarized light
$P_L$: left circularly polarized light
$L_1$, $L_4$: incidence light
$L_2$, $L_5$: transmitted light
U: user D: arrangement axis
Λ: in-plane period
P: helical pitch

What is claimed is:

1. An optical element comprising:
a light guide plate;
an incidence portion that causes light to be incident into the light guide plate; and
an emission portion that emits light from the light guide plate,
wherein the incidence portion includes a plurality of incidence diffraction portions, the incidence diffraction portion includes one or more incidence diffraction elements, the emission portion includes a plurality of emission diffraction portions, and the emission diffraction portion includes one or more emission diffraction elements,
each of the incidence diffraction element and the emission diffraction element includes a liquid crystal diffraction layer that is formed of a composition including a liquid crystal compounds,
the liquid crystal diffraction layer has a liquid crystal alignment pattern in which a direction of an optical axis derived from one of the liquid crystal compounds changes while continuously rotating in one in-plane direction, the liquid crystal alignment pattern including a plurality of arrangement axes each including a plurality of the liquid crystal compounds, the plurality of arrangement axes being parallel, and
in the liquid crystal alignment pattern, in a case where the one in-plane direction in which the optical axis derived from the one of the liquid crystal compounds changes while continuously rotating in is set as an in-plane rotation direction and a length over which the direction of the optical axis derived from the one of the liquid crystal compounds rotates by 180° in the in-plane rotation direction is set as an in-plane period,
the in-plane rotation directions of the liquid crystal diffraction layers in at least two of a plurality of the incidence diffraction elements are different from each other.

2. The optical element according to claim 1,
wherein the in-plane periods and the in-plane rotation directions of the liquid crystal diffraction layers in at least two of the plurality of incidence diffraction elements are different from each other, and
the in-plane periods of the liquid crystal diffraction layers in at least one of a plurality of emission diffraction elements and at least one of the plurality of incidence diffraction elements are the same.

3. The optical element according to claim 1,
wherein the in-plane periods of the liquid crystal diffraction layers in at least two of a plurality of the emission diffraction elements are the same.

4. The optical element according to claim 1,
wherein the in-plane periods and the in-plane rotation directions of the liquid crystal diffraction layers in at least two of a plurality of the emission diffraction elements are different from each other.

5. The optical element according to claim 1,
wherein the incidence diffraction portion includes a plurality of the incidence diffraction elements,
in at least two of the plurality of incidence diffraction elements, the in-plane periods of the liquid crystal diffraction layers are the same and the in-plane rotation directions are different from each other,
the emission diffraction portion includes a plurality of the emission diffraction elements, and
in at least two of the plurality of emission diffraction elements, the in-plane periods of the liquid crystal diffraction layers are the same and the in-plane rotation directions are different from each other.

6. The optical element according to claim 5,
wherein in n incidence diffraction portions of the incidence portion and n emission diffraction portions of the emission portion, the number of combinations of the incidence diffraction portions and the emission diffraction portions where the in-plane period of the liquid crystal diffraction layer of the incidence diffraction element and the in-plane period of the liquid crystal diffraction layer of the emission diffraction element are the same is n, and
n represents an integer of 1 or more.

7. The optical element according to claim 1,
wherein at least one of the incidence diffraction portions includes two incidence diffraction elements, and
in the at least one of the incidence diffraction portions that includes the two incidence diffraction elements, an angle between the in-plane rotation directions of the liquid crystal diffraction layers of the incidence diffraction elements is 90°.

8. The optical element according to claim 1,
wherein the incidence portion includes a plurality of the incidence diffraction portions each of which includes two incidence diffraction elements, and
at least two of the incidence diffraction portions are the same and an angle between the in-plane rotation directions of the liquid crystal diffraction layers of the two incidence diffraction elements in the incidence diffraction portion is 45°.

9. The optical element according to claim 1,
wherein the incidence portion includes a plurality of the incidence diffraction portions each of which includes two incidence diffraction elements, and
at least two of the incidence diffraction portions are the same and an angle between the in-plane rotation directions of the liquid crystal diffraction layers of the two incidence diffraction elements in the incidence diffraction portion is 90°.

10. The optical element according to claim 1,
wherein at least one of the emission diffraction portions includes two emission diffraction elements, and
in the at least one of the emission diffraction portions that includes the two emission diffraction elements, an angle between the in-plane rotation directions of the liquid crystal diffraction layers of the emission diffraction elements is 90°.

11. The optical element according to claim 1,
wherein the emission portion includes a plurality of the emission diffraction portions each of which includes two emission diffraction elements, and
at least two of the emission diffraction portions are the same and an angle between the in-plane rotation directions of the liquid crystal diffraction layers of the two emission diffraction elements in the emission diffraction portion is 45°.

12. The optical element according to claim 1,
wherein the emission portion includes a plurality of the emission diffraction portions each of which includes two emission diffraction elements, and
at least two of the emission diffraction portions are the same and an angle between the in-plane rotation directions of the liquid crystal diffraction layers of the two emission diffraction elements in the emission diffraction portion is 90°.

13. The optical element according to claim 1,
wherein the liquid crystal diffraction layer is a cholesteric liquid crystal layer obtained by immobilizing a cholesteric liquid crystalline phase.

14. The optical element according to claim 13,
wherein in a cross-section of the cholesteric liquid crystal layer observed with a scanning electron microscope, bright portions and dark portions derived from the cholesteric liquid crystalline phase are tilted with respect to a main surface of the cholesteric liquid crystal layer, and
in a case where an angle between the main surface of the cholesteric liquid crystal layer and the bright portions and the dark portions of the cross-section of the cholesteric liquid crystal layer is set as a tilt angle $\theta$, the tilt angle $\theta$ has a region of 10° or more.

15. The optical element according to claim 14,
wherein the cholesteric liquid crystal layer has a region where the tilt angle $\theta$ continuously increases in one thickness direction, and
a difference between a maximum value and a minimum value of the tilt angle $\theta$ in the thickness direction is 10° or more.

16. The optical element according to claim 13,
wherein the incidence diffraction element includes two cholesteric liquid crystal layers where turning directions of circularly polarized light to be selectively reflected are different from each other.

17. The optical element according to claim 13,
wherein the emission portion includes two emission diffraction portions each of which includes two emission diffraction elements including the cholesteric liquid crystal layers where turning directions of circularly polarized light to be selectively reflected are the same, and
in the two emission diffraction portions, turning directions of circularly polarized light to be selectively reflected by the cholesteric liquid crystal layers of the emission diffraction elements forming the respective emission diffraction portions are different from each other.

18. The optical element according to claim 16,
wherein the in-plane rotation direction of the cholesteric liquid crystal layers where the turning directions of circularly polarized light to be selectively reflected are different are different by 180°.

19. An image display apparatus comprising:
the optical element according to claim 1; and
a display element that emits an image to the incidence diffraction portion.

20. The optical element of claim 1 wherein the liquid crystal diffraction layer has the liquid crystal alignment pattern in which the direction of an optical axis derived from one of the liquid crystal compounds changes while continuously rotating in only one in-plane direction.

* * * * *